(12) United States Patent
Chiang et al.

(10) Patent No.: US 8,580,430 B2
(45) Date of Patent: Nov. 12, 2013

(54) BATTERY STRUCTURES, SELF-ORGANIZING STRUCTURES, AND RELATED METHODS

(75) Inventors: Yet-Ming Chiang, Framingham, MA (US); William Douglas Moorehead, Virginia Beach, VA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 13/549,064

(22) Filed: Jul. 13, 2012

(65) Prior Publication Data

US 2012/0282530 A1 Nov. 8, 2012

Related U.S. Application Data

(60) Division of application No. 12/891,637, filed on Sep. 27, 2010, now Pat. No. 8,241,789, which is a continuation of application No. 12/512,421, filed on Jul. 30, 2009, now Pat. No. 8,168,326, which is a continuation of application No. 10/206,662, filed on Jul. 26, 2002, now Pat. No. 7,579,112, which is a continuation-in-part of application No. 10/021,740, filed on Oct. 22, 2001, now Pat. No. 7,553,584.

(60) Provisional application No. 60/308,360, filed on Jul. 27, 2001, provisional application No. 60/242,124, filed on Oct. 20, 2000.

(51) Int. Cl.
*H01M 10/40* (2006.01)
*H01M 4/50* (2010.01)
*H01M 4/52* (2010.01)
*H01M 4/58* (2010.01)

(52) U.S. Cl.
USPC ... 429/209; 429/221; 429/231.3; 429/231.95; 429/219; 429/223

(58) Field of Classification Search
None
See application file for complete search history.

(56) References Cited

U.S. PATENT DOCUMENTS 3,765,943 A 10/1973 Biagetti
3,864,167 A 2/1975 Broadhead et al.
(Continued)

FOREIGN PATENT DOCUMENTS

CA 2270771 A1 10/2000
CN 1893167 A 1/2007
(Continued)

OTHER PUBLICATIONS

Canadian Office Action for Application No. 2426156 mailed Mar. 31, 2009.

(Continued)

*Primary Examiner* — John S Maples
(74) *Attorney, Agent, or Firm* — Wolf, Greenfield & Sacks, P.C.

(57) ABSTRACT

An energy storage device includes a first electrode comprising a first material and a second electrode comprising a second material, at least a portion of the first and second materials forming an interpenetrating network when dispersed in an electrolyte, the electrolyte, the first material and the second material are selected so that the first and second materials exert a repelling force on each other when combined. An electrochemical device, includes a first electrode in electrical communication with a first current collector; a second electrode in electrical communication with a second current collector; and an ionically conductive medium in ionic contact with said first and second electrodes, wherein at least a portion of the first and second electrodes form an interpenetrating network and wherein at least one of the first and second electrodes comprises an electrode structure providing two or more pathways to its current collector.

8 Claims, 33 Drawing Sheets

(56) References Cited

U.S. PATENT DOCUMENTS

| | | | |
|---|---|---|---|
| 4,245,016 A | 1/1981 | Rampel | |
| 4,555,454 A | 11/1985 | Shuster | |
| 4,579,637 A | 4/1986 | Jaisinghani et al. | |
| 4,599,114 A | 7/1986 | Atkinson | |
| 4,615,784 A | 10/1986 | Stewart et al. | |
| 4,668,596 A | 5/1987 | Shacklette et al. | |
| 4,758,483 A | 7/1988 | Armand et al. | |
| 4,804,592 A | 2/1989 | Vanderborgh et al. | |
| 4,889,777 A | 12/1989 | Akuto | |
| 5,100,747 A | 3/1992 | Hayashida et al. | |
| 5,187,209 A | 2/1993 | Hirai et al. | |
| 5,213,895 A | 5/1993 | Hirai et al. | |
| 5,227,267 A | 7/1993 | Goebel et al. | |
| 5,238,760 A | 8/1993 | Takahashi et al. | |
| 5,294,504 A | 3/1994 | Otagawa et al. | |
| 5,338,625 A | 8/1994 | Bates et al. | |
| 5,358,802 A | 10/1994 | Mayer et al. | |
| 5,387,478 A * | 2/1995 | Muta et al. | 429/59 |
| 5,399,447 A | 3/1995 | Chaloner-Gill et al. | |
| 5,405,937 A | 4/1995 | Lemaire et al. | |
| 5,436,093 A | 7/1995 | Huang et al. | |
| 5,441,830 A | 8/1995 | Moulton et al. | |
| 5,464,707 A | 11/1995 | Moulton et al. | |
| 5,478,676 A | 12/1995 | Turi et al. | |
| 5,518,833 A | 5/1996 | Repplinger et al. | |
| 5,520,850 A | 5/1996 | Chaloner-Gill et al. | |
| 5,527,641 A | 6/1996 | Koshiishi et al. | |
| 5,554,459 A | 9/1996 | Gozdz et al. | |
| 5,567,754 A | 10/1996 | Stramel | |
| 5,578,396 A | 11/1996 | Fauteux et al. | |
| 5,587,253 A | 12/1996 | Gozdz et al. | |
| 5,588,971 A | 12/1996 | Fauteux et al. | |
| 5,589,297 A | 12/1996 | Koga et al. | |
| 5,591,544 A | 1/1997 | Fauteux et al. | |
| 5,620,811 A | 4/1997 | Zhang et al. | |
| 5,624,605 A | 4/1997 | Cao et al. | |
| 5,635,138 A | 6/1997 | Amatucci et al. | |
| 5,654,115 A | 8/1997 | Hasebe et al. | |
| 5,677,080 A | 10/1997 | Chen | |
| 5,698,342 A | 12/1997 | Klein | |
| 5,705,291 A | 1/1998 | Amatucci et al. | |
| 5,714,053 A | 2/1998 | Howard | |
| 5,733,683 A | 3/1998 | Searson et al. | |
| 5,759,714 A | 6/1998 | Matsufuji et al. | |
| 5,789,100 A | 8/1998 | Burroughs et al. | |
| 5,821,033 A | 10/1998 | Cromack et al. | |
| 5,827,615 A | 10/1998 | Touhsaent et al. | |
| 5,834,136 A | 11/1998 | Gao et al. | |
| 5,840,087 A | 11/1998 | Gozdz et al. | |
| 5,843,292 A | 12/1998 | Spiros | |
| 5,846,675 A | 12/1998 | Sazhin et al. | |
| 5,888,670 A | 3/1999 | Kawakami | |
| 5,897,522 A | 4/1999 | Nitzan | |
| 5,902,689 A | 5/1999 | Vleggaar et al. | |
| 5,910,382 A | 6/1999 | Goodenough et al. | |
| 5,925,283 A | 7/1999 | Taniuchi et al. | |
| 5,949,213 A | 9/1999 | Lanni | |
| 6,063,519 A | 5/2000 | Barker et al. | |
| 6,063,525 A | 5/2000 | LaFollette | |
| 6,069,221 A | 5/2000 | Chasser et al. | |
| RE36,843 E | 8/2000 | Lake et al. | |
| 6,096,453 A | 8/2000 | Grunwald | |
| 6,096,454 A | 8/2000 | Tran et al. | |
| 6,096,494 A | 8/2000 | Tang et al. | |
| 6,117,593 A | 9/2000 | Stachoviak et al. | |
| 6,120,940 A | 9/2000 | Poehler et al. | |
| 6,136,476 A | 10/2000 | Schutts et al. | |
| 6,156,453 A | 12/2000 | Shimizu et al. | |
| 6,159,389 A | 12/2000 | Miura et al. | |
| 6,174,623 B1 | 1/2001 | Shackle | |
| 6,190,798 B1 | 2/2001 | Okada et al. | |
| 6,231,779 B1 | 5/2001 | Chiang et al. | |
| 6,242,124 B1 | 6/2001 | Saito et al. | |
| 6,280,875 B1 | 8/2001 | Kwak et al. | |
| 6,280,879 B1 | 8/2001 | Andersen et al. | |
| 6,287,720 B1 | 9/2001 | Yamashita et al. | |
| 6,291,097 B1 | 9/2001 | Barker et al. | |
| 6,300,016 B1 | 10/2001 | Jan et al. | |
| 6,306,540 B1 | 10/2001 | Hiroi et al. | |
| 6,322,924 B1 | 11/2001 | Hirahara et al. | |
| 6,337,156 B1 | 1/2002 | Narang et al. | |
| 6,342,317 B1 | 1/2002 | Patel et al. | |
| 6,358,645 B1 | 3/2002 | Furukawa et al. | |
| 6,395,429 B1 | 5/2002 | Kang et al. | |
| 6,403,263 B1 | 6/2002 | Roach | |
| 6,410,189 B1 | 6/2002 | Yamada et al. | |
| 6,413,284 B1 | 7/2002 | Chu et al. | |
| 6,413,285 B1 | 7/2002 | Chu et al. | |
| 6,423,447 B1 | 7/2002 | Ohsaki et al. | |
| 6,432,585 B1 | 8/2002 | Kawakami et al. | |
| 6,451,487 B1 | 9/2002 | Besner et al. | |
| 6,454,977 B1 | 9/2002 | Kwok et al. | |
| 6,495,283 B1 | 12/2002 | Yoon et al. | |
| 6,511,780 B1 | 1/2003 | Veregin et al. | |
| 6,528,033 B1 | 3/2003 | Barker et al. | |
| 6,541,157 B1 | 4/2003 | Inagaki et al. | |
| 6,555,268 B1 | 4/2003 | Inoue et al. | |
| 6,599,662 B1 | 7/2003 | Chiang et al. | |
| 6,623,888 B1 | 9/2003 | Omaru et al. | |
| 6,645,675 B1 | 11/2003 | Munshi | |
| 6,664,006 B1 | 12/2003 | Munshi | |
| 6,730,438 B2 | 5/2004 | Nakanishi et al. | |
| 6,753,111 B2 | 6/2004 | Kweon et al. | |
| 6,764,525 B1 | 7/2004 | Whitacre et al. | |
| 6,783,894 B2 | 8/2004 | Kajiura et al. | |
| 6,787,232 B1 | 9/2004 | Chiang et al. | |
| 6,797,435 B2 | 9/2004 | Kweon et al. | |
| 6,800,399 B2 | 10/2004 | Matsumoto | |
| 6,818,356 B1 | 11/2004 | Bates | |
| 6,844,105 B1 | 1/2005 | Hanafusa et al. | |
| 6,855,273 B2 | 2/2005 | Ravet et al. | |
| 6,878,487 B2 | 4/2005 | Cho et al. | |
| 6,982,132 B1 | 1/2006 | Goldner et al. | |
| 7,026,071 B2 | 4/2006 | Mayes et al. | |
| 7,033,702 B2 | 4/2006 | Dasgupta et al. | |
| 7,087,348 B2 | 8/2006 | Holman et al. | |
| 7,090,785 B2 | 8/2006 | Chiang et al. | |
| 7,182,848 B2 | 2/2007 | Sarkar | |
| 7,318,982 B2 | 1/2008 | Gozdz et al. | |
| 7,338,734 B2 | 3/2008 | Chiang et al. | |
| 7,387,851 B2 | 6/2008 | Gozdz et al. | |
| 7,396,614 B2 | 7/2008 | Jouanneau et al. | |
| 7,553,584 B2 | 6/2009 | Chiang et al. | |
| 7,579,112 B2 | 8/2009 | Chiang et al. | |
| 7,662,265 B2 | 2/2010 | Chiang et al. | |
| 7,763,382 B2 | 7/2010 | Riley, Jr. et al. | |
| 7,781,098 B2 | 8/2010 | Chiang et al. | |
| 7,988,746 B2 | 8/2011 | Chiang et al. | |
| 8,148,009 B2 | 4/2012 | Chiang et al. | |
| 8,168,326 B2 | 5/2012 | Chiang et al. | |
| 8,206,468 B2 | 6/2012 | Chiang et al. | |
| 8,206,469 B2 | 6/2012 | Chiang et al. | |
| 8,241,789 B2 | 8/2012 | Chiang et al. | |
| 8,277,975 B2 | 10/2012 | Chiang et al. | |
| 2001/0005558 A1 | 6/2001 | Yoshioka et al. | |
| 2001/0005562 A1 | 6/2001 | Yoshioka et al. | |
| 2001/0007726 A1 | 7/2001 | Yoshioka et al. | |
| 2001/0043709 A1 | 11/2001 | Panitzsch | |
| 2002/0000034 A1 | 1/2002 | Jenson | |
| 2002/0015278 A1 | 2/2002 | Fukuyama et al. | |
| 2002/0028380 A1 | 3/2002 | Tanjo et al. | |
| 2002/0036282 A1 | 3/2002 | Chiang et al. | |
| 2002/0048706 A1 | 4/2002 | Mayes et al. | |
| 2002/0071990 A1 | 6/2002 | Kweon et al. | |
| 2002/0071991 A1 | 6/2002 | Kweon et al. | |
| 2002/0074972 A1 | 6/2002 | Narang et al. | |
| 2002/0192137 A1 | 12/2002 | Chaloner-Gill et al. | |
| 2002/0195591 A1 | 12/2002 | Ravet et al. | |
| 2003/0003352 A1 | 1/2003 | Kweon et al. | |
| 2003/0008212 A1 | 1/2003 | Akashi et al. | |
| 2003/0049529 A1 | 3/2003 | Cho et al. | |
| 2003/0054250 A1 | 3/2003 | Kweon et al. | |
| 2003/0082446 A1 | 5/2003 | Chiang et al. | |
| 2003/0099884 A1 | 5/2003 | Chiang et al. | |

(56) References Cited

U.S. PATENT DOCUMENTS

| | | |
|---|---|---|
| 2003/0114297 A1 | 6/2003 | Shinn et al. |
| 2004/0005265 A1 | 1/2004 | Chiang et al. |
| 2004/0018429 A1 | 1/2004 | Kweon et al. |
| 2004/0018430 A1 | 1/2004 | Holman et al. |
| 2004/0018431 A1 | 1/2004 | Gozdz et al. |
| 2004/0151887 A1 | 8/2004 | Forrest et al. |
| 2004/0185343 A1 | 9/2004 | Wang et al. |
| 2004/0265692 A1 | 12/2004 | Long et al. |
| 2005/0026037 A1 | 2/2005 | Riley et al. |
| 2005/0034993 A1 | 2/2005 | Gozdz et al. |
| 2005/0048374 A1 | 3/2005 | Yonezawa |
| 2005/0109263 A9 | 5/2005 | Chiang et al. |
| 2005/0170253 A1 | 8/2005 | Yoon et al. |
| 2005/0175529 A1 | 8/2005 | Ceder et al. |
| 2005/0181280 A1 | 8/2005 | Ceder et al. |
| 2005/0272214 A1 | 12/2005 | Chiang et al. |
| 2006/0035143 A1 | 2/2006 | Kida et al. |
| 2006/0102455 A1 | 5/2006 | Chiang et al. |
| 2006/0234131 A1 | 10/2006 | Takami et al. |
| 2007/0009801 A1 | 1/2007 | Inagaki et al. |
| 2007/0275300 A1 | 11/2007 | Salot et al. |
| 2008/0099734 A1 | 5/2008 | Chiang et al. |
| 2008/0213662 A1 | 9/2008 | Chiang et al. |
| 2008/0254368 A1 | 10/2008 | Ooyama et al. |
| 2008/0311470 A1 | 12/2008 | Gozdz et al. |
| 2009/0035664 A1 | 2/2009 | Chiang et al. |
| 2009/0202903 A1 | 8/2009 | Chiang et al. |
| 2009/0235520 A1 | 9/2009 | Atsumi et al. |
| 2010/0248028 A1 | 9/2010 | Riley, Jr. et al. |
| 2011/0027656 A1 | 2/2011 | Chiang et al. |
| 2011/0045346 A1 | 2/2011 | Chiang et al. |
| 2011/0064999 A1 | 3/2011 | Chiang et al. |
| 2011/0097623 A1 | 4/2011 | Chiang et al. |
| 2012/0244444 A1 | 9/2012 | Chiang et al. |
| 2012/0251896 A1 | 10/2012 | Chiang et al. |

FOREIGN PATENT DOCUMENTS

| | | |
|---|---|---|
| CN | 1945881 A | 4/2007 |
| CN | 101030655 A | 9/2007 |
| EP | 0 071 119 A2 | 2/1983 |
| EP | 1 113 511 A1 | 7/2001 |
| EP | 1 184 918 A2 | 3/2002 |
| EP | 1 231 651 A1 | 8/2002 |
| EP | 1 231 653 A1 | 8/2002 |
| EP | 1 860 722 A2 | 11/2007 |
| GB | 976971 A | 12/1964 |
| JP | 5398038 A | 8/1978 |
| JP | 55010738 A | 1/1980 |
| JP | 59094379 A | 5/1984 |
| JP | 59152565 A | 8/1984 |
| JP | 60183365 A | 9/1985 |
| JP | 61-4167 A | 1/1986 |
| JP | 63121272 A | 5/1988 |
| JP | 63289768 A | 11/1988 |
| JP | 1-187778 A | 7/1989 |
| JP | 0458455 A | 2/1992 |
| JP | 04144073 A | 5/1992 |
| JP | 0529006 A | 2/1993 |
| JP | 05041211 A | 2/1993 |
| JP | 05109429 A | 4/1993 |
| JP | 06236768 A | 8/1994 |
| JP | 07101728 A | 4/1995 |
| JP | 07153492 A | 6/1995 |
| JP | 07262986 A | 10/1995 |
| JP | 08138650 A | 5/1996 |
| JP | 08321306 A | 12/1996 |
| JP | 09022693 A | 1/1997 |
| JP | 09147862 A | 6/1997 |
| JP | 09298057 A | 11/1997 |
| JP | 09320569 A | 12/1997 |
| JP | 11-031534 A | 2/1999 |
| JP | 11121006 A | 4/1999 |
| JP | 11121025 A | 4/1999 |
| JP | 11121061 A | 4/1999 |
| JP | 11162519 A | 6/1999 |
| JP | 2000021415 A | 1/2000 |
| JP | 2000048639 A | 2/2000 |
| JP | 2000080406 A | 3/2000 |
| JP | 2000173645 A | 6/2000 |
| JP | 2000-195526 A | 7/2000 |
| JP | 2000195525 A | 7/2000 |
| JP | 2000228213 A | 8/2000 |
| JP | 2000248095 A | 9/2000 |
| JP | 2002151055 A | 5/2002 |
| KR | 101991000746 | 9/1991 |
| KR | 1998-071228 | 10/1998 |
| WO | WO 97/05666 A2 | 2/1997 |
| WO | WO 97/27635 A1 | 7/1997 |
| WO | WO 97/44843 A1 | 11/1997 |
| WO | WO 98/12761 A1 | 3/1998 |
| WO | WO 98/16960 A2 | 4/1998 |
| WO | WO 99/33129 A1 | 7/1999 |
| WO | WO 99/56331 A1 | 11/1999 |
| WO | WO 00/41256 A1 | 7/2000 |
| WO | WO 01/77501 A2 | 10/2001 |
| WO | WO 02/43168 A2 | 5/2002 |
| WO | WO 03/012908 A2 | 2/2003 |
| WO | WO 03/056646 A1 | 7/2003 |
| WO | WO 2007/028972 A1 | 3/2007 |
| WO | WO 2008/011061 A1 | 1/2008 |
| WO | WO 2008/153749 A1 | 12/2008 |

OTHER PUBLICATIONS

Canadian Office Action for Application No. 2426156 mailed Nov. 19, 2009.

Canadian Office Action for Application No. 2729504 mailed Mar. 27, 2012.

Chinese Office Action for Application No. 01817679.8 mailed Apr. 29, 2005.

Chinese Office Action for Application No. 01817679.8 mailed Dec. 25, 2005.

Chinese Office Action for Application No. 200610115050.X mailed Mar. 14, 2008.

Chinese Office Action for Application No. 200610115050.X mailed Oct. 17, 2008.

Chinese Office Action for Application No. 200610115050.X mailed Jun. 26, 2009.

Chinese Office Action for Application No. 200610115050.X mailed Jul. 14, 2010.

European Office Action for Application No. 01988312.3 mailed Nov. 27, 2003.

European Office Action for Application No. 01988312.3 mailed Mar. 9, 2005.

European Office Action for Application No. 01988312.3 mailed Jun. 27, 2007.

European Office Action for Application No. 01988312.3 mailed Oct. 5, 2007.

Japanese Office Action for Application No. 2002-544796 mailed Apr. 20, 2005.

Japanese Office Action for Application No. 2002-544796 mailed Jun. 6, 2006.

Japanese Office Action for Application No. 2005-308683 mailed Jun. 12, 2009.

Japanese Office Action for Application No. 2005-308683 mailed Oct. 12, 2010.

Japanese Office Action for Application No. 2006-274391 dated Feb. 3, 2010.

Japanese Office Action for Application No. 2006-274391 dated Mar. 14, 2011.

Japanese Office Action for Application No. 2006-274391 dated Jan. 10, 2012.

Korean Notice of Preliminary Rejection for Application No. 10-2003-7005495 mailed Sep. 27, 2007.

Korean Notice of Preliminary Rejection for Application No. 10-2003-7005495 mailed Mar. 28, 2008.

Korean Notice of Final Rejection for Application No. 10-2003-7005495 mailed Jan. 2009.

(56) References Cited

OTHER PUBLICATIONS

Korean Notice of Preliminary Rejection for Application No. 10-2008-7021160 mailed Dec. 24, 2008.
Korean Notice of Preliminary Rejection for Application No. 10-2009-7008494 mailed Jul. 24, 2009.
Korean Notice of Final Rejection for Application No. 10-2009-7008494 mailed Apr. 2010.
Korean Notice of Preliminary Rejection for Application No. 10-2009-7008494 mailed Sep. 3, 2010.
Korean Notice of Preliminary Rejection for Application No. 10-2010-7024736 mailed Mar. 2, 2011.
Notice of Last Preliminary Rejection for Application No. 10-2010-7024736 issued Apr. 20, 2012.
Notice of Preliminary Rejection from corresponding Korean Patent Application No. 10-2011-7018116 issued Nov. 21, 2011.
Non-Final Office Action from USPTO for U.S. Appl. No. 10/021,740 mailed Sep. 2, 2003.
Non-Final Office Action from USPTO for U.S. Appl. No. 10/021,740 mailed Jul. 1, 2004.
Non-Final Office Action from USPTO for U.S. Appl. No. 10/021,740, mailed Dec. 29, 2004.
Non-Final Office Action from USPTO for U.S. Appl. No. 10/021,740 mailed Sep. 8, 2005.
Non-Final Office Action from USPTO for U.S. Appl. No. 10/021,740, mailed Jan. 4, 2006.
Final Office Action from USPTO for U.S. Appl. No. 10/021,740 mailed Jul. 12, 2006.
Notice of Allowance for U.S. Appl. No. 10/021,740 mailed Mar. 8, 2007.
Notice of Allowance for U.S. Appl. No. 10/021,740 mailed Jul. 10, 2007.
Notice of Allowance for U.S. Appl. No. 10/021,740 mailed Dec. 5, 2007.
Notice of Allowance for U.S. Appl. No. 10/021,740 mailed Aug. 27, 2008.
Notice of Allowance for U.S. Appl. No. 10/021,740 mailed Feb. 24, 2009.
Non Final Office Action for U.S. Appl. No. 12/041,619 mailed Dec. 28, 2009.
Notice of Allowance for No. 12/041,619 mailed May 18, 2010.
Non Final Office Action for U.S. Appl. No. 12/839,155 mailed Mar. 1, 2011.
Final Office Action for U.S. Appl. No. 12/839,155 mailed Nov. 16, 2011.
Advisory Action for U.S. Appl. No. 12/839,155 mailed Apr. 4, 2012
.
Non Final Office Action for U.S. Appl. No. 12/957,000 mailed Feb. 18, 2011.
Notice of Allowance for U.S. Appl. No. 12/957,000 mailed Nov. 23, 2011.
Invitation to Pay Additional Fees for International Patent Application Serial No. PCT/US01/48345 mailed Nov. 28, 2002.
International Search Report for International Application No. PCT/US 01/48345 mailed Feb. 20, 2003.
Written Opinion for corresponding International Application No. PCT/US 01/48345 mailed Aug. 22, 2003.
International Preliminary Examination Report for International Application No. PCT/US 01/48345 mailed Feb. 25, 2004.
Chinese Office Action for Application No. 02818181.6 mailed Mar. 7, 2008.
Korean Office Action for Application No. 10-2009-7016254 mailed Feb. 28, 2011.
Non Office Action from USPTO for U.S. Appl. No. 10/206,662 mailed on May 19, 2005.
Final Office Action for U.S. Appl. No. 10/206,662 mailed Aug. 7, 2006.
Non Final Office Action for U.S. Appl. No. 10/206,662 mailed May 8, 2007.
Notice of Allowance for U.S. Appl. No. 10/206,662 mailed Apr. 1, 2009.

Non Final Office Action for U.S. Appl. No. 12/512,421 mailed May 17, 2010.
Final Office Action for U.S. Appl. No. 12/512,421 mailed Oct. 22, 2010.
Non Final Office Action for U.S. Appl. No. 12/512,421 mailed Feb. 2, 2011.
Non Final Office Action for U.S. Appl. No. 12/512,421 mailed Aug. 18, 2011.
Non Final Office Action for U.S. Appl. No. 12/891,637 mailed Aug. 25, 2011.
Notice of Allowance for U.S. Appl. No. 12/886,035 mailed Dec. 20, 2010.
Notice of Allowance for U.S. Appl. No. 12/886,035 mailed Mar. 30, 2011.
Non Final Office Action for U.S. Appl. No. 12/886,006 mailed Sep. 1, 2011.
Non Final Office Action for U.S. Appl. No. 13/169,423 mailed Oct. 13, 2011.
International Search Report for PCT/US02/23880 mailed Dec. 29, 2003.
International Preliminary Examination Report for PCT/US02/23880 issued Mar. 14, 2007.
Chinese Office Action for Application No. 200880100459.1 mailed Apr. 1, 2012.
Invitation to Pay Additional Fees for PCT/US2008/006604 mailed Aug. 20, 2008.
International Search Report and Written Opinion for PCT/US2008/006604 mailed Nov. 3, 2008.
International Preliminary Report on Patentability for PCT/US2008/006604 mailed Dec. 10, 2009.
European Examination Report for EP 09788703.8 mailed Sep. 20, 2011.
International Search Report and Written Opinion for PCT/US2009/000901 mailed Sep. 11, 2009.
International Preliminary Report on Patentability for PCT/US2009/000901 mailed Aug. 26, 2010.
Non Final Office Action for U.S. Appl. No. 12/323,983 mailed Aug. 30, 2011.
Invitation to Pay Additional Fees for International Patent Application Serial No. PCT/US2009/006284 mailed Feb. 23, 2010.
International Search Report and Written Opinion for International Patent Application Serial No. PCT/US2009/006284 mailed Jun. 7, 2010.
International Preliminary Report on Patentability for International Patent Application Serial No. PCT/US2009/006284 mailed Mar. 11, 2011.
Non Final Office Action for U.S. Appl. No. 10/354,673 mailed Dec. 15, 2004.
Final Office Action for U.S. Appl. No. 10/354,673 mailed Jul. 26, 2005.
Non Final Office Action for U.S. Appl. No. 10/354,673 mailed Aug. 30, 2006.
Non Final Office Action for U.S. Appl. No. 10/354,673 mailed Oct. 26, 2006.
Final Office Action for U.S. Appl. No. 10/354,673 mailed Aug. 13, 2007.
Requirement for Restriction/Election for U.S. Appl. No. 10/628,681 mailed May 11, 2006.
Non Final Office Action for U.S. Appl. No. 10/628,681 mailed Jan. 25, 2007.
Final Office Action for U.S. Appl. No. 10/628,681 mailed Oct. 4, 2007.
Non Final Office Action for U.S. Appl. No. 10/628,681 mailed Apr. 4, 2008.
Final Office Action for U.S. Appl. No. 10/628,681 mailed Dec. 4, 2008.
Non Final Office Action for U.S. Appl. No. 10/628,681 mailed May 12, 2009.
Final Office Action for U.S. Appl. No. 10/628,681 mailed Dec. 3, 2009.
Notice of Allowance for U.S. Appl. No. 10/628,681 mailed Apr. 5, 2010.

(56) References Cited

OTHER PUBLICATIONS

[No Author Listed] "Atomized." Merriam-Webster Online Dictionary. 2010. Available at http://www.merriam-webster.com/dictionary/atomized. Last accessed Jul. 26, 2010. 2 pages.
[No Author Listed] "Cantilever." Merriam-Webster Online Dictionary. 2010. Available at http://www.merriam-webster.com/dictionary/cantilever. Last accessed Jul. 19, 2010. 2 pages.
[No Author Listed] "Chapter 6. Defects," Unknown book, p. 339-424.
[No Author Listed] "Compliant." Merriam-Webster Online Dictionary. 2010. Available at http://www.merriam-webster.com/dictionary/compliant. Last accessed Jul. 16, 2010. 2 pages.
[No Author Listed] "Dimension." Merriam-Webster Online Dictionary. 2010. Available at http://www.merriam-webster.com/dictionary/dimension. Last accessed Jul. 14, 2010. 2 pages.
[No Author Listed] "Displacement." Merriam-Webster Online Dictionary. 2010. Available at http://www.merriam-webster.com/dictionary/discplacement. Last accessed Jul. 16, 2010. 2 pages.
[No Author Listed] "Hermetic." Merriam-Webster Online Dictionary. 2010. Available at http://www.merriam-webster.com/dictionary/hermetic. Last accessed Jul. 19, 2010. 2 pages.
[No Author Listed] "Infuse." Merriam-Webster Online Dictionary. 2010. Available at http://www.merriam-webster.com/dictionary/atomized. Last accessed Jul. 19, 2010. 2 pages.
[No Author Listed] "Interface." Merriam-Webster Online Dictionary. 2010. Available at http://www.merriam-webster.com/dictionary/interface. Last accessed Jul. 15, 2010. 2 pages.
[No Author Listed] "Intervening." Merriam-Webster Online Dictionary. 2010. Available at http://www.merriam-webster.com/dictionary/intervening. Last accessed Jul. 19, 2010. 2 pages.
[No Author Listed] "Open-cell foam." McGraw-Hill Dictionary of Scientific and Technical Terms. 1974:1040.
[No Author Listed] "Percolating." Merriam-Webster Online Dictionary. 2010. Available at http://www.merriam-webster.com/dictionary/percolating. Last accessed Jul. 16, 2010. 2 pages.
[No Author Listed] "Polymerization." Merriam-Webster Online Dictionary. 2010. Available at http://www.merriam-webster.com/dictionary/polymerization. Last accessed Jul. 16, 2010. 2 pages.
[No Author Listed] "Rheological." Merriam-Webster Online Dictionary. 2010. Available at http://www.merriam-webster.com/dictionary/rheological. Last accessed Jul. 26, 2010. 2 pages.
[No Author Listed] "Settle." Merriam-Webster Online Dictionary. 2010. Available at http://www.merriam-webster.com/dictionary/settle. Last accessed Jul. 19, 2010. 2 pages.
[No Author Listed] "Thermoplastic." Merriam-Webster Online Dictionary. 2010. Available at http://www.merriam-webster.com/dictionary/thermoplastic. Last accessed Jul. 26, 2010. 2 pages.
[No Author Listed] "Viscosity." Merriam-Webster Online Dictionary. 2010. Available at http://www.merriam-webster.com/dictionary/viscosity. Last accessed Jul. 15, 2010. 2 pages.
Aleshin et al., Transport Properties of Poly (3,4-Ethylenedioxythiophene)/Poly (Styrenesulfonate). Synthetic Metals. 1998;94:173-77.
Allen et al., LI1+xFE1–xPO4: Electronically conductive Lithium Iron Phospho-olivines with Improved Electrochemical Performance. The Proceedings of The Electrochemical Society. 2003:197-205.
Arbizzani et al., Li1.01Mn1.974 surface modification by pol(3,4-ethylenedioxythiophene). J Power Sources. 119-121:695-700.
Arbizzani et al., Li1.03Mn1.97O4 Surface Modification by Poly (3,4-Ethylenedioxithiophene). Poster presented at 11th Intl. Meeting on Lithium Batteries. Monterey, CA. Jun. 23-28, 2002.
Armand et al., Poly-Ethers as Solid Electrolytes. Proceedings of the Intl. Conference on Fast Ion Transport in Solids, Electrodes and Electrolytes. Vashishta et al., eds. Lake Geneva, WI. 1979:131-36.
Bouridah et al., Poly(Dimethylsiloxane)-Poly(Ethylene Oxide) Based Polyurethane Networks Used as Electrolytes in Lithium Electrochemical Solid State Batteries. Solid State Ionics. 1985;15:233-40.
Broadhead et al., Chapter 2. Electrochemical Principles and Reactions. Handbook of Batteries. 1995:2.1-2.35.

Chen et al., Reducing Carbon in LiFePO4/C Composite Electrodes to Maximize Specific Energy, Volumetric Energy, and Tap Density. J Electrochem Soc. 2002;148(9):A1184-89.
Chiang et al., High Capacity, Temperature-Stable Lithium Aluminum Manganese Oxide Cathodes for Rechargeable Batteries. Electrochem and Solid-State Lett. 1999;2(3):107-10.
Cho et al., Self-Assembling Colloidal-Scale Devices: Selecting and Using Short-Range Surface Forces Between Conductive Solids. Adv Funct Matter. 2007;17:379-89.
Choi et al., Determination of electrochemical active area of porous $Li_{1-\delta}CoO_2$ electrode using the GITT technique. Solid State Ionics. 1998;109:159-63.
Darling et al., Modeling a Porous Intercalation Electrode with Two Characteristic Particle Sized. J Electrochem Soc. 1997;144:4201-08.
Darling et al., Modeling Side Reactions in Composite $Li_yMn_2O_4$ Electrodes. J Electrochem Soc. 1998;145:990-98.
Doyle et al., Analysis of capacity-rate data for lithium batteries using simplified models of the discharge process. J Appl Electrochem. 1997;27:846-56.
Doyle, Design and Simulation of Lithium Rechargeable Batteris. Ph.D. Thesis. Unversity of California, Berkeley. 1995. 370 pages.
Doyle et al., Modeling of Galvanostatic Charge and Discharge of the Lithium/Polymer/Insertion Cell. J Electrochem Soc. 1993;140:1526-33.
Ehrlich, Chapter 35. Lithium-Ion Batteries. Handbook of Batteries. $3^{rd}$ ed. 2002:35.1.
Elliott, Physics of Amorphous Materials. Longman Group Limited. 1993. 200 pages.
French et al., Full Spectral Calculation of Non-Retarded Hamaker Constants for Ceramic Systems from Interband Transition Strengths. Solid State Ionics. 1995;75:13-33.
French, Origins and Applications of London Dispersion Forces and Hamaker Constants in Ceramics. J Am Ceram Soc. 2000;83(9):2117-46.
Fuller et al., Simulation and Optimization of the Dual Lithium Ion Insertion Cell. J Electrochem Soc. 1994;141:1-10.
Gaubicher et al., Li/β-VOPO4: A New 4 V System for Lithium Batteries. J Electrochem Soc. 1999;146(12):4375-79.
Ghosh et al., Supramolecular Self-Assembly for Enhanced Conductivity in Conjugated Polymer Blends: Ionic Crosslinking in Blends of Poly(3,4,-Ethylenedioxythiophene)-Poly(Styrenesulfonate) and Poly(vinylpyrrolidone). Adv Mater. 1998;10(14):1097-99.
Gray, Solid Polymer Electrolytes. VCH Publishers Inc. 1991: v-245.
Guyomard et al., Li Metal-Free Rechargeable $LiMn_2O_4$/Carbon Cells: Their Understanding and Optimization. J Electrochem Soc. 1992;139:937-48.
Hadziioannou et al., Monocristaus de 19opolymers trisequences styrene/isoprene/styrene presentant la structure cylindrique. Colloid Poly Sci. 257;4:413-419.
Hart et al., 3-D Microbatteries. Electrochemistry Communications. 2003 5:120.
Huang et al., Approaching Theoretical Capacity of LiFePO4 at Room Temperature at High Rates. Electrochem Solid-State Letts. 2001;4(10):A170-72.
Idota et al., Tin-Based Amorphous Oxide: A High-Capacity Lithium-Ion-Storage Material. Science. 1997;276:1395-97.
Kuwabata et al., Charge-Discharge Properties of Composites of LiMn2O4 and Polypyrole as Positive Electrode Materials for 4 V Class of Rechargeable Li Batteries. Electrochimica Acta. 1999;44:4593.
Le Cras Et al., Lithium intercalation in Li-Mg-Mn-O and Li-Al-Mn-O spinels. Solid State Ionics. 1996;89:203-13.
Li et al., Synthesis and properties of poly(2,5,8,11,14,17,20,23-octaoxapentacosyl methacrylate)-block-poly(4-vinylpyridine). Makromol Chem. 1991;192:3043-50.
Limthongkul et al., Nanocomposite Li-Ion Battery Anodes Produced by the Partial Reduction of Mixed Oxides. Chem Mat. 2001;13:2397-402.
Linden ed., Handbook of Batteries. Second Edition. McGraw-Hill, Inc. USA. 1995:2.19.
Long et al., Three-Dimensional Battery Architectures. Chem Rev. 2004;104:4463-92.

(56) References Cited

OTHER PUBLICATIONS

Matsumoto et al., Ionic Conductivity of Dual-Phase Polymer Electrolytes Comprise of MBR-SBR Latex Films Swollen with Lithium Slat Solutions. J Electrochem Soc. 1994;141(8):1989-93.

Matsumoto et al., Vaporization of Graphite in Plasma Arc and Identification of C60 in the Deposit. J Electrochem Soc. 1992;139(1):L8-L9.

Mazouzi et al., High capacity and excellent cyclability of Nano-Silicon/CB/CMC composite anode from tailored electrode preparation. 216$^{th}$ Electrochemical Society Meeting. 2009: Abstract #417.

Meredith et al., II. Conduction in Heterogeneous Systems. In: Advances in Electrochemistry and Electrochemical Engineering. Delahey et al., eds. John Wiley& Sons. New York. 1962;2:15-47.

Milling et al., Direct Measurement of Repulsive Van Der Waals Interactions Using an Atomic Force Microscope. J Colloid & Interface Science. 1996;180:460-65.

Minett et al, Polymeric Insertion Electrodes. Solid State Ionics. 1988;28-30:1192-96.

Nagaoka et al, High Ionic Conductivity in Poly(dimethyl Siloxane-co-Ethylene Oxide) Dissolving Lithium Perchlorate. J Polymer Sci. 1984;22:659-63.

Nagarajan et al., A Mathematical Model for Intercalation Electrode Behavior. I. Effect of Particle-Size Distribution on Discharge Capacity. J Electrochem Soc. 1998;145:771-79.

Neumann et al., Negative Hamaker Coefficients. Colloid & Polymer Science. 1979;257(4):414-19.

Newman, Chapter 22. Porous Electrodes. In: Electrochemical Systems. 2$^{nd}$ Edition. Prentice Hall. Englewood Cliffs, New Jersey. 1991:450-95.

Newman et al., Theoretical Analysis of Current Distribution in Porous Electrodes. J Electrochem Soc. 1962;109:1183-91.

Ohzuku et al., Synthesis and Characterization of LiAl1/4Ni3/4O2 (R3m) for Lithium-Ion (Shuttlecock) Batteries. J Electrochem Soc. 1995;142(12):4033.

Ong et al., Double-Layer Capapcitance in Dual Lithium Ion Insertion Cell. J Electrochem Soc. 1999;146:4360-65.

Padhi et al., Phospho-olivines as Positive-Electrod Materials for Rechargeable Lithium Batteries. J Electrochem Soc. 1997;144(4):1188-94.

Pals et al., Thermal Modeling of the Lithium/Polymer Battery. I. Discharge Behavior of a Single Cell. J Electrochem Soc. 1995;142:3274-81.

Pals et al., Thermal Modeling of the Lithium Polymer Battery. II. Temperature Profiles in a Cell Stack. J Electrochem Soc. 1995;142:3282-88.

Pierson, Chapter 6. Virteous Carbon. Handbook of Carbon, Graphite, Diamond and Fullerenes-Properties, Processing and Applications. 1993;122-40.

Ravet et al., Electroactivity of natural and synthetic triphylite. J Power Sci. 2001;97-98:503-07.

Ravet et al., Improved Iron Based Cathode Material. Abstract No. 127.

Reed et al., Introduction to the Principles of Ceramic Processing. 1988:86-89.

Tarascon et al., Issues and challenges facing rechargeable lithium batteries. Nature. Nov. 15, 2001;414(6861):359-67.

Tukamoto et al., Electronic Conductivity of LiCoO2 and its Enhancement by Magnesium Doping. J Electrochem Soc. 1997;144(9):3164-68.

Vaccaro et al., Electrochemical Investigations of Alkai-Metal Intercalation Reactions in $TiS_2$: Chronoamperometric Determination of Mass and Charge Transport Properties of Liquid Electrolyte Systems, J Electrochem Soc. 1982;129:682-88.

Van Oss et al., Applications of Net Repulsive Van Der Waals Forces Between Different Particles, Macromolecules or Biological Cells in Liquids. Colloids and Surfaces. 1980;1:45-56.

Van Oss et al., Comparison Between Antigen-Antibody Binding Energies and Interfacial Free Energies. Immunological Communications. 1977;6(4):341-54.

Van Oss et al., Repulsive Van Der Waals Forces. I. Complete Dissociation of Antigen-Antibody Complexes by Means of Negative Van Der Waals Forces. Immunological Communications. 1978;8(1):11-29.

Van Oss et al., Repulsive Van Der Waals Forces. II Mechanism of Hydrophobic Chromatography. Separation Science and Technology. 1979;14(4):305-17.

Wang et al., All Solid-State Li/LixMnO2 Polymer Battery Using Ceramic Modified Polymer Electrolytes. J Electrochemical Soc. 2002;149(8):A967-72.

Yamada et al., Crystal Chemistry of the Olivine-Type Li(MnyFe1-y)PO4 and (MNyFe1-y)PO4 as Possible 4 V Cathode Materials for Lithium Batteries. J Electrochem Soc. 2001;148(8):A960-67.

Yamada et al., Optimized LiFePO4 for Lithium Battery Cathodes. J Electrochem Soc. 2001;148(3):A224-29.

Zallen et al., 4.7. Continuum Percolation and the Critical Volume Fraction. The Physics of Amorphous Materials. J Wiley & Sons, NY. 1983:183-91.

Notice of Final Rejection from Korean Patent Application No. 10-2011-7018116 issued Jul. 29, 2012.

Notice of Preliminary Rejection for Korean Patent Application No. 10-2011-7020519 issued Oct. 10, 2012.

Non Final Office Action for U.S. Appl. No. 11/108,602 mailed Jan. 15, 2009.

Non Final Office Action for U.S. Appl. No. 12/692,460 mailed Jan. 31, 2012.

Final Office Action for U.S. Appl. No. 12/692,460 mailed Jul. 25, 2012.

Non Final Office Action for U.S. Appl. No. 13/408,143 mailed Aug. 9, 2012.

Kamat et al., Self-assembled linear bundles of single wall carbon nanotubes and their alignment and deposition as a film in a dc field. J Am Chem Soc. Sep. 1, 2004;126(34):10757-62.

Kanamura et al., Electrophoretic Fabrication of Positive Electrodes for Rechargeable Lithium Batteries. Electrochem Solid-State Lett. Jun. 2000;3(6):259-262.

Canadian Office Action for Application No. 2729504 mailed Dec. 4, 2012.

Japanese Office Action for Application No. 2010-173173 mailed Jan. 4, 2013.

Chinese Office Action for Application No. CN 200880100459.1 mailed Mar. 5, 2013.

Chinese Office Action for CN 200980109947.3 mailed Jan. 28, 2013.

European Office Action for Application No. 09788703.8 mailed Feb. 14, 2013.

Non Final Office Action for U.S. Appl. No. 13/472,351 mailed Jan. 4, 2013.

Final Office Action for U.S. Appl. No. 13/408,143 mailed Jan. 24, 2013.

Advisory Action for U.S. Appl. No. 13/408,143 mailed May 14, 2013.

Yan et al., Study progress in crystal structure and energy of LiCoO2. Chinese Journal of Power Sources. Mar. 2005; 29(3):187-92. Chinese.

* cited by examiner

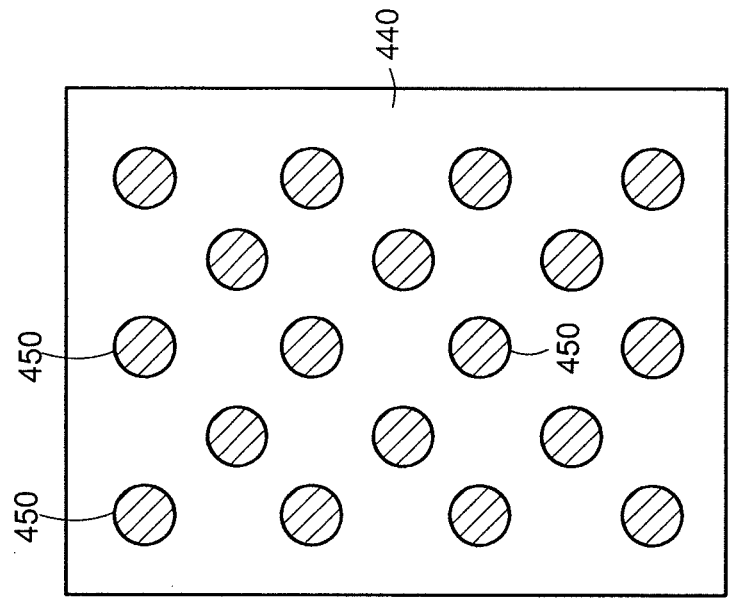
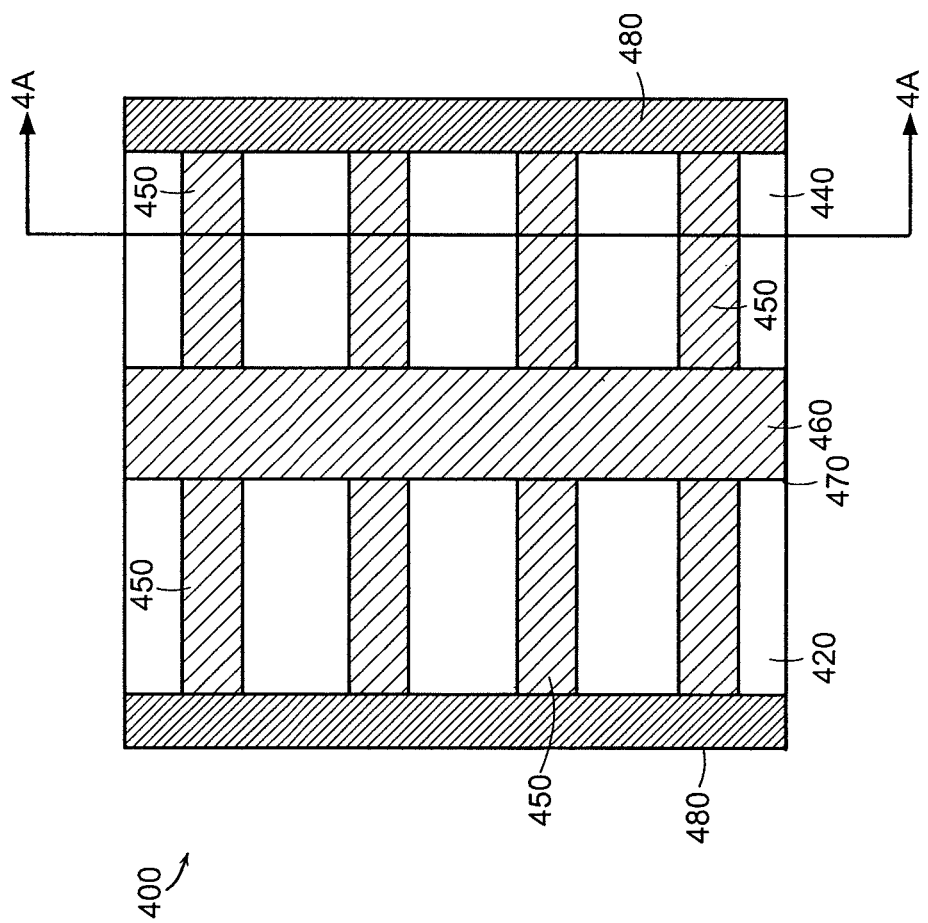

(Courtesy of Dr. H. Feil, Philips Research Labs, Eindhoven)

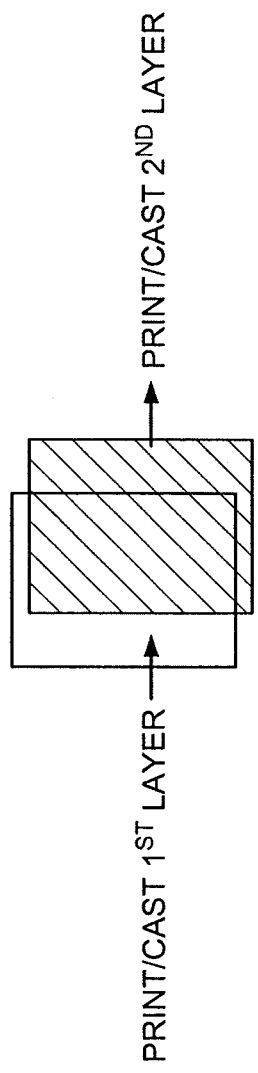
FIG. 24A
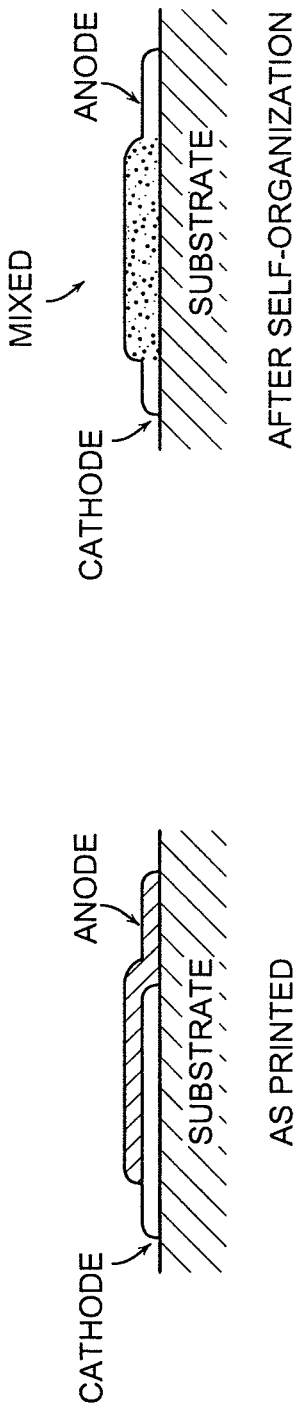
FIG. 24B
FIG. 24C

BATTERY STRUCTURES, SELF-ORGANIZING STRUCTURES, AND RELATED METHODS

RELATED APPLICATIONS

This application is a divisional of U.S. patent application Ser. No. 12/891,637, filed Sep. 27, 2010, entitled "Battery Structures, Self-organizing Structures and Related Methods," now U.S. Pat. Ser. No. 8,241,789, which is a continuation of U.S. patent application Ser. No. 12/512,421, filed Jul. 30, 2009, entitled "Battery Structures, Self-organizing Structures and Related Methods," now U.S. Pat. No. 8,168,326, which is a continuation of U.S. patent application Ser. No. 10/206,662, filed Jul. 26, 2002, entitled "Battery Structures, Self-organizing Structures and Related Methods," now U.S. Pat. No. 7,579,112, which claims the benefit of priority under 35 U.S.C. §119(e) to U.S. Provisional Patent Application No. 60/308,360, filed Jul. 27, 2001, and entitled "Self-Organizing Structures and Associated Methods," the contents of all of which are incorporated by reference. Said application ser. No. 10/206,662 is also a continuation-in-part application of U.S. patent application Ser. No. 10/021,740, now U.S. Pat. No. 7,553,584, originally filed Oct. 22, 2001, entitled "Reticulated and Controlled Porosity Battery Structures," which claims priority to provisional application serial number 60/242,124, filed Oct. 20, 2000, entitled "Microstructural Modeling of Lithium Battery Electrodes," the contents of all of which are incorporated herein by reference.

GOVERNMENT RIGHTS IN THE INVENTION

This invention was made with government support under Grant Number DE-FG02-87ER45307 awarded by the Department of Energy. The government has certain rights in the invention.

BACKGROUND OF THE INVENTION

1. Field of the Invention

The present invention relates generally to bipolar devices having graded, reticulated, porous or interpenetrating structures, and methods of making such structures. The present invention also relates to self-organizing devices, and more particularly to combinations of materials that can spontaneously form networks resulting in bipolar devices, and methods thereof.

2. Description of the Related Art

Rechargeable batteries enjoy an enormous and constantly growing global market due to their implementation in, for example, cellular telephone, laptop computers and other consumer electronic products. In addition, the development of electrically powered vehicles represents an immense potential market for these batteries.

The lithium rechargeable battery is an attractive technology due to its comparatively high energy density, low potential for environmental and safety hazard, and relatively low associated materials and processing costs. The lithium battery is charged by applying a voltage between the battery's electrodes, which causes lithium ions and electrons to be withdrawn from lithium hosts at the battery's cathode. Lithium ions flow from the cathode to the battery's anode through an electrolyte to be reduced at the anode, the overall process requiring energy. Upon discharge, the reverse occurs; lithium ions and electrons are allowed to re-enter lithium hosts at the cathode while lithium is oxidized to lithium ions at the anode, an energetically favorable process that drives electrons through an external circuit, thereby supplying electrical power to a device to which the battery is connected.

Currently known cathode storage compounds such as $LiCoO_2$ and $LiMn_2O_4$ when used with currently known anodes such as lithium metal or carbon have working voltages between 3 and 4V. For many applications a high voltage and low weight are desirable for the cathode as this leads to high specific energy. For example, for electrical vehicle applications the energy-to-weight ratio of the battery determines the ultimate driving distance between recharging.

Cathodes in state-of-the-art rechargeable lithium batteries contain lithium ion host materials, electronically conductive particles to electronically connect the lithium ion hosts to a current collector (i.e., a battery terminal), a binder, and a lithium-conducting liquid electrolyte. The lithium ion host particles typically are particles of lithium intercalation compounds, and the electronically conductive particles are typically made of a substance such as a high surface area carbon black or graphite. The resulting cathode includes a mixture of particles of average size typically on the order of no more than about 100 microns.

Anodes for rechargeable lithium-ion batteries typically contain a lithium ion host material such as graphite, electronically conductive particles to electronically connect the lithium ion hosts to a current collector (i.e., a battery terminal), a binder, and a lithium conducting liquid electrolyte. Alternatives to graphite or other carbons as the lithium ion host have been described by Idota et al., in *Science* 1997, 276, 1395, and by Limthongkul et al., in "Nanocomposite Li-Ion Battery Anodes Produced by the Partial Reduction of Mixed Oxides," *Chem. Mat.* 2001.

In such cathodes or anodes, for reliable operation, good contact between particles should be maintained to ensure an electronically conductive pathway between lithium host particles and the external circuit, and a lithium-ion-conductive pathway between lithium host particles and the electrolyte.

While numerous cathode and anode compounds have been identified and are under development, a widely used system remains the $LiCoO_2$/carbon combination first developed in the early 1990's, which has a working voltage of 3.6V. Solid polymer batteries based on polyethylene oxide (PEO) electrolyte, lithium metal anodes, and $V_2O_5$ cathodes have also been developed, but to date require elevated temperatures of 60-80° C. in order to provide sufficient power density for most applications. Lithium ion batteries based on liquid electrolytes also do not enjoy the same advantage in power density that they possess in energy density. Amongst the various rechargeable battery systems, lithium ion rechargeable have the highest energy density (typically 150 Wh/kg and 350), but comparable power densities to competing battery technologies such as Ni—Cd and Ni-MH. Energy density is intrinsically determined by the storage materials; the cell voltage being determined by the difference in lithium chemical potential between cathode and anode, while the charge capacity is the lithium concentration that can be reversibly intercalated by the cathode and anode. Power density, on the other hand, is a transport-limited quantity, determined by the rate at which ions or electrons can be inserted into or removed from the electrodes. Currently, a major limitation to the widespread use of lithium ion technology in hybrid and electric vehicles is insufficient power density and the high cost of $LiCoO_2$.

The realizable energy and power density are enormously influenced by battery design, however. An electrode in a lithium battery that is too thick can limit discharge rate because ion transport in and out of the electrode can be rate limiting. Thus, typical high power density rechargeable batteries are of laminate construction and typically use electrodes that are of a composite mixture of active material, binder, and conductive additive. The thickness of the laminate cathode in a lithium-ion battery is typically 100-200 µm. Currently the "cell stack" consisting of two metal foil current collectors, anode, separator, and cathode, is ~250 µm thick.

Energy density then suffers because the electrolyte, separator, and current collectors occupy a higher volume and contribute to a greater mass relative to the active material of the electrodes. Moreover, due to the need to maximize the packing density of storage material (for high energy density), the electrolyte-filled pore channels of the composite electrode are made to be tortuous and limited in cross-sectional area. Models and experiments have demonstrated that the rate-limiting transport step is in most instances $Li^+$ ion diffusion through the liquid-filled pore channels of the composite electrode.

Solid polymer electrolytes have been described Armand et al., in "*Fast Ion Transport in Solids*", P. Vashishta, J. N. Mundy and G. K. Shenoy, Eds., North-Holland, Amsterdam (1979), p. 131, describe the use of poly(ethylene oxide) and other polyetheres doped with various alkali metal salts as solid polymer electrolytes for battery applications. Subsequently, a great variety of ionically conductive solid polymer electrolytes based on a variety of lithium-ion complexing polymers have been reported (see, e.g., F. M. Gray, "*Solid Polymer Electrolytes Fundamentals and Technological Applications*", VCH, New York (1991). More recently, detailed performance characteristics of an all-solid-state $Li_xMnO_2/Li$ polymer battery system were reported by Sakai et al., in the *Journal of Electrochem. Soc.* 149 (8), A967 (2002).

High aspect ratio electrodes are described by Narang et al. in U.S. Pat. No. 6,337,156. Aspect is achieved by the use of aspected particles or flakes, which generally provide structures with inadequate geometry to meaningfully improve energy or power density.

SUMMARY OF THE INVENTION

In one aspect of the invention, an electrochemical device is provided that maximizes electrode interface area with the ionically conductive medium and minimizes the distance or path length that ions and/or electrons must reliably traverse during operation of the device.

The electrochemical device includes a first electrode in electronic communication with a first current collector, a second electrode in electronic communication with a second current collector, and an ionically conductive medium in ionic communication with said first and second electrodes. The first and second electrodes form an interpenetrating network and at least one of the first and second electrodes is structured to provide two or more pathways to its respective current collector.

By "interpenetrating" is meant that the first and second electrodes each form networks that are continuous in two or three dimensions and that each electrode extends into the other to a distance greater than the smallest lateral dimension of the entities comprising the networks. By way of example, the two electrodes can exhibit complementary geometries that form interlocking, infused or interdigitated structures or where a first material permeates into voids or spaces formed in the other material. In some embodiments, the nature of the interpenetration is such that it is irreversible, that is, separation of the opposing electrodes is prevented by the interpenetrating network. In some embodiments, the nature of the interpenetration is such that the network provides multiple pathways to the current collector. In one class of interpenetrating structures, separation without a change in the shape or connectivity of an electrode is prevented by the topology of the interpenetrating network. An interpenetrating network may include some or all of these features.

In another aspect of the invention, an electrochemical device includes first and second electrodes separated from one another by an ionically conductive medium. The device has a total thickness of greater than about 0.1 mm and the ionically conductive medium separating the first and second electrodes is no greater than 1 micron at at least one location along an interface between the first and second electrodes. Thus, for the first time a bulk battery is described having inter-electrode spacings that are typical of thin film batteries. This allows higher energy densities, higher power densities, or longer cycling life to be obtained compared to conventional laminated bulk batteries known as lithium ion, lithium polymer, or lithium gel polymer batteries. For example, the length scale for power density is on the order of 1 micron for Li ion transport through electrolyte as compared to about 100 microns for conventional laminated bulk batteries. Compared to thin film batteries, batteries of much higher total energy and power, and in shapes or form factors not possible with thin film batteries, are obtained.

In one embodiment, an article includes a medium, a plurality of first electronically-conductive particles dispersed in the medium and a plurality of second electronically-conducting particles dispersed in the medium, wherein the first and second electronically-conductive particles are self-attracting and the first and second electronically-conducting particles each exert a mutually repelling force on each other.

In one embodiment, a method for producing a bipolar device includes providing an interpenetrating system comprising an electronically-insulating medium, a first network of electronically-connected particles of a first type and a second network of second electronically-connected particles of a second type; segregating at least a portion of the particles of the first type into a first spatial region that is essentially free of the second network; and segregating at least a portion of the particles of the second type into a second spatial region that is essentially free of the first network.

In one embodiment, an electrochemical device includes first and second electrodes separated from one another by an electrolyte, wherein the first and second electrodes approach one another such the diffusion path between electrodes is sufficiently small that the electrolyte has an ionic conductivity of less than $10^{-4}$ S/cm.

In one embodiment, an electrochemical device has a power density of greater than 300 W/kg and an energy density of greater than 450 W-h/1 for cells having a cell thickness less than ~0.1 mm, wherein the cell thickness includes the collectors. In one embodiment, an electrochemical device has a power density of greater than 300 W/kg and an energy density of greater than 550 W-h/1 cells having a cell thickness less than ~0.1 mm, wherein the cell thickness includes the collectors.

An electrochemical device includes first and second electrodes separated from one another by an ionically conductive medium, wherein said first and second electrodes form an interpenetrating network said interpenetrating network having a structure or composition such that the electronic conductivity at a location further from the ionically conductive medium is greater than the electronic conductivity at a location closer to the ionically conductive medium.

In one embodiment, an electrochemical device includes first and second electrodes separated from one another by an ionically conductive medium, wherein said first and second electrodes form an interpenetrating network said interpenetrating network having a structure or composition such that the electronic conductivity of one electrode network at a location further from the opposing current collector is greater than the electronic conductivity of same electrode network at a location closer to the opposing current collector.

In one embodiment, an electrochemical device, includes first and second electrodes separated from one another by an ionically conductive medium, wherein said first and second electrodes form an interpenetrating network said interpenetrating network having a structure or composition such that the electronic conductivity of each electrode network at a location further from the opposing current collector is greater than the electronic conductivity of each electrode network at a location closer to the opposing current collector.

In one embodiment, an electrochemical device includes a cathode and an anode separated from one another by an electrolyte layer, wherein the electrolyte layer has a thickness of less than one micron at at least one point and the ratio of the anode dimension perpendicular to the electrolyte layer to the electrolyte thickness to the cathode dimension perpendicular to the electrolyte layer is about 20:1:20.

In one embodiment, an electrochemical device includes a cathode and an anode separated from one another by an electrolyte layer, wherein the electrolyte layer has a thickness of less than one micron at at least one point and the ratio of the anode dimension perpendicular to the electrolyte layer to the average electrolyte thickness to the cathode dimension perpendicular to the electrolyte layer is about 10:1:10. An electrochemical device includes a cathode and an anode separated from one another by an electrolyte layer, wherein the electrolyte layer has a thickness of less than one micron at at least one point and the ratio of the anode dimension perpendicular to the electrolyte layer to the average electrolyte thickness to the cathode dimension perpendicular to the electrolyte layer is about 5:1:5.

An electrochemical device has power density of greater than 300 W/kg and an energy density of greater than 450 W-h/l.

An electrochemical device has power density of greater than 300 W/kg and an energy density of greater than 550 W-h/l.

In one embodiment, an electrochemical device includes first and second electrodes separated from one another by an ionically conductive medium, wherein said first and second electrodes form an interpenetrating network with a power density of greater than 300 W/kg and an energy density of greater than 450 W-h/l.

In another embodiment, a bipolar article includes an organized structure comprising a first component, a second component and a third component, wherein the first, second and third components are selected so that the first and third components exert a repelling force on each other when the first, second and third components are combined.

In one embodiment, an interpenetrating network includes a medium, a first network comprising a plurality of first electronically connected particles dispersed in the medium, a second network comprising a plurality of second electronically connected particles dispersed in the medium.

In one embodiment, an interpenetrating network includes a medium; a first network comprising a plurality of first electronically-connected particles dispersed in the medium; a second network comprising a plurality of second electronically-connected particles dispersed in the medium; and wherein a first Hamaker constant characterizing the interaction between the first and the second component in the medium is negative.

In one embodiment, a bipolar device includes an interpenetrating network in which each continuous component of the interpenetrating network is each attached to a separate current collector.

In one embodiment, a bipolar device includes a first material and a second material, each selected such that the first material and the second material exert a mutually repelling force when dispersed in a medium.

A method also provide by forming a bipolar article by introducing a first component comprising a plurality of first sub-components that are self-attractive; and introducing a second component comprising a plurality of second sub-components that are self-attractive and that exert a repelling force on the first component in a medium.

An article includes a plurality of first particles dispersed in a medium; and a plurality of second particles dispersed in the medium, the second particles including a coating that comprises a material that exerts a repelling force on the first particles.

An article includes a first network of first electronically-connected particles dispersed with a second network of second electronically-connected particles in a medium, the first and second particles exerting a mutually repelling force.

An article also includes a medium, a plurality of first electronically-conductive particles dispersed in the medium and a plurality of second electronically-conducting particles dispersed in the medium, wherein the first and second electronically-conductive particles are self-attracting and the first and second electronically-conducting particles each exert a mutually repelling force on each other.

A method for producing a bipolar device is provided including providing an interpenetrating system comprising an electronically-insulating medium, a first network of electronically-connected particles of a first type and a second network of second electronically-connected particles of a second type; segregating at least a portion of the particles of the first type into a first spatial region that is essentially free of the second network; and segregating at least a portion of the particles of the second type into a second spatial region that is essentially free of the first network.

In one embodiment, the present invention provides an energy storage device comprising at least one reticulated electrode in ionic contact with an electrolyte.

In another embodiment, the present invention provides an energy device comprising a first electrode having features defining a plurality of extensions into an electrolyte matrix.

In another embodiment, the present invention provides a bipolar device. The bipolar device comprises a first electrode having a first set of protuberances extending into an electrolyte and a second electrode having a second set of protuberances constructed and arranged to be complementary to the first set of protuberances.

In another embodiment, the present invention provides an electrode comprising a framework having a porous network defined therein.

In another embodiment, the present invention provides a battery. The battery comprises a first electrode, a second electrode, a first current collector in electronic communication with the first electrode and a second current collector in electronic communication with the second electrode. The first electrode includes a portion, positioned between the first current collector, and a second electrode, having a porosity that increases in a direction from the first current collector toward the second electrode.

In another embodiment, the present invention provides an apparatus comprising a first electrode having a first mating surface for positioning proximate an opposing electrode, the mating surface reticulated so as to define a plurality of protrusions and intervening indentations providing a surface area at least 1.5 times the theoretical surface area of the first mating surface in a smooth, non-reticulated configuration.

In another embodiment, the present invention provides an electrode comprising a plurality of channels defined therein and constructed and arranged to allow diffusion of an ionic species from an electrolyte to a surface thereof.

In another embodiment, the present invention provides a battery comprising an electrode in contact with an electrolyte and having a plurality of channels defined therein, the channels constructed and arranged to allow diffusion of an ionic species from the electrolyte to a surface thereof.

In another embodiment, the present invention provides a battery comprising at least one perforated electrode in ionic communication with an electrolyte.

In another embodiment, the present invention provides a bipolar device comprising a porous electrode that is free of polymer binder.

In another embodiment, the present invention provides a bipolar device comprising a porous electrode that is free of carbon additive.

In another embodiment, the present invention provides a method for facilitating providing energy. The method comprises the step of providing a battery comprising a first electrode, a second electrode, a first current collector in electronic communication with the first electrode and a second current collector in electronic communication with the second electrode, wherein the first electrode includes a portion, positioned between the first current collector and the second electrode, having a porosity that increases in a direction from the first current collector toward the second electrode.

In one embodiment, the present invention relates to a bipolar article. The bipolar article comprises an interpenetrating network comprising a first component, a second component and a third component. The first, second and third components can be selected so that the first and third components exert a repelling force on each other when the first, second and third components are combined.

In another embodiment, the present invention relates to an interpenetrating network. The interpenetrating network comprises a medium, a first network comprising a plurality of first electronically connected particles dispersed in the medium, a second network comprising a plurality of second electronically connected particles dispersed in the medium.

In another embodiment, the present invention relates to an interpenetrating network. The interpenetrating network comprises a medium, a first network comprising a plurality of first electronically-connected particles dispersed in the medium, a second network comprising a plurality of second electronically-connected particles dispersed in the medium, wherein a first Hamaker constant characterizing the interaction between the first and the second component in the medium is negative.

In another embodiment, the present invention relates to a bipolar device comprising a first material and a second material, each selected such that the first material and the second material exert a mutually repelling force when dispersed in a medium.

In another embodiment, the present invention is directed to a method comprising the steps of forming a bipolar article by introducing a first component comprising a plurality of first sub-components that are self-attractive and introducing a second component comprising a plurality of second sub-components that are self-attractive and that exert a repelling force on the first component in the medium.

In another embodiment, the present invention relates to an article comprising a plurality of first particles dispersed in a medium and a plurality of second particles dispersed in the medium and comprising a coating that comprises a material that exerts a repelling force on the first particles.

In another embodiment, the present invention relates to an article comprising a first network of first electronically-connected particles dispersed with a second network of second electronically-connected particles in a medium, the first and second particles exerting a mutually repelling force.

In another embodiment, the present invention relates to an article comprising a medium, a plurality of first electronically-conductive particles dispersed in a medium and a plurality of second electronically-conducting particles dispersed in the medium, wherein the first and second electronically-conductive particles are self-attracting and the first and second electronically-conducting particles each exert a mutually repelling force on each other.

In another embodiment, the present invention is directed to a method for producing a bipolar device. The method comprises the steps of providing an interpenetrating system comprising an electronically-non-conducting medium, a first network of first electronically-connected particles and a second network of second electronically-connected particles, segregating at least a portion of the first particles into a first spatial region that is essentially free of the second network and segregating at least a portion of the second particles into a second spatial region that is essentially free of the first network.

In another embodiment, the present invention relates to a capacitor comprising a first pole comprising a first material and a second pole comprising a second material, the first pole separated from the second pole by an electronically-insulating material, the combination of the insulating, first and second materials providing a Hamaker constant that is negative.

In other embodiment, the present invention relates to an electrochromic device compromising a first pole compromising a first material and a second pole compromising a second material, at least one of which changes its color or optical transmission when oxidized or reduced, the first pole separated from the second pole by an electronically-insulating material, the combination of the first, insulating, and second materials providing a Hamaker constant that is negative.

In another embodiment, the present invention provides an energy storage device comprising a first electrode comprising a first material and a second electrode comprising a second material. The first and second materials form an interpenetrating network when dispersed in an electrolyte. The electrolyte, the first material and the second material are selected so that the first and second materials exert a repelling force on each other when combined.

In another embodiment, the present invention is directed to a method for producing a bipolar device. The method comprises the steps of providing a medium with an interpenetrating system comprising a first network of first electronically-connected particles and a second network of second electronically-connected particles and providing a first current collector comprising particles that exert an attractive force on the first electronically-connected particles and a repelling force on the second electronically-connected particles.

In another embodiment, the present invention provides a bipolar article comprising an interpenetrating network comprising a first component, a second component and a third component, wherein the first and third components are substantially electronically isolated from one another in the absence of a voltage difference externally applied between the first and third components.

In another embodiment, the present invention relates to an article comprising a plurality of first particles, a plurality of second particles and a medium, the combination providing a repelling force between the first and second particles.

In one embodiment, a capacitor is provided including a first pole comprising a first material and a second pole comprising a second material, the first pole separated from the second pole by an electronically-insulating material, the combination of the insulating, first and second materials providing a Hamaker constant that is negative.

An electrochromic device is provided including a first pole comprising a first material and a second pole comprising a second material, at least one of which changes its color or optical transmission when oxidized or reduced, the first pole being separated from the second pole by an electronically-insulating material, and the combination of the first, insulating, and second materials providing a Hamaker constant that is negative.

Other advantages, novel features, and objects of the invention will become apparent from the following detailed description of the invention when considered in conjunction with the accompanying drawings, which are schematic and which are not intended to be drawn to scale. In the figures, each identical, or substantially similar component that is illustrated in various figures is represented by a single numeral or notation. For purposes of clarity, not every component is labeled in every figure. Nor is every component of each embodiment of the invention shown where illustration is not necessary to allow those of ordinary skill in the art to understand the invention.

BRIEF DESCRIPTION OF THE DRAWING

Preferred, non-limiting embodiments of the present invention will be described by way of examples with reference to the accompanying figures, in which:

FIG. 4 is a schematic illustration showing a bipolar device having a perforated structure according to another embodiment of the present invention;

FIG. 24 is a schematic illustration of an overlapping-layer self-organized battery according to one or more embodiments of the invention;

DETAILED DESCRIPTION OF THE INVENTION

To improve the intrinsic capacity and transport properties of electrochemically active oxides, microstructural features of the electrode are used to (i) increase the volume fraction of active materials and (ii) reduce the length scale of ion transport through the electrolyte. Accordingly, the microstructures of components in such systems are tailored to optimize desirable properties and minimize the undesirable ones. Realizable energy and power densities are typically influenced by system design, including, for example, component arrangement and selection, which is optimized for desirable performance.

A lithium ion battery will be used to generally describe the various aspects of the present invention. The description of such a lithium ion bipolar device is meant to be exemplary and the use of the various features and aspects of the present invention to other systems is considered to be within the scope of the present invention. The below described reticulated, interpenetrating, perforated or controlled porosity structures can be used for energy storage or energy conversion systems including but not limited to primary (disposable) and secondary (rechargeable) batteries, capacitors and hybrid electrochemical capacitors.

Figure 1:
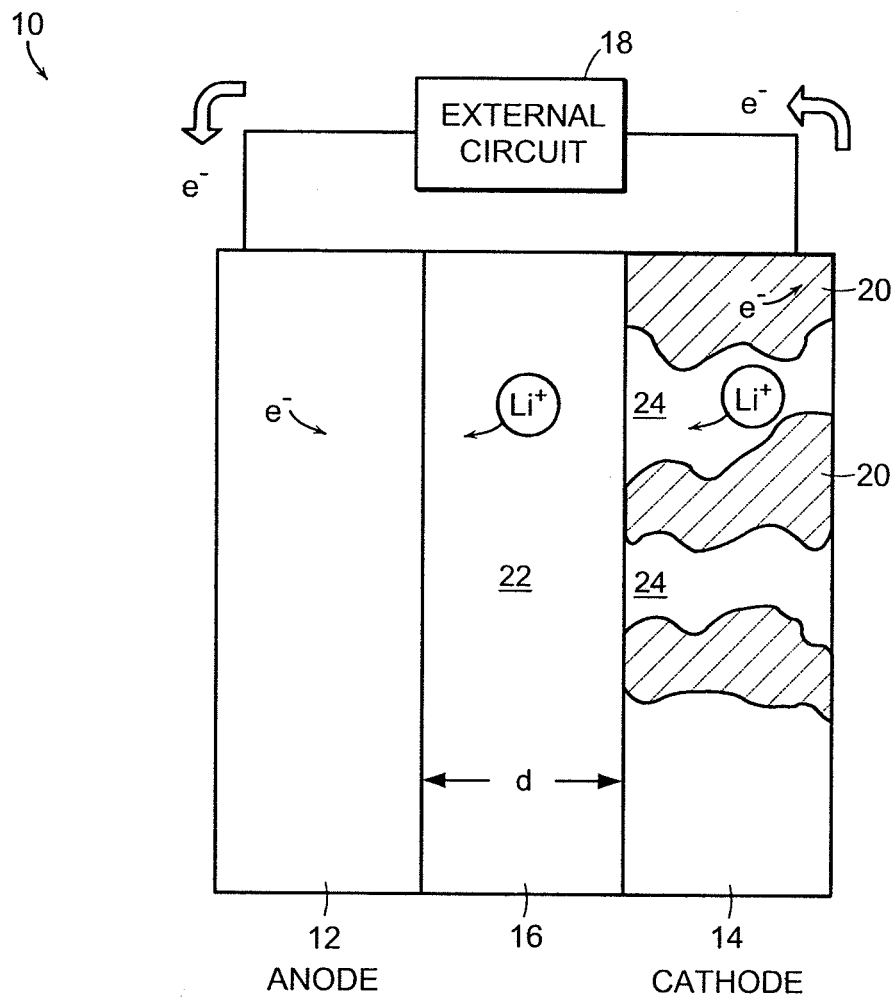
FIG. 1 is a schematic illustration showing an anode/cathode system that can be used in accordance with the present invention, shown here in charging mode.

A bipolar device according to one embodiment of the present invention is schematically depicted in FIG. 1. The bipolar device 10 can be an energy storage system having a cathode 14 and anode 12 that are spaced apart from each other by spacer region 22, and an electrolyte 16. A carbonaceous conducting additive and an electrolyte material can be added to the energy storage material, lithium cobalt oxide, for example, to improve the electronic and ionic conductivity. Energy storage devices according to the present invention, such as but not limited to lithium ion batteries, can be based on liquid electrolytes. For example, the typical lithium battery has a lithium foil or a composite carbon anode, a liquid electrolyte with a lithium salt and a composite cathode.

The lithium battery can be charged by applying a voltage between the electrodes 12 and 14, which causes lithium ions and electrons to be withdrawn from lithium hosts at the battery's cathode. Lithium ions flow from cathode 14 to anode 12 through electrolyte 16 to be reduced at the anode. During discharge, the reverse occurs; lithium ions and electrons enter lithium hosts 20 at cathode 14 while lithium is oxidized to lithium ions at anode 12, which is typically an energetically favorable process that drives electrons through an external circuit 18, thereby supplying electrical power to a device to which the battery is connected. To improve operation, the electrode should provide fast transport for both electrons and lithium ions.

Thus, during battery operation, for example, lithium ions pass through several steps to complete the electrochemical reaction. Typically, the steps include dissolution of lithium at the anode surface, which typically releases an electron to the external circuit; transport of the lithium ions through the electrolyte (which can reside in pores of a separator and, with porous electrodes, in the electrodes' pores); transport of the lithium ions through the electrolyte phase in a composite cathode; intercalation of lithium into the active cathode material, which typically receives electrons from the external circuit; and diffusion of lithium ions into the active material.

The transport of lithium through and its dissolution from the anode, its transport through the electrolyte and the intercalation reaction at the cathode-electrolyte interface and the transport of lithium through the solid active material can be thermally activated and can be generally characterized by reaction kinetics. In some embodiments, the interface reactions, typically occurring at the electrode-electrolyte interface, are believed to be relatively fast at room temperature and, thus, not necessarily rate-limiting. Nevertheless, such reactions can be accelerated by increasing the surface area of the reaction and/or by reducing the particle size of the intercalation material. Since the diffusion (transport) of lithium through the electrolyte layer can be a rate-limiting step, the lithium ion transport between the opposite-polarity electrodes is facilitated by a decrease in the electrolyte layer thickness.

Ion transport in the electrolyte typically occurs in two regions, the separator region 22 and the electrode region 24. In the former, generally, no electrochemical reactions occur and transport phenomena can be governed by the separator physical properties. The rate associated with this phenomenon can be reduced by designing or optimizing separator physical properties or by minimizing the transport distance across the separator. In the latter, ion transport can occur through the electrolyte-filled pore channels or network structures of the electrode. The ion transport can be affected by, for example, the tortuosity of the average ion transport path. In some systems, the ionic current changes with electrode depth because of the electrochemical reaction.

The effective ionic conductivity in a composite structure 12 or 14 is believed to decrease rapidly with decreasing pore volume fraction, since the pores are filled with ion conducting electrolyte. Accordingly, in one embodiment, the present invention provides an electrode structure 12 or 14 that favors or promotes ion transport. For example, according to one or more embodiments, the present invention provides a system comprising lamellar particles arranged to be substantially parallel to the direction of current flow. With such a lamellar microstructure, the volume fraction of active material can be increased without reducing ionic conductivity.

According to one or more embodiments, the present invention provides a bipolar device 10 having a design in which the current collector and electrolyte mass is minimized while the anode and cathode structures mass are maximized. In one embodiment, the diffusion length, d, or path that ions must traverse is minimized and the interfacial area exposed to the ions or electrons is maximized. That is, in one or more embodiments, the system can include components or structures that can be reticulated, interdigitated, interpenetrating or that act as a reticulated, interdigitated or interpenetrating interface so that an interface area can be increased. In this way, the increased interfacial perimeter increases the available sites for reaction of, for example, ionic species.

Figure 2A:
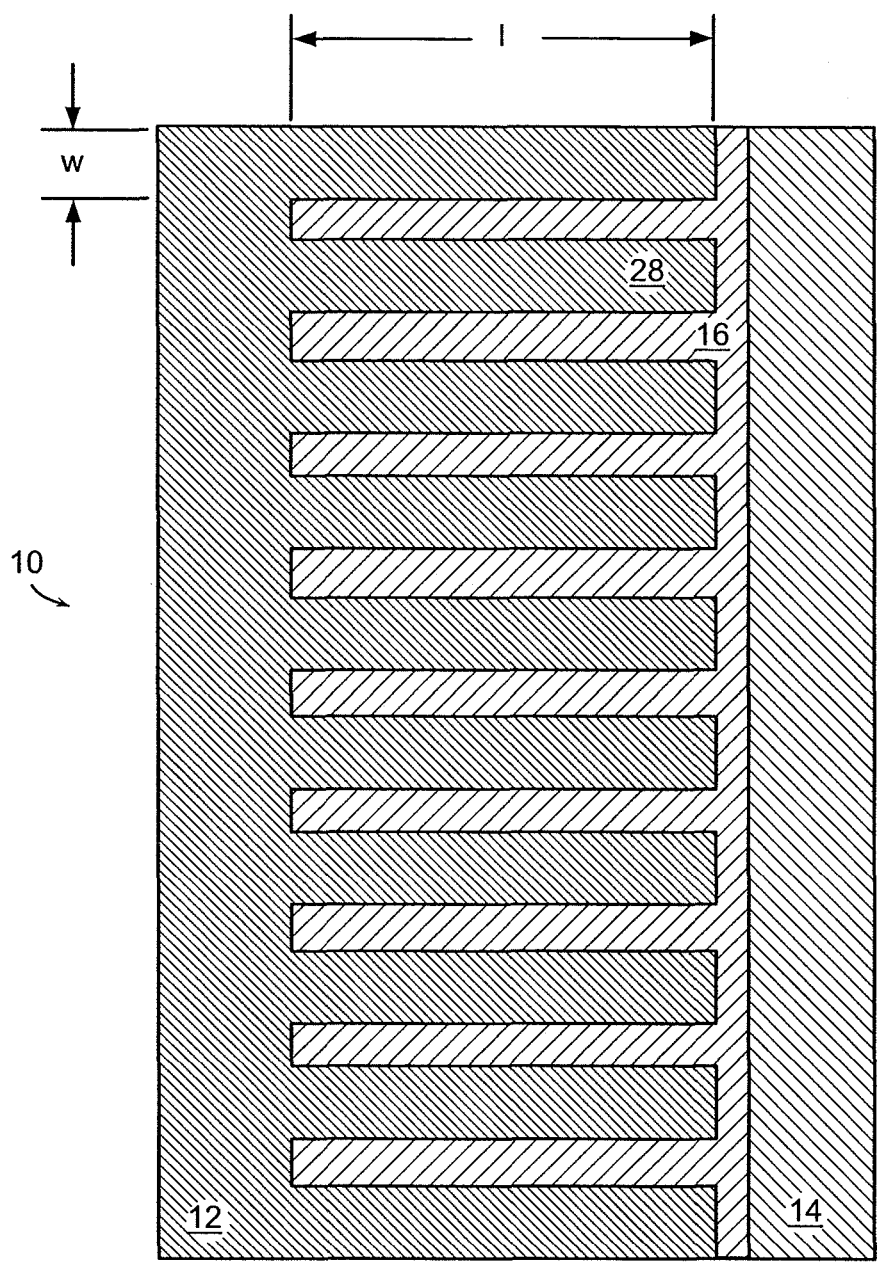
FIG. 2A-2D are schematic (cross-section) illustrations showing bipolar devices with various reticulated electrodes according to another embodiment of the present invention.
Figure 2B:
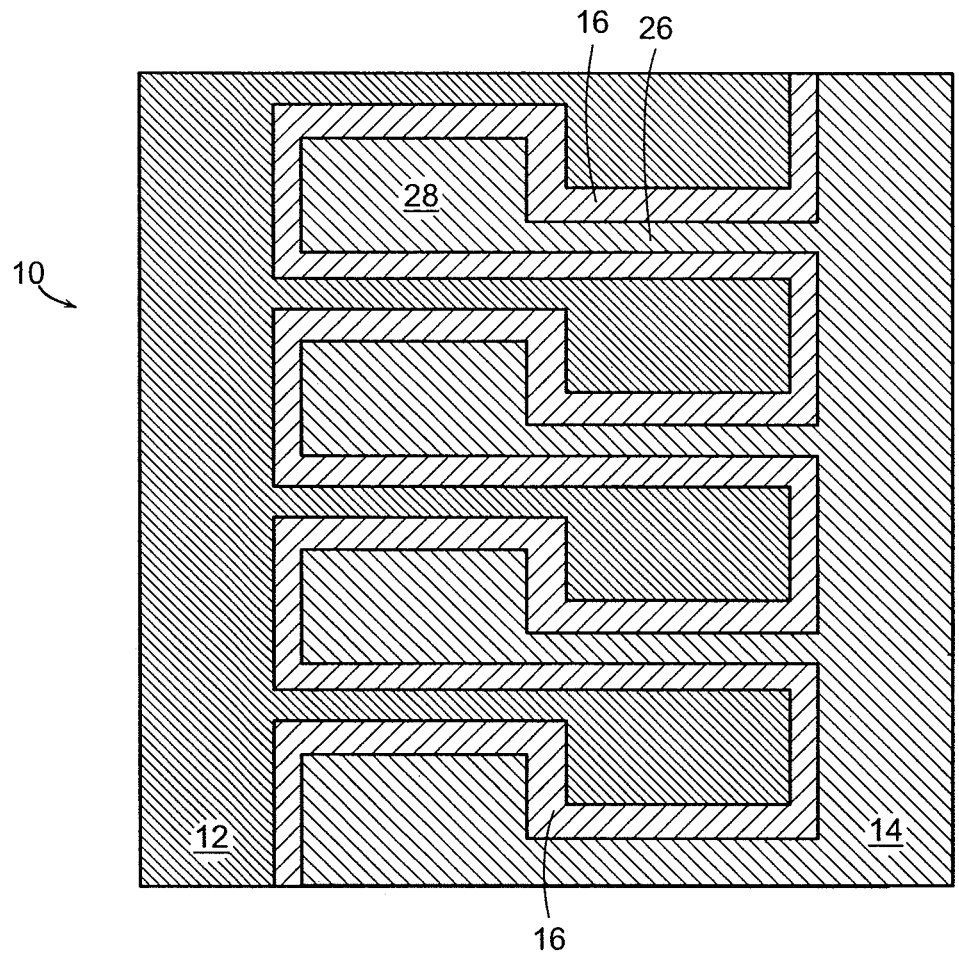
Figure 2C:
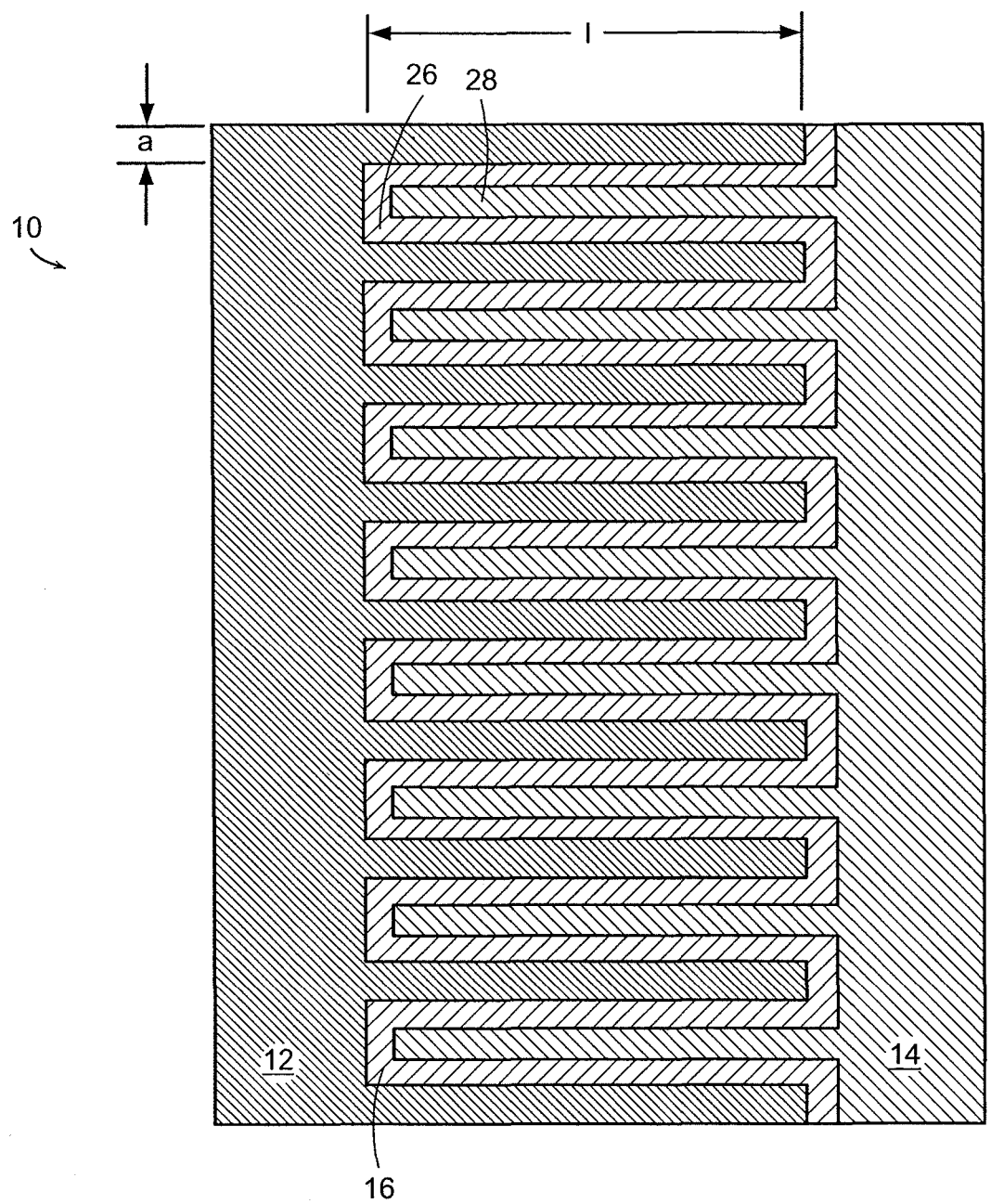
Figure 2D:
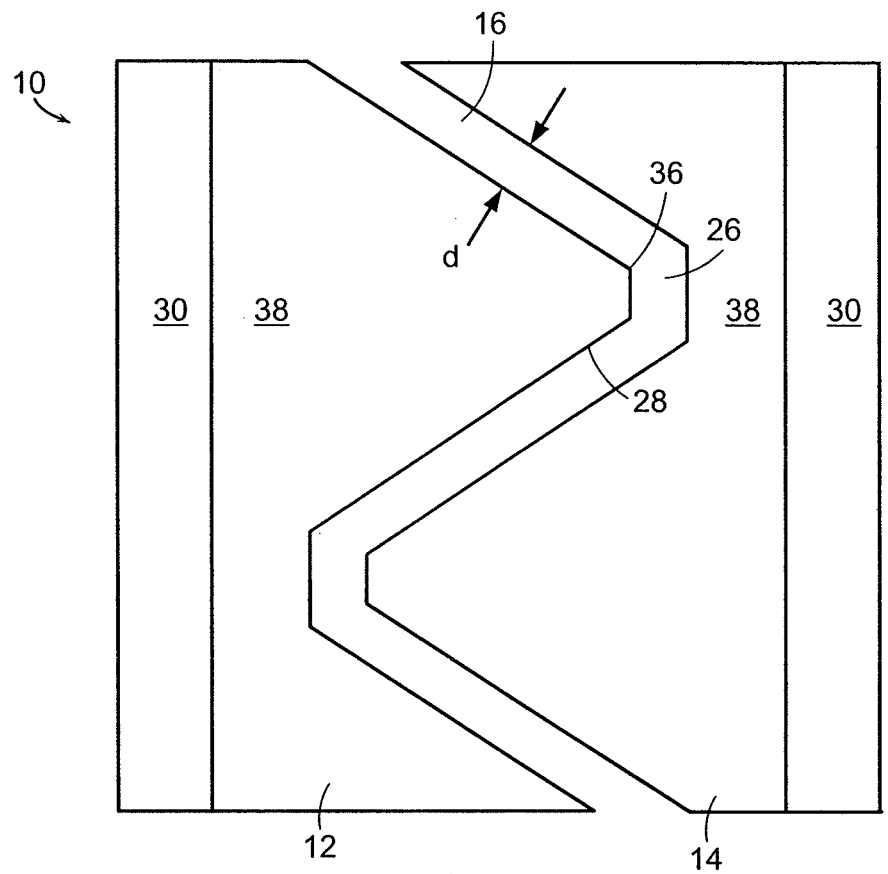

Many different reticulation patterns can be used according to one or more embodiments of the present invention including the reticulated structures shown schematically in FIGS. 2A-2D. In one embodiment, the aspect ratio l/w of this feature can be varied where l is the length of a protrusion (or indentation), described below, and w is its width or thickness. Width and/or thickness are also referred to as lateral dimensions of the electrode. Such a bipolar device can be fabricated by a variety of methods or procedures, as described below. In FIG. 2A, system 10 has a reticulated anode 12 having a plurality of extensions 28 extending into and in ionic communication with electrolyte matrix 16. In this embodiment, cathode 14 is shown as non-reticulated. Similarly, according to another embodiment, FIG. 2B shows system 10 having a reticulated anode 12 and a reticulated cathode 14, each having protrusions 28 and complementary indentations 26 that are separated from each other at a uniform distance. Anode 12 and cathode 14 can be in ionic and/or electronic communication with electrolyte 16. As for the device of FIG. 2A, one of electrodes 12 or 14 can be non-reticulated. In FIG. 2C, system 10 has complementary reticulated structures 12 and 14, each being interdigitated, the reticulations having a length, l, and a width or thickness, a. In FIG. 2D, system 10 has reticulated structures 12 and 14, each in electronic communication with a current collector 30. The reticulations form convexities 28 that are at a separation distance, d, from correspondingly-shaped concavities 26. The concavities and convexities provide a surface that has an increasing lateral cross-sectional area at locations approaching the current collector. The increased cross-sectional area may serve to increase the current carrying capacity of the electrode near the current collector.

In the present invention, "reticulated interface" or "interdigitated electrode" refers to a structure such as a positive and/or a negative electrode 12 and 14, each of which has a morphology such that the surface exposed is reticulated, having convexities 26 or protrusions 28 and, correspondingly, concavities or indentations, sufficient to produce features with a thickness or width (e.g., a lateral dimension) that are less than the maximum thickness or width of each electrode. Such features may be periodic and regularly spaced or aperiodic or random. The morphology of the structures exhibit shape complementary of one another, such that where one electrode has a protrusion, the other tends to have an indentation of similar shape and dimension. The positive and negative electrode can be separated everywhere along their "mating" interface by a layer or region of electrolyte 16. In some embodiments, especially with respect to systems with shape complementary structures, the layer of electrolyte 16 can be thin and can have a relatively uniform thickness. The electrodes can be connectable to a current collector 30 and/or the positive and negative electrodes can serve as their own current collector.

In one or more embodiments, an electrochemical cell is provided that has low impedance and thus high power density in which the electronic conductivity of the anode and cathode networks is selected based on the ionic conductivity of the electrolyte. With reference to FIG. 2A for a lithium ion system, the following relationship provides a basis for selecting a network conductivity for a specified electrode geometry:

$$\sigma_e > \sigma_{Li} * L_b^2 / w_b * a$$

where $\sigma_e$ is the electronic conductivity of the active material, $\sigma_{Li}$ is the ionic conductivity of lithium through the electrolyte, $L_b$ is the length 1 of the electrode protrusion 28, a is the electrode thickness and $w_b$ is the width of the electrode extension. Thus, the dimensions of the electrode are dictated by both the component dimensions and material properties.

In one or more embodiments, the ionic and electronic conductivity are balanced by using an active material having a high electronic conductivity. In one or more embodiments, the electronic conductivity is tapered or graded so that the anode or cathode is in an environment of excess lithium ion. This can be accomplished by altering the geometry of the electrode so that the fraction (volume percent) of the active material (and optionally conductive additive) is greater at the base (closest to the current collector) than near the separator. By providing balanced electronic and ionic conductivities, the power density levels can be optimized. An electrochemical device with a power density of greater than 300 W/kg and an energy density of greater than 450 W-h/l is achievable.

In one or more embodiments, the structures have a mating surface that is reticulated with a surface area that is at least 1.25 or at least 1.5 times the theoretical surface area of a smooth, non-reticulated structure, or the reticulated surface area is at least about 2.5 times, or at least about 3 times, or at least 4 times, or at least about 5 times, or 6 or 12 times. The theoretical surface area of a smooth, non-reticulated structure is understood to be the projected area of the reticulated surface onto a plane.

In one or more embodiments, the reticulations have an aspect ratio that is at least about 2, or at least about 2.5, or at least about 3.0, or at least about 3.0, or at least about 4.0, or at least about 5.0. The higher aspect ratio of the reticulations e.g., component dimensions, may be used to achieve the conductivity balance discussed above.

In one or more embodiments, the protrusions and indentations are separated by an average distance of less than about 100 microns. In one or more embodiments, the separation distance is less than about 50 microns, or less than 25 microns, or less than about 10 microns, or less than about 5 micron, or 2.5 micron or about 1 micron. In one or more embodiments, the electrolyte spacing is less than 10 microns or less than one micron in at least one location along the mated interface.

Figure 3:
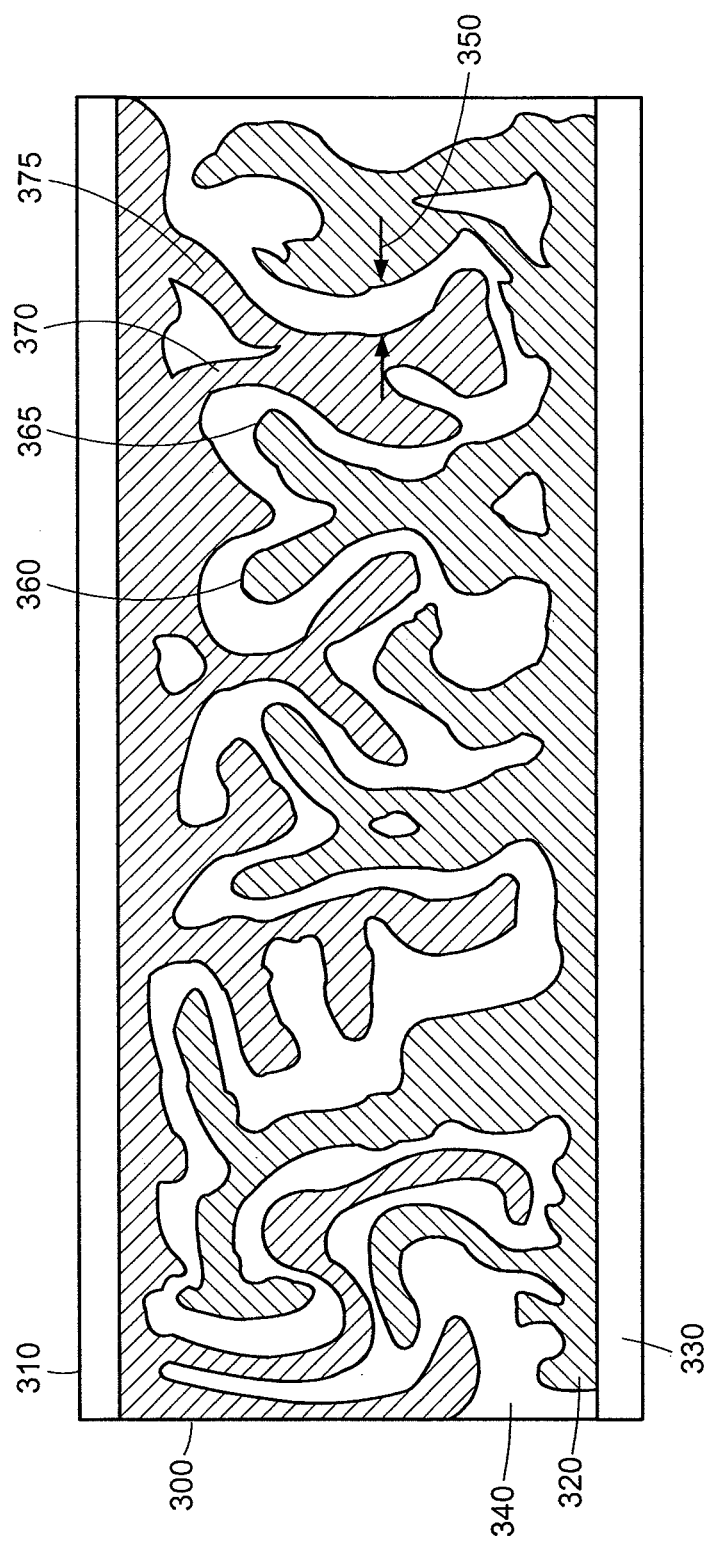
FIG. 3 illustrates an electrochemical device of the invention having interpenetrating electrodes with multiple pathways to the current collector according to one or more embodiments of the present invention.

FIG. 3 illustrates an electrochemical device of the invention having interpenetrating electrodes with multiple pathways to the current collector according to one or more embodiments of the present invention. The benefit of such a structure is a higher level of reliability should one of the branches fail during cycling. Component 300 is a cathode storage compound and is organized adjacent to current collector 310 to form the positive electrode; component 320 is an anode storage compound and is organized adjacent to current collector 330 to form the negative electrode; and component 340 is an electrolyte. When component 340 is a solid electrolyte, it can also serve as a binder to immobilize the particle components of the device. Components 300 and 320 are interpenetrating, that is, the networks are continuous (the particles contact adjacent particles to form an electrically conductive connection) and a portion of component 300 extends a distance into a region of the device occupied by component 320. The interpenetrating nature of the two electrodes prevents separation of the two electrodes, once assembled.

In one or more embodiments of the present invention, the interpenetrating network forms a branched structure. The branching can be outwardly branching, as is shown by multiple pathways 360, 365. The network can also have increased branching nearer the current collector as is shown by multiple pathways 370, 375. By increasing the number of pathways an electron can take to the current collector, the cross-sectional area of the electrode increases as well (so long as each branch has the same cross-sectional area). Increased cross-sectional area (or increased pathways to the current collector) increases the current carrying capacity of the electrode near the collector and increased reliability of the electrode. Thus, the electrochemical device experiences an electronic conductance gradient, by which electron carrying capacity increases as one approaches the current conductor.

Increased reliability of the electrode means that the cell would retain higher levels of capacity during cycling and be safer than less reliable systems. For example, it is well known that some cathode materials are susceptible to thermal runaway if overheated. Heat is generated via ohmic dissipation during charging and discharging a battery. Batteries that have increased cross-sectional area or increased pathways to the current collector will be less likely to overheat during rapid charge and discharge because there will be less ohmic dissipation.

In one or more embodiments, an interpenetrating network is formed by self organization of particles in one, two or three dimensions, the particles having the appropriate mutually attractive and repulsive forces, as is discussed in detail below. Thus, according to one or more embodiments of the present invention, a system having a first material, a second material and a third material are selected in combination such that the first (cathode) material exerts self-attractive forces, the third (anode) material exerts self-attractive forces, while the first and third materials exert a mutually repelling force when the first and third materials are separated by the second (electrolyte, electrolyte-solvent, or solvent-binder system) material. At a sufficiently high volume fraction of such particles and in the absence of unwanted coulombic or steric repulsion, percolative contact between like particles can occur. If the particles are individually electronically conductive, a continuous electronically conducting network results. The ability to organize particles of cathodic and anodic materials in such small volumes imparts a complex structure to the components of the device and provides a highly interpenetrating structure. This interpenetrating structure can vary widely in the extent of segregation between the cathode and anode, in some instances having a dispersed network where cathode and anode particles are intimately mixed while each forms a separate interconnected network, and in other instances forming aggregates of multiple cathode or anode particles, with the aggregates being substantially interconnected to others of the same material. The aggregates can have a wide or narrow distribution in their size. The interpenetrating structures can have many topologies or morphologies including being strut-like, sponge-like or cellular, micellar, lamellar, isotropic or anisotropic in the arrangement of the particles, and periodic or aperiodic in the size or spacing of the constituents of the structure. The interpenetrating structures can comprise particles of equiaxed shape including spheres or polyhedral shapes, or anisometric shapes including ellipsoids, oblate spheroids, plates, rods, whiskers, or fibers.

In one or more embodiments, an electrode having multiple pathways to the current collector is a three-dimensional structure that is porous, sponge-like or cellular, such as by way of example, an open-celled or reticulated sponge or foam. A suspension or solution of one electrode material is infused or absorbed into the open cell network of the porous sintered electrode form. The electrode suspension coats the inner passageways of the sintered or open-pored form and can be immobilized by removal of the carrier liquid. Short circuiting of the system is avoided by coating the open-pored form with an electrolyte, for instance by dipping in an electrolyte solution. The viscosity of the electrolyte solution is selected so that a thin coating remains on the interior surfaces of the porous electrode. The coating is sufficiently thin that the passageways remain open and accessible to the electrode-containing solution. The resultant structure is that of an interpenetrating network in which one phase is infused into and around the continuous network of the other phase. This structure forms an interpenetrating electrode of the device, and is characterized by having multiple conductive pathways to a current collector of the device. This first structure can have a minimum cross-section greater, for example, than 0.010 mm or greater than 0.1 mm, and is formed in various shapes including continuous sheets, rectangular parallelepipeds, discs, rods, or cylinders. It can be formed in more complex arbitrary shapes such as a box or tray having one or more cavities. This first structure can be substantially uniform, or can be graded such that the cross-section of solid material or certain physical properties such as electrical conductivity vary in the direction of a current collector attached to the structure. The complexity of the porous structure in a sintered body or porous foam provides multiple pathways by which electrons can travel to the current collector.

In one or more embodiments, the cathode is the porous form. The form can be a sintered ceramic, which imparts rigidity and form to the electrode. Exemplary cathode materials suitable for processing into a porous sintered form include lithium metal oxides, such as lithium cobaltate or lithium magnesium cobaltate, a lithium manganese oxide, or a lithium iron phosphate.

In one or more embodiments, the anode is the porous form. The form can be a porous carbon such as a graphitic or glassy carbon foam, a porous sintered carbon, a mat of carbon fibers, a two-dimensionally or three-dimensionally woven carbon fiber, or a web of nanophase carbon or carbon nanorods, including fullerenic carbons and carbon nanotubes or nanofibers.

The reticulating, interdigitated or interpenetrating feature of the electrodes allows the two electrodes to approach one another very closely, while maintaining a large interfacial area and decreasing the required volume of electrolyte. In one or more embodiments, the spatially-averaged thickness of the layer of electrolyte or separator between positive and negative electrodes is less than about 100 microns, or less than about 50 microns, or less than about 25 microns, or less than about 10 microns, or less than 5 microns, or less than 2.5 microns or about 1 micron. In one or more embodiments, the narrowest distance between the two electrodes, such as for example, the distance d shown by arrow 350, is about 0.5-5 microns or no greater than 1 micron along at least one location of the interface. This distance can be achieved at multiple locations along the interface. By achieving such short distances between electrodes, the ion diffusion distance across the separator electrolyte is decreased and the power density is increased.

In one or more embodiments, the reticulated, interdigitated or interpenetrating features of the positive and negative electrode have a thickness, when averaged along the length of the protrusion or indentations, that is less than about 100 microns, preferably less than about 50 microns, still preferably less than about 25 microns, and still preferably less than about 10 microns. Such designs can decrease the volume of the systems that would normally be consumed by the separator, electrolyte, binder, conductive additive, and other inert components that, in some embodiments, do not store lithium, and thereby increases the energy density of the battery on a volume or weight basis.

Batteries of this new design have new design considerations to prevent short circuits during cycling. Volume change of the active material typically results from ion transfer during charge or discharge. Such changes vary according to the material but can range from ~0 to about 50% for Li—Ti—O spinel and Si, respectively. While volume change obviously introduces strain into the device, which may degrade the device over time, it also has the possible more immediate effect in these devices with such small dimensions between elements of shorting the device. For batteries with interpenetrating electrodes the length scale of the change in dimension should be less than the thickness of the electrolyte layer or the electrolyte itself must be highly compliant. In rocking chair batteries using an intercalation oxide as the cathode and graphite as the anode, in which ions move back and forth between two intercalation materials. The volume of the cathode decreases while that of the anode increases. In some embodiments, electrolyte layer thicknesses should be greater than 2, 4, or 8 times the displacement. In designs that rely on networks based on particles, then a convenient way to assure cyclability is to limit the size of the particles. For systems with a one micron electrolyte layer thickness and a 2.5% linear displacement associated with ion transport, a particle size (or network width) of at most 20, 10, or 5 microns may be used.

According to one or more embodiments, a battery structure is provided wherein power density is no longer limited by transport through the pore network of the electrode, but by diffusion between particles. The increase in power density over prior art designs of such an embodiment can be estimated from the characteristic lithium ion diffusion time for complete charge or discharge, given by $Dt \propto x^2$, where x is the ion diffusion length and D is the lithium ion diffusion coefficient in the electrolyte phase. In a conventional battery design the diffusion length is the electrode thickness multiplied by a tortuosity factor for the pore network and is at least 100 µm. Thus, the present invention, in one or more embodiments, reduces the characteristic diffusion length to the interparticle separation, or renders lithium diffusion in the storage compound the rate-limiting transport step. The diffusion length is then a few microns or as little as several nanometers. The power density can increase by more than a factor of 10 or more over current designs, typically having power density values of 300 W/kg.

The prevailing focus of solid polymer battery research has been to increase the conductivity of the solid polymer electrolyte material. Although the present invention can benefit from the use of higher conductivity electrolyte, it is not needed to realize the benefits of the invention. Thus, in one embodiment, the present invention is directed to reducing the lithium ion diffusion length to the interparticle scale. Because the conductance of the electrolyte determines transport rates, by decreasing the characteristic lithium ion diffusion length by a factor of >10, the present invention can provide power densities at least equivalent to that of current laminated designs using liquid electrolytes, while using available solid polymer electrolytes. Thus, the smaller dimensions of the device components reduce the conductivity demands of the device. Electrolytes having ionic conductivities of less than $10^{-3}$ S/cm at room temperature may be used. In some embodiments, electrolytes having ionic conductivities of less than $10^{-4}$ S/cm at room temperature may be used. Use of such electrolytes leads to safer, longer lasting cells because of the absence of flammable liquid electrolytes, which can leak and often react with the highly reducing and oxidizing electrode materials. Furthermore, such batteries offer a greater shape flexibility, as they may not require heavy and expensive metal can packaging.

In one or more embodiments of the present invention, increased interfacial area between an electrode of a bipolar device and a separator or electrolyte is achieved using a perforated electrode structure. As shown schematically in FIG. 4, the present invention provides a system 400 having a perforated structure, such as an electrode 420 or 440, that has a plurality of channels 450 defined therein. In one or more embodiments, the plurality of channels is filled with electrolyte material. Such a structure can improve ionic diffusion by minimizing diffusion tortuosity that is typical of prior art electrodes. Thus, the effective diffusion length can be decreased. In one or more embodiments, perforated electrodes are used as a composite cathode in lithium ion batteries. In one or more embodiments, the present invention provides a thin film battery in a bulk form wherein the electrode is a dense single phase material that has a plurality of channels filled with solid electrolyte 460. The right side of FIG. 4 shows a cross-section along a-a of electrode 440. The cross-section shows electrolyte 460 in the channels 450 of electrode 440. The channels can extend through and across the electrode, from the front at interface 470 with electrolyte 460 of the separator to the back near current collector 480. Channels 450 provide ionic communication between the back of the electrolyte and the region near the back of an electrode. This alternate transport path reduces the transport distance by removing tortuosity that an ionic species may travel. At the same time, the cross-sectional area of electrode storage material in communication with the current collector is increased in comparison to a network of particles as in a conventional electrode. This is advantageous when electrode materials of low electronic conductivity are used, since the electronic conductance through the electrode is increased without the use of conductive additives such as carbon, that otherwise decrease the volume fraction of storage material in the electrode.

Channels 450 can have a variety of cross-sectional shapes such as, but not limited to circular, as shown in FIG. 4, rectangular or polygonal. The perforations may be each isolated from the other, as in an example of cylindrical holes extending through the electrode, or may be partially or completely interconnected to one another. Viewed in a direction normal to the current collector or separator, the dimensions, cross-sectional shape, and cross-sectional area of the perforations can vary widely, being selected to improve the transport characteristics of the battery while minimizing the total volume of porosity. By way of example, for an electrode storage material that has a low solid state lithium chemical diffusion coefficient, it is desirable to minimize the smallest lateral dimensions between perforations. For a liquid or polymer electrolyte filling the porosity that has low lithium diffusion coefficient, it is desirable to increase the cross-sectional area of the porosity compared to that of the electrode. And, for an electrode in which the transport of lithium across the electrode-electrolyte interface is the slowest kinetic step, it is desirable to have perforations that increase the interfacial area while not increasing the total pore volume.

In addition to producing a single layer cell or a stack such as illustrated in FIGS. 2-4 above, the same materials typically employed in planar designs can be used in a multilayer cell having the reticulated structures of the invention, with the results that higher energy and power densities can be achieved. By using the same component materials, but by modifying the microstructural features of the components, the present invention provides systems or cells with a wide range of properties, for example, improved energy and power densities. This provides flexibility and can lead to a more efficient design, prototyping and manufacturing sequence, as well as providing a tailorable or customizable bipolar device. A bipolar device having structures of reticulated, interdigitated or interpenetrating interface can be tailored for the purposes of controlling and optimizing charge and discharge kinetics.

Thus, in one or more embodiments using the reticulated, interdigitated or interpenetrating electrode structures described herein, an electrochemical device is provided having electrodes for which electronic conductivity is higher at their base (i.e., near the current collector) than at their tips. This is achieved using a structural grading of materials, such as the reticulated, interdigitated or interpenetrating structures described above. It can also be achieved using a compositional grading, where electroactive compounds of varying conductivity are used and the composition is varied from the tip to the base. As is discussed herein below, it is also accomplished by varying the porosity gradient of the electrode.

Having the above stated dimensions, this design also has improved power on a volume or weight basis compared to batteries of conventional design, because the ion diffusion distance can be decreased. In a conventional laminated battery design in which the thicknesses of the positive and negative electrodes are approximately uniform, during charging or discharging the ions must diffuse across the thickness of the electrodes. In a conventional lithium ion device, the electrode thickness is typically about 100 to about 200 micrometers. In most such systems the rate of transport of lithium ions across the electrode thickness limits the power. The transport rate of electrons is believed to be much higher and is not necessarily rate-limiting. In the present invention, when applied to a lithium ion battery, the lithium ion diffusion distance can be decreased, from a value equal to the electrode thickness to a value equal to the lateral dimensions of the reticulated, interdigitated or interpenetrating features.

The present design can also provide a system wherein the charge or discharge characteristics can be selectively tuned by altering the dimensions of the reticulated or interpenetrating features. Microfabrication approaches such as those described below allow these feature shapes and dimensions to be readily varied thus providing improved control over system characteristics without relying on the type of material. This improves design, prototyping, and manufacturing, compared to conventional energy storage systems where materials formulations are typically empirically adjusted to achieve desired properties.

In one or more embodiments, an electrochemical device with a power density of greater than 300, 600, 1200 W/kg and an energy density of greater than 450, 525, 600 W-h/l is achievable. High energy and power density in the same device is achievable because the length scale of the device components are much smaller, e.g., 100-fold smaller, than conventional devices. For example, a device has been prepared having a stack width and length of 32 mm by 48 mm, and a total battery thickness (cathode collector/cathode/electrolyte/anode/anode collector) of less than 250 microns. A 23-layer stacked battery was also prepared having an overall thickness of less than 6 mm. Using the principles set out herein, surface forces are used to prevent electronic shorting in a system that contains no separator, so that device components can be engineered on a smaller scale to reduce ion transport distances.

Similarly, an electrochemical device having first and second electrodes separated from one another by a solid state electrolyte, wherein the device has a total thickness of greater than about 0.1 mm wherein the first and second electrodes form an interpenetrating network with a power density of greater than 300 W/kg is achievable. High energy density is available in a bulk battery form because the length scale of the device components is much smaller than those of conventional devices. Because less of the device volume is required for electrolyte and other conductive additives, the fraction of active material in the device and, hence, the energy density is greater.

In another aspect of the present invention, ion transport in a composite structure such as an electrode is improved by adjusting the ionic conductance relative to the current distribution in the structure. For an electrode of finite thickness the current carried by the electrolyte phase in the electrode can decrease with depth. Such a phenomenon typically indicates that the ionic conductance of the electrolyte phase near the region away from the electrolyte separator may not be critical while a high ionic conductance near the electrolyte separator is desired. Accordingly, in one embodiment, the present invention provides improved transport rates by grading the porosity, or porosity density, of the electrode structure. A high volume fraction of electrolyte near the interface, with the bulk electrolyte, can improve ionic conductance in the region where ion current can be high, to improve rate capability, while a higher fraction of the active material in the depth of the electrode allows retention of a high energy density.

The present invention provides a variety of graded porosity arrangements including, but not limited to, linear, concave up and concave down porosity gradients. An electrode, for example, with a linear porosity gradient typically has a continuously, or at least a non-discretely, varying porosity from one region to another region. For example, an electrode can have a linearly varying porosity, filled with electrolyte, in one embodiment, so that a porosity of 0.4 can be at the front of the electrode, near the electrolyte, and a porosity of 0.2 can be at the back of the electrode, near the current collector. The back refers to the region of an electrode that is in electronic communication with a current collector and the front refers to the region of an electrode that is positioned adjacent the separator electrolyte. In other embodiments, the electrode has a porosity that can have concave up or concave down profile.

The porosity can average from about 10% to about 70%. It is believed that if the porosity is too high, above about 80%, then the framework may be structurally unstable; if the porosity is too low, below about 10%, then there is only an incremental increase in power or energy density. Accordingly, the average porosity is, preferably from about 20% to about 50%. In another embodiment, the average porosity is from about 30% to about 45%. In some embodiments, the porosity gradient in an electrode, from the current collector toward the electrolyte or the other electrode, varies by at least about 10% from the average porosity, preferably, at least about 20%, more preferably, at least about 30%. In other embodiments, at any cross-section of an electrode perpendicular to a line connecting the center of mass of the current collector and the center of mass of the other electrode, the porosity variation is uniform to about +/−10%, preferably about +/−5%, more preferably, about +/−3%, and even more preferably about +/−1%.

Thus, the system can have structures that have a porous network in a framework. The porous network can be ionically interconnected so that ions can diffuse to the cavities defining the porosity at any location within the porous structure. For example, a lithium ion can diffuse from the bulk electrolyte to any ionically interconnected location in a porous electrode.

Figure 5A:
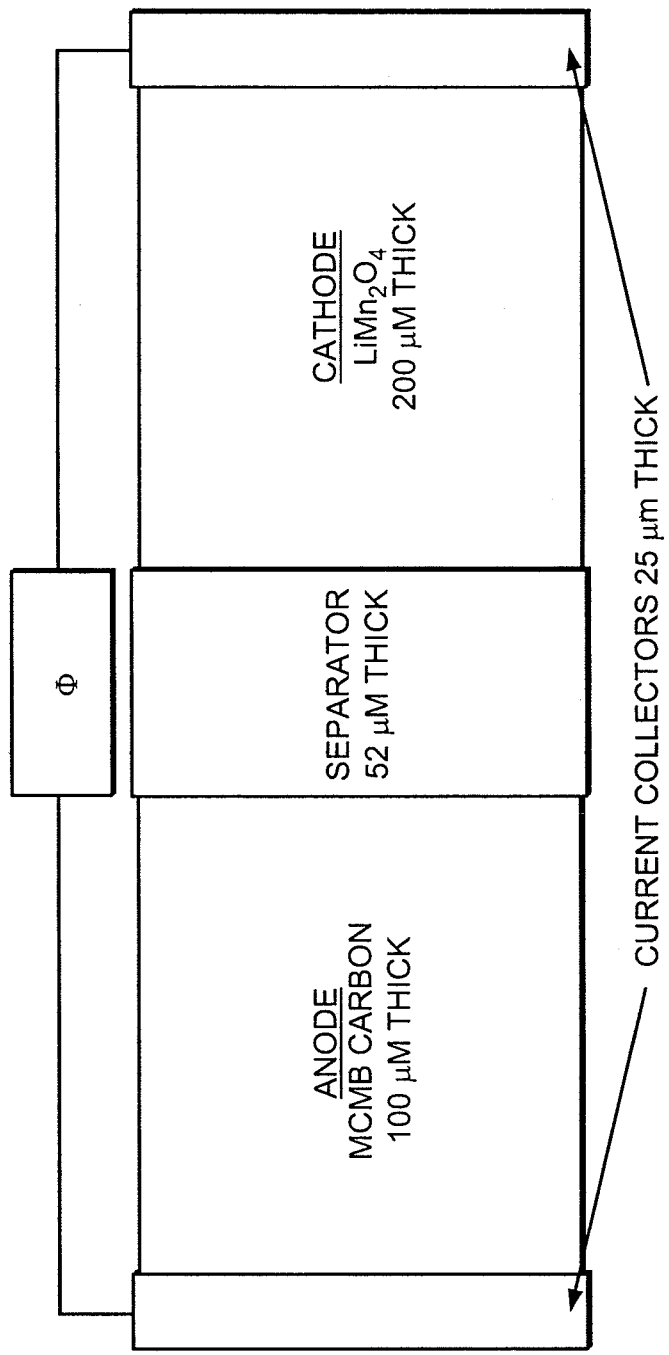
FIG. 5A is a typical electrochemical cell used in performance simulations.

The performance of a bipolar system of varying porosity was simulated using a typical $LiMn_2O_4$ spinel cathode with a $EC/DEC/LiPF_6$ electrolyte and either a MCMB carbon or lithium anode schematically illustrated in FIG. 5A. The mesoporous carbon microbeads (MCMB) carbon anode was used for evaluations of graded porosity electrodes. For discharges, a spinel cathode was assumed with an initial lithium content of $Li_{0.1705}Mn_2O_4$. The systems were simulated to be discharged to a cutoff of about 3.5 V. The cathode thickness was assumed to be about 200 μm; the electrolyte thickness was assumed to be about 52 μm and the anode thickness was assumed to be about 100 μm. In the figures, various gradients are shown for an average porosity of 0.3.

Figure 5B:
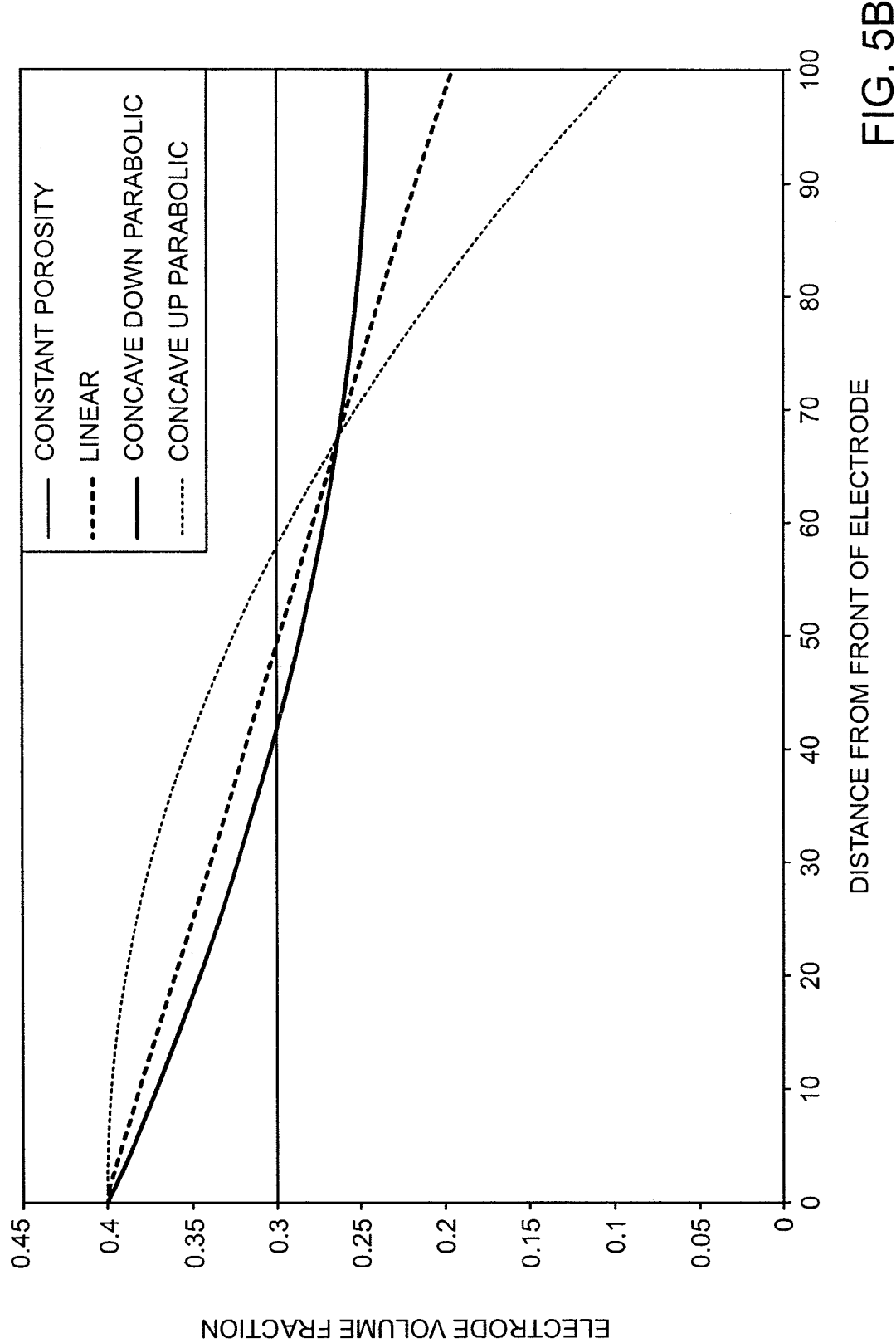
FIG. 5B is a graph showing electrolyte volume fraction as a function of distance in an electrode according to one embodiment of the present invention.

These graded porosity gradients used in the simulation are graphically illustrated in FIG. 5B. In FIG. 5B, the average porosity is about 0.3 and each of the graded porosity electrodes has a porosity of about 0.4 at the front of the electrode, which corresponded to an electrolyte fraction of 0.4.

Figure 6:
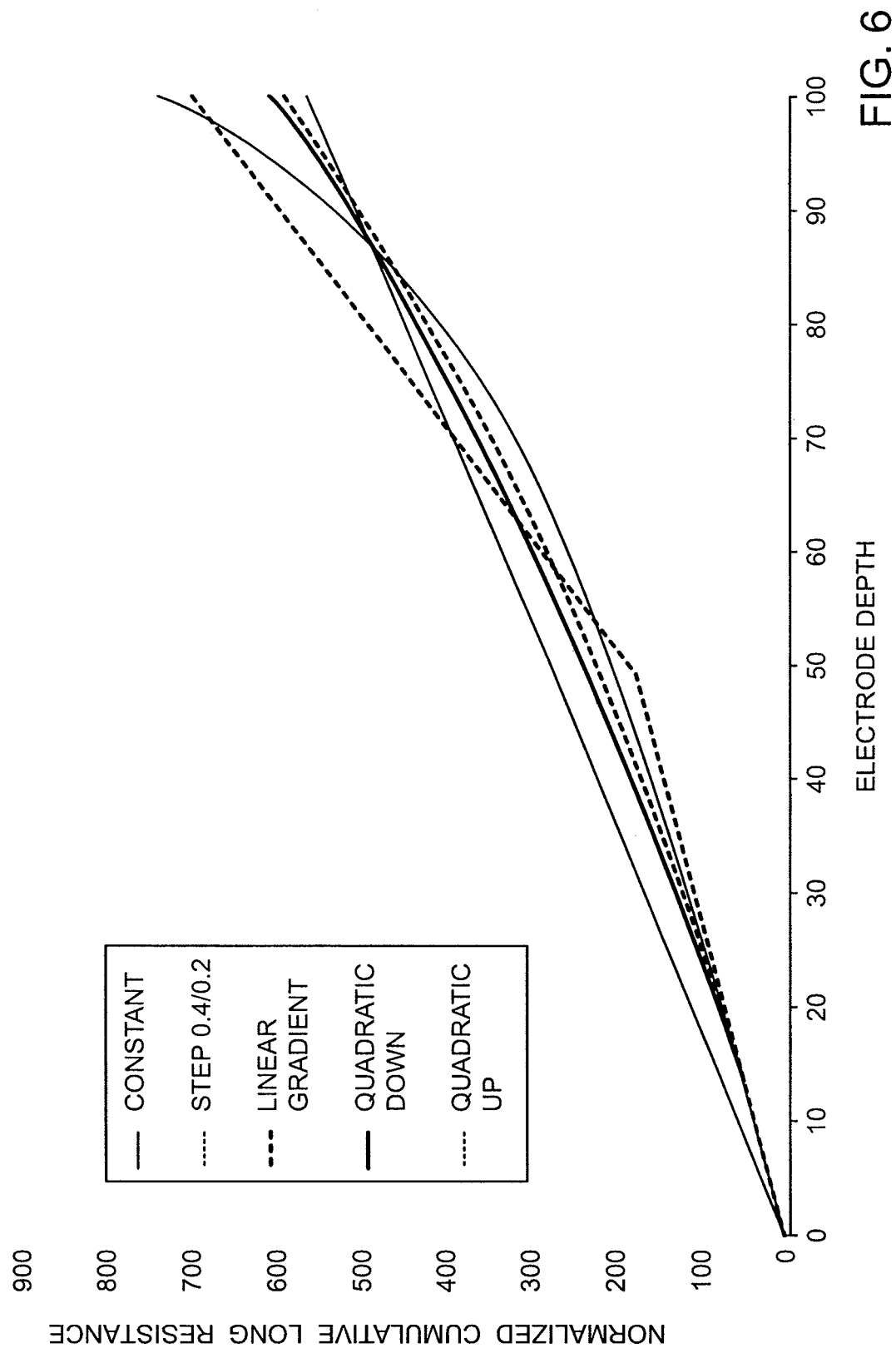
FIG. 6 is a graph predicting a normalized cumulative ionic resistance in a greater porosity structure in a bipolar device according to one embodiment of the present invention.
Figure 7:
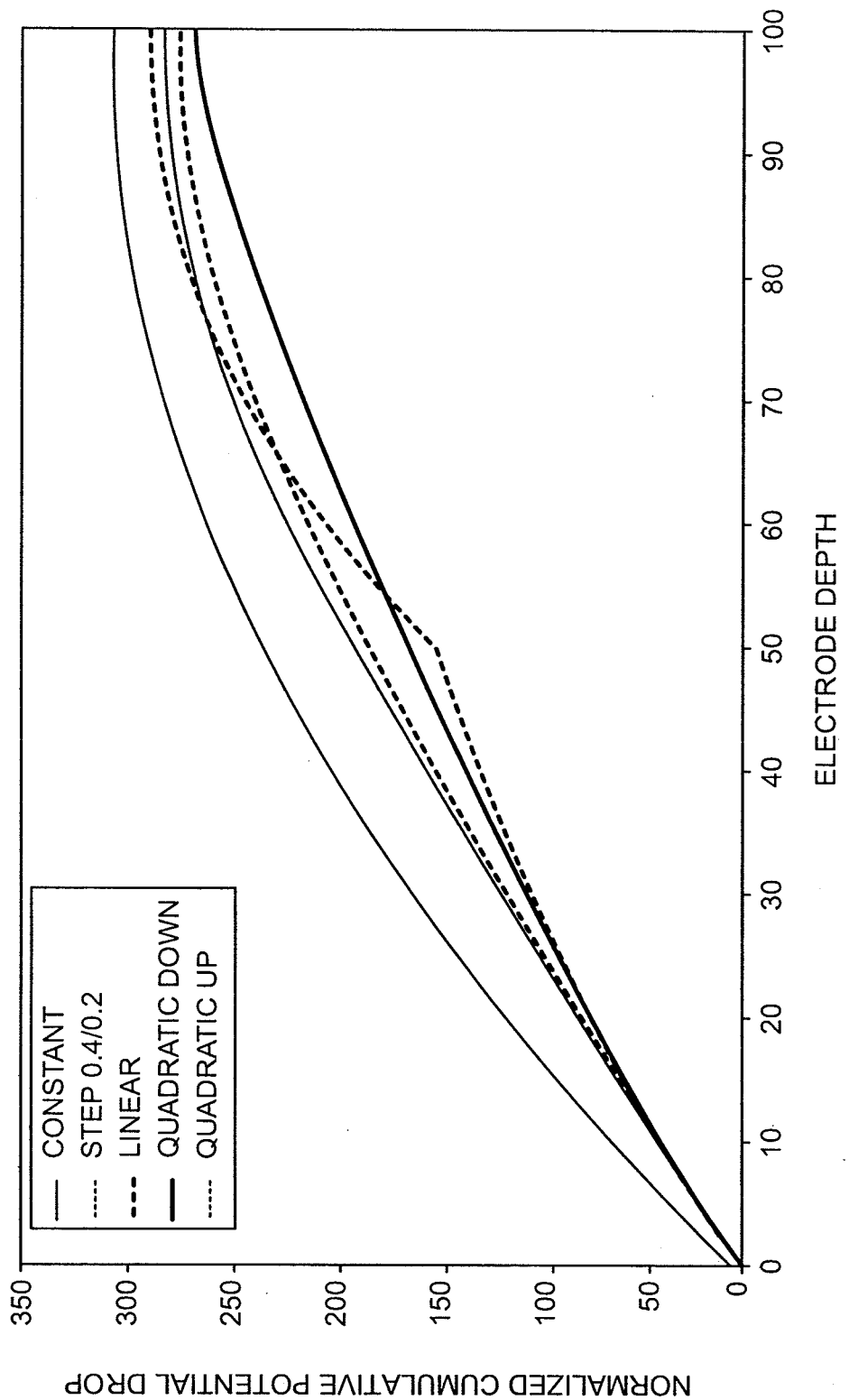
FIG. 7 is a graph showing a normalized cumulative potential drop in a greater porosity structure in a bipolar device according to one embodiment of the present invention.
Figure 8:
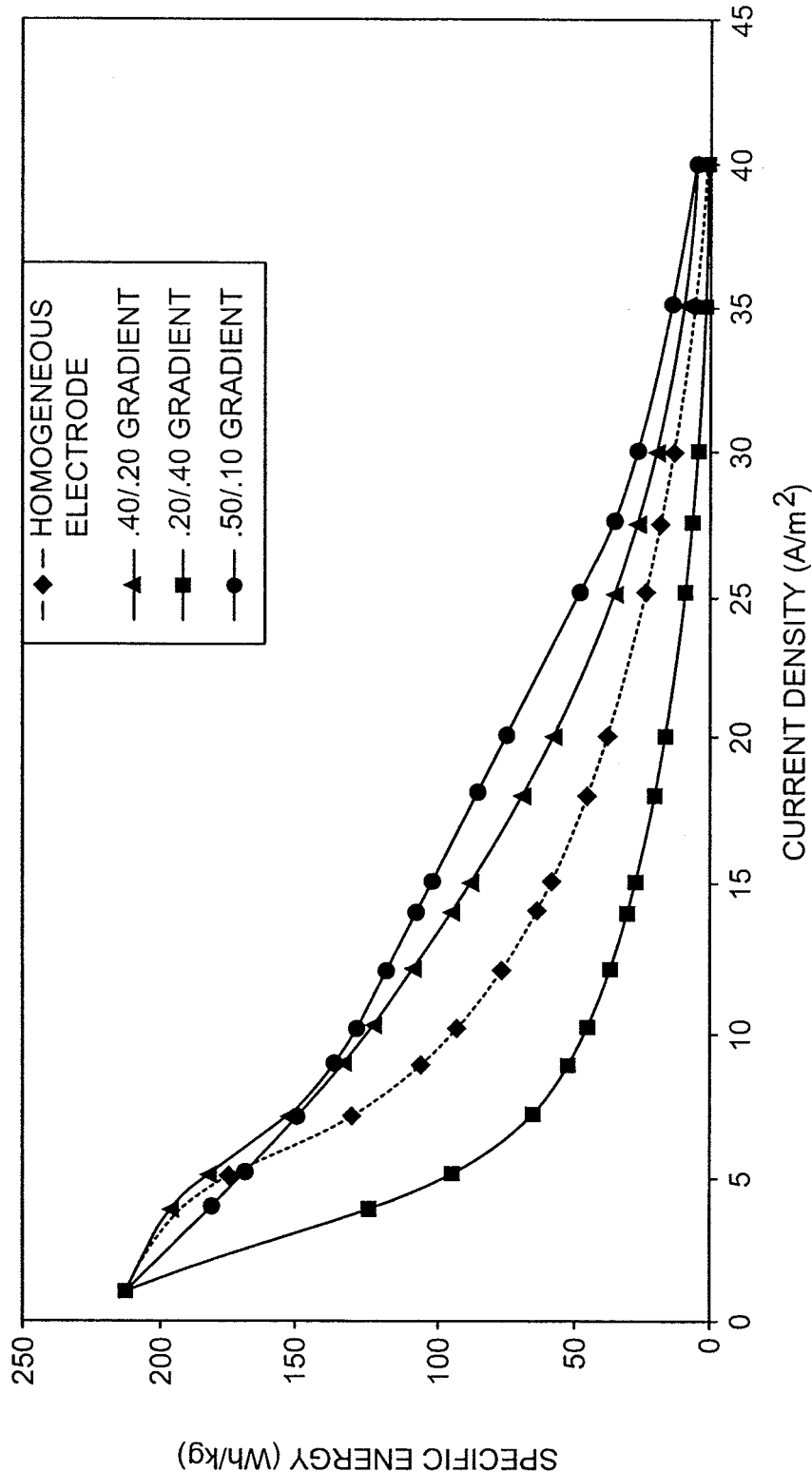
FIG. 8 is a graph showing the specific energy of a greater porosity structure as a function of current density in a bipolar device according to one embodiment of the present invention.
Figure 9:
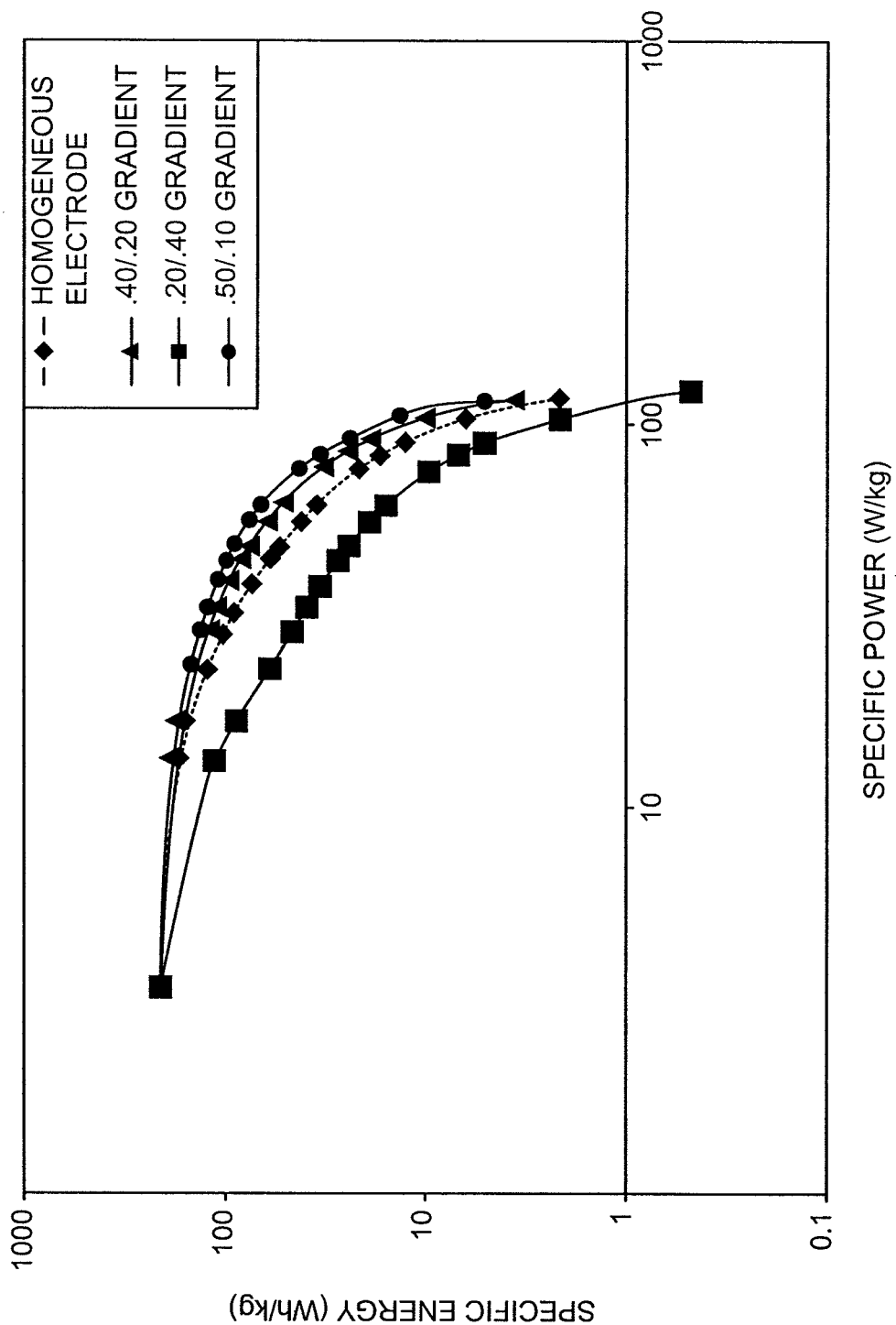
FIG. 9 is a graph showing the specific energy as a function of specific power in a bipolar device according to one embodiment of the present invention.
Figure 10:
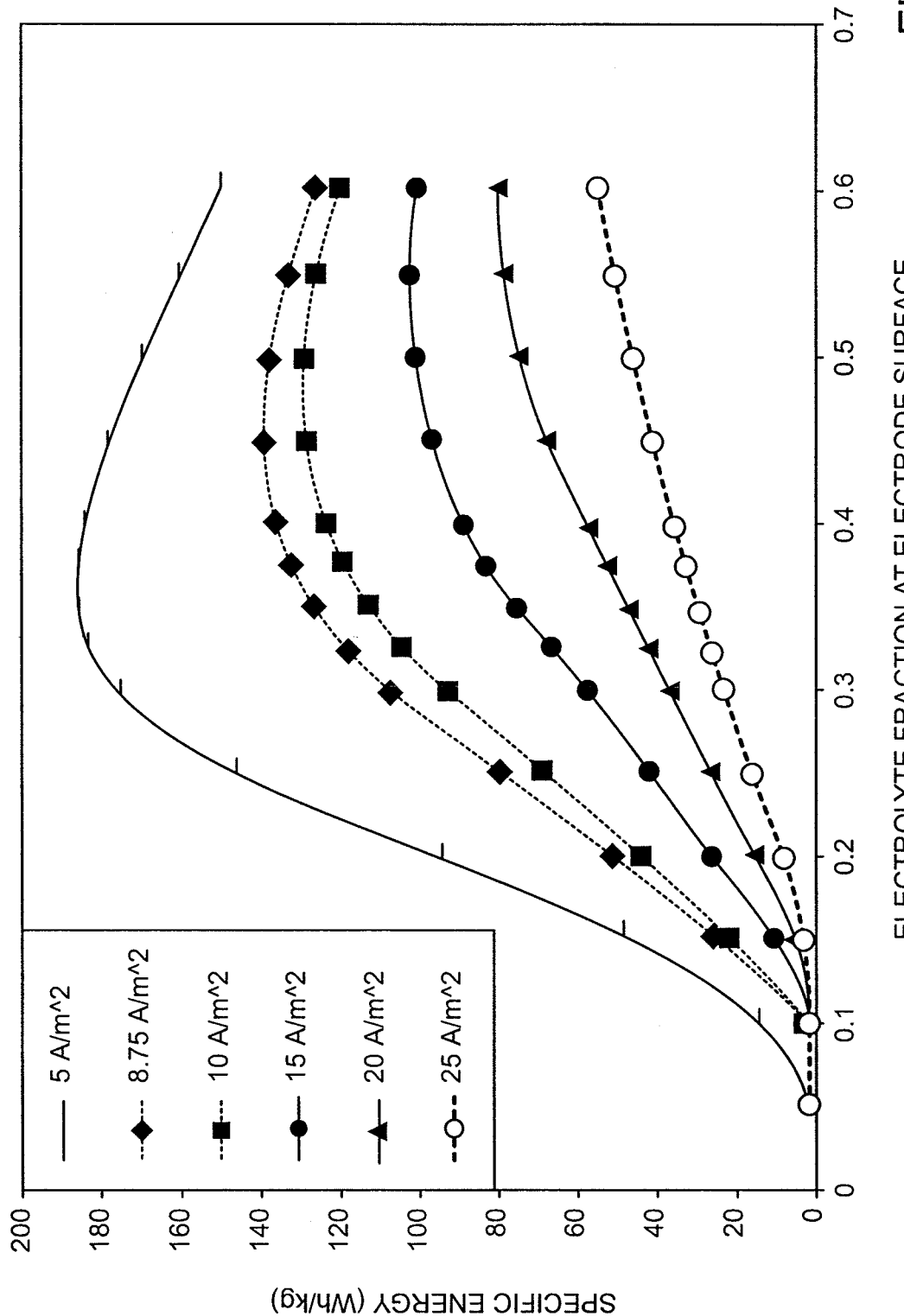
FIG. 10 is a graph showing the specific energy as a function of electrolyte fraction at the surface of a graded porosity structure in a bipolar device according to one embodiment of the present invention.
Figure 11:
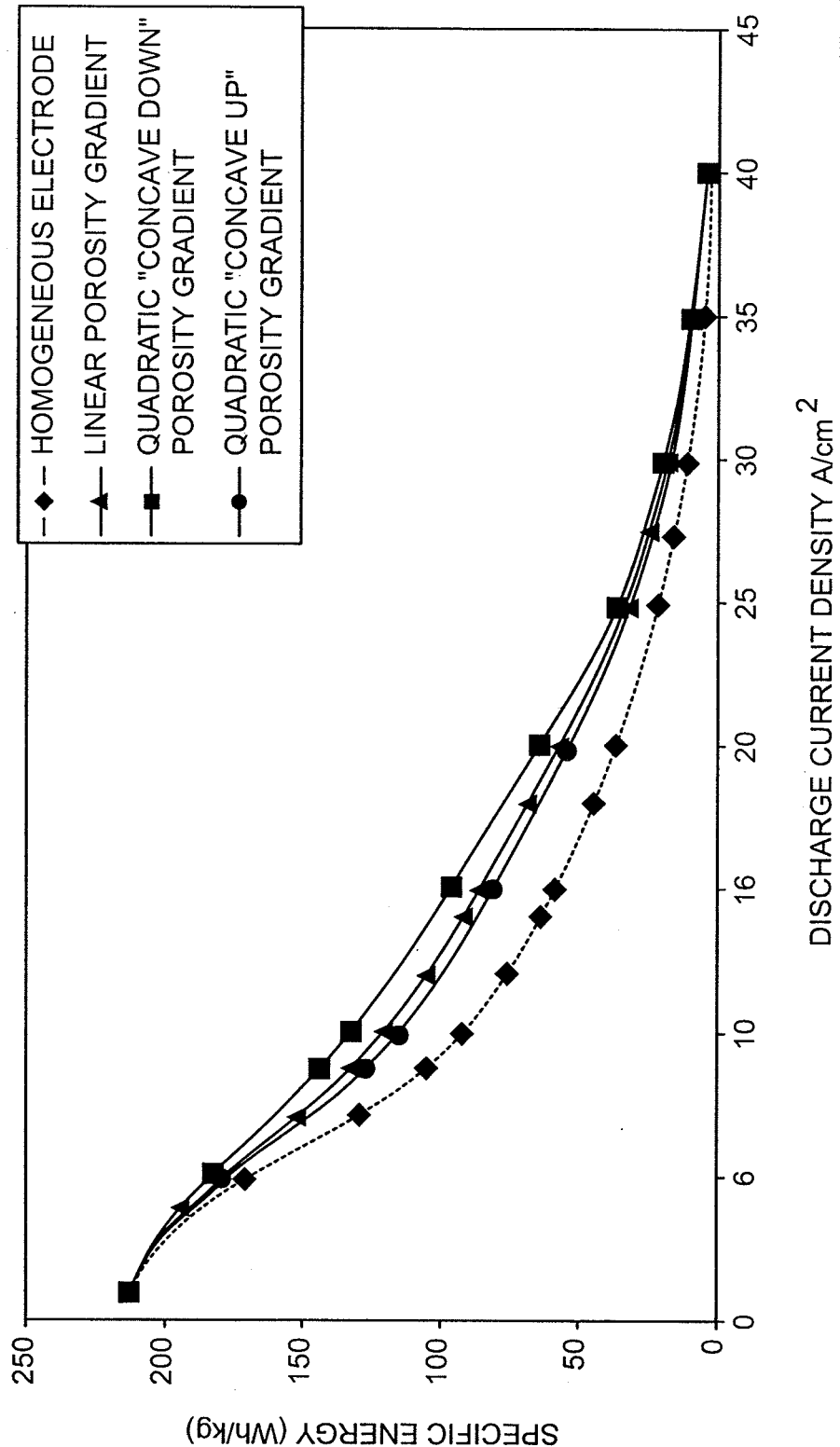
FIG. 11 is a graph showing the specific energy as a function of discharge current density in a bipolar device having a graded porosity structure according to one embodiment of the present invention.

FIG. 6 is a graphical illustration of the normalized cumulative ionic resistance as a function of electrode depth for each of the graded porosity electrodes shown in FIG. 5B. Each of the graded porosity electrodes had a predicted lower cumulative ionic resistance than a conventional electrode near the surface and throughout the electrode. FIG. 7 is a graphical illustration of the normalized cumulative potential drop as a function of electrode depth for each of the graded porosity electrodes shown in FIG. 5B. Each of the graded porosity electrodes has a lower potential drop than a conventional electrode near the surface as well as throughout the electrode. FIGS. 6 and 7 show that the graded porosity electrode has better ionic transport and potential properties that should translate to higher power and energy densities. Such performance can be graphically illustrated in FIGS. 8 and 9, which show, respectively, the specific energy relative to the current density and specific power, for a variety of graded porosity electrodes. FIG. 9 shows that the systems with graded porosity electrodes would supply more energy at a given power than a conventional electrode system. Moreover, FIG. 10, which is a graphical illustration of the specific energy as a function of porosity (electrolyte fraction at the electrode surface), shows that as the discharge current increases, the optimum electrode grading shifts from a slight porosity to more severe gradients at high current densities. It is believed that the shift follows from decreasing electrode utilization with increasing current where lower ion transport properties at the back of the electrode, especially for highly graded electrodes, inhibits utilization at low and moderate discharge rates. FIG. 11, which is a graphical illustration of specific energy as a function of discharge current density for systems with concave up, concave down and linearly gradient porosity electrodes, shows that the graded porosity systems have higher specific energy compared to a conventional, homogeneous electrode system, especially at the intermediate discharge rate regime.

In accordance with another embodiment, the electrode has a porosity gradient, from the current collector to the other electrode or the electrolyte, that has a slope that varies by less than or no more than 5% at any location along the electrode, preferably, by less than or no more than 10%, more preferably, by less than or no more than 15%. The change in slope can be stepwise or smooth.

Many of the electrode structures described herein can be fabricated using self-organization. The selection of materials that exert attracting and repelling forces on one another produces self-organizing structures, specifically, self-organizing bipolar devices. The size-scale of the self-organizing entities of the invention can range from a high molecular weight molecule, e.g., MW>1,000,000, up to the nanometer scale and beyond. Surface forces can be used to self-organize a wide range of electrochemical devices described herein including, for example, batteries, capacitors, electrochromics, fuel cells and hybrid devices. With the teachings provided herein with respect to organization of devices using dispersion-forces, specifically applied to bipolar devices, in combination with the knowledge of those of ordinary skill in the art, a broad variety of devices, device microstructure and techniques are provided.

Herein, "repelling" or "repulsive" force is understood to means that the first and third components can be prevented from making direct contact by an intervening or wetting layer of at least molecular dimensions (greater than about 1 nm) of the second component. Measurements of such forces can be made using an atomic force microscope (see for example, "Direct Measurement of Repulsive van der Waals interactions using an Atomic Force Microscope" Journal of Colloid and Interface Science, 180, 460-5, 1996. In such measurements, one of the particles of the bilayer device is attached to the tip of an AFM. The tip is then lowered towards a surface comprised of the other material in the bipolar device in an appropriate medium. By measuring the relative displacement of the cantilevered AFM tip, repulsive forces can be distinguished from attractive forces. This method can be used to select materials to be used in bipolar devices.

The principles for using surface forces in the organization of bipolar devices is first described.

Van der Waals (vdW) forces between molecules and condensed phases can be composed of three contributions, a Keesom force due to interactions between oriented permanent dipoles, a Debye force due to polarization induced in other molecules by a permanent dipole, and a London dispersion force due to polarization induced in other molecules by oscillations in the electron cloud of interatomic bonds. Of these, the London dispersion force is the most universal since it does not require the existence of permanent dipoles. In most systems, it is the dominant contribution to the vdW force. While dispersion forces can be relatively weak and long-range, their impact is not negligible. Between two plane-parallel surfaces of materials 1 and 3 separated by a uniform thickness L of material 2, the vdW interaction energy and force as a function of separation can be given by:

$$E_{vdW} = -\frac{A_{123}}{12\pi L^2}$$

$$F_{vdW} = -\frac{A_{123}}{6\pi L^3}$$

For two interacting spheres of materials 1 and 3 with radii $R_1$ and $R_3$ respectively, separated by distance L, the interaction energy and force are, respectively, $$E_{vdW} = -\frac{A_{123} R_1 R_3}{6L(R_1 + R_3)}$$

$$F_{vdW} = -\frac{A_{123} R_1 R_3}{6L^2(R_1 + R_3)}$$

or $$F_{vdW} = -\frac{A_{123} R}{12L^2} \text{ (for } R_1 = R_3 = R\text{)}$$

An important parameter scaling the dispersion force is the Hamaker constant A. For symmetric combinations of materials the Hamaker constant $A_{121}=A_{212}$ is always positive, leading to an attractive dispersion force ($F_{vdW}<0$). For asymmetric combinations 123, the dispersion force can be either attractive or repelling. The repelling case, where $A_{123}<0$ and $F_{vdW}>0$, is of special interest in this invention. The magnitude of the dispersion force can be determined from careful measurements of surface forces such as atomic force microscopy (AFM) or from various approximations using physical properties of the materials involved. Recently, rigorous calculations of Hamaker constants using Lifshitz theory have become possible due to measurements of the spectral optical properties of materials over a very wide frequency range from the IR to deep UV. See, for example, "Full Spectral Calculation of Non-Retarded Hamaker Constants for Ceramic Systems from Interband Transition Strengths," *Solid State Ionics*, 75, 13-33 (1994) and *J. Am. Ceram. Soc.*, 83[9], 2117-46 (2000), which are incorporated herein by reference. However, for most materials and especially low refractive index materials (n<2), the dominant interactions occur in the optical frequency range, and the Hamaker constant can be approximated to good accuracy using optical index and static dielectric constant approximations, widely used form of which is:

$$A_{123} \cong \frac{3}{4}kT\left(\frac{E_1-E_2}{E_1+E_2}\right)\left(\frac{E_3-E_2}{E_3+E_2}\right) + \frac{3}{8}\frac{hv_e}{\sqrt{2}}\frac{(n_1^2-n_2^2)(n_3^2-n_2^2)}{(n_1^2+n_2^2)^{1/2}(n_3^2+n_2^2)^{1/2}\{(n_1^2+n_2^2)^{1/2}+(n_3^2+n_2^2)^{1/2}\}}$$

The electronic frequency $v_e$ corresponds to the mean ionization frequency of the materials present. Typically this is $v_e \approx 3 \times 10^{15}$ Hz. k is the Boltzmann's constant and h Plank's constant. The refractive indices in the visible range for mediums 1, 2, and 3 are $n_1$, $n_2$, and $n_3$, respectively. $E_1$, $E_2$, $E_3$ are the static relative dielectric constants. The first term gives the zero frequency energy of the van der Waals interaction and includes the Keesom and Debye dipolar contributions. For two non-polar media acting over a third medium, the first term is not significant.

When the indices are ordered as $n_1 > n_2 > n_3$, $A_{123}$ is negative. Thus, the sign and magnitude of the Hamaker constant can be readily estimated from optical and dielectric data, while more precise quantification, where necessary, is possible with full-spectral methods.

Repelling van der Waals interactions have been predicted, for example, in a system with polytetrafluoroethylene (PTFE)-glycol-iron oxide. The existence of repelling van der Waals forces has been demonstrated by, among others, van Oss et al. in *Immunol. Comm.*, 6(4), pp. 341-354 (1977), *Immunol. Comm.*, 8(1), pp. 11-29 (1979), *Separation Sci. Tech.* 14(4), pp. 305-317 (1979), *Colloids and Surfaces*, 1, pp. 45-56 (1980) and Neumann et al. in *Colloid and Polymer Sci.*, 257, pp. 413-419 (1979). Also, negative Hamaker constants have been implicated in the engulfment of bacteria by human neutrophils (phagocytosis).

Antigen-antibody complexes bound solely by dispersion forces, or by a combination of vdW and coulombic forces, can be dissociated by changing the sign of the Hamaker constant, from positive to negative, by modifying the surface tension of the aqueous medium. In the technique of hydrophobic chromatography, bound biopolymers can be eluted by lowering the surface tension of the aqueous medium. This, it is believed, is the result of changing the sign of the Hamaker constant.

Applied to synthetic materials, two polymers can be rendered incompatible, causing separation, if they are simultaneously immersed in a medium, which results in a mutually repelling force, specifically, a repelling vdW. Negative Hamaker constants can also result in the rejection of particles of dissimilar materials from a solidification front. Thus, according to one or more embodiments of the present invention, a system comprises a first material, a second material and a third material, each selected in combination such that the first material exerts self-attractive forces, the third material exerts self-attractive forces, while the first and third materials exert a mutually repelling force when the first and third materials are separated by the second material. The relative forces of the system are generally predicted using the refractive indices of the component materials. This simplified model is shown to be applicable to the conductive materials of the invention, as is demonstrated in the examples which follow. It is understood that this model may not be used in all cases and that in some instances other more precise techniques for determining surface forces may be used. For example, atomic force microscopy may be used to determine surface forces.

For example, for two dissimilar materials 1 and 3 separated by a medium 2, the vdW interaction can be rendered repelling through the judicious selection of materials (characterized by a negative Hamaker constant $A_{123}$). The vdW interaction between particles of like material separated by any other medium is typically attractive. That is, the Hamaker constant for a symmetric assembly of materials $A_{121}$ or $A_{323}$ is positive. Therefore, particles 1 and 3 in FIG. 12 experience a vdW attraction to particles of their own kind, i.e., they can be self-attractive.

At a sufficiently high volume fraction of such particles and in the absence of unwanted coulombic or steric repulsion, percolative contact between like particles can occur. If the particles are individually electronically conductive, a continuous electronically conducting network results. For identically-sized non-interacting spheres packed in 3 dimensions, percolation occurs at 16 volume percent packing as explained by Zallen in "The Physics of Amorphous Materials," J. Wiley & Sons, N.Y. (1983). In the presence of attractive vdW forces, percolation is expected at lower volume fraction. Thus in battery systems, where the volume fraction of each storage compound should be maximized for maximum energy density, a percolative network of materials 1 and 3 can form naturally wherein material 1 is separated from material 3 by material 2.

A range of interpenetrating structures can be created using surface forces. For systems in which $A_{123} < 0$ and $\rho_3 < \rho_2 < \rho_1$, a continuum of structures can be created from an initially homogeneous mixture of materials 1, 2, and 3. If (i) the mixture is cured over relatively short periods of time, (ii) the solids loading is relatively high, (iii) the viscosity of material 2 is relatively high, or (iv) the density contrast is relatively low, then that magnitude of segregation on the length scale of the thickness of the device is low. Conversely, if (i) the mixture is cured over relatively long periods of time, (ii) the solids loading is relatively low, (iii) the viscosity of material 2 is relatively low, or (iv) the density contrast is relatively high, then that magnitude of segregation on the length scale of the thickness of the device can be high. Highly interlocked lattices will tend to form in the former case and more segregated branched structures will tend to form in the latter case.

According to one or more embodiments of the present invention, forces between dissimilar materials can be used to create bipolar junctions. For example, dispersion forces, such as London dispersion forces, can be used to produce various types of bipolar devices including but not limited to electrochemical devices. In another embodiment, coulombic forces can be used to effect rearrangement of components into a system comprising an interpenetrating network of components. In still another embodiment, steric molecular forces can be used to effect rearrangement of components into a system comprising an interpenetrating network, i.e., percolating, of components.

According to one or more embodiments of the present invention, combinations with repelling forces, including van der Waals, coulombic, steric, molecular and/or magnetic forces, can be organized to create bipolar systems. Thus, in one embodiment, systems with negative Hamaker constants, resulting in repelling surface force, can be selected to create separation between cathode and anode particles in storage systems. The dissimilar materials each be electronically conducting, by which it is meant that they have electronic conductivities greater than about $10^{-8}$ S/cm. Simultaneously, aggregation of like particles of cathode and anode due to attractive surface force (positive Hamaker constants) can create percolating networks. Thus, the system is a self-organizing, co-continuous, interpenetrating microstructure in which an electrode is continuously "wired" to a current collector and another electrode to another current collector, while the repelling dispersion force is used to ensure electronic isolation of the two phases from one another. Exemplary devices include writable microbatteries, spin-on flat batteries, printable thick-film batteries and bulk storage batteries.

In another embodiment of the invention, the repulsive force between any two such conductive materials allows the filling of space between them by a third material that can be electronically insulating. In this manner, an electrical junction is produced, that can be the basis of all manner of devices. A great number of electronic devices rely on the existence of a resistive interfacial material between two conductive materials connected to the positive and negative terminals of the device, including resistors, capacitors, and varistors. By way of example of resistive devices that benefit from the invention, the capacitance per unit volume or weight of a capacitor can be increased by increasing the interfacial area occupied by a dielectric between two electrodes. The capacitance of an electrolytic capacitor is increased by increasing the surface area of an electrode, while the rate of discharge is increased by decreasing the spacing between the electrode surfaces. The breakdown voltage of a varistor or rectifier is lowered by decreasing the number of interfaces presenting conduction barriers between the two terminals, while the power capability of the device is improved by increasing the net interfacial area. A varistor or rectifier having the structure of the invention is improved in these characteristics.

Bipolar electronic devices include but are not limited to tunnel junctions, bipolar electrical junctions such as those that form between dissimilar metals having a difference in work function, p-n junctions, photoelectrical junctions, electrochemical junctions across which the electrical and chemical potential of ionic species varies, or photoelectrochemical junctions. Such junctions are used in electronic and magnetic devices, photodetectors, gas and chemical sensors, electrochromic displays and windows, light harvesting devices including solar cells, and energy harvesting and storage devices including fuel cells and batteries. Rectifiers, diodes, light-emitting diodes, solar cells, and gas/chemical sensors depend on the existence of p-n junctions, which are interfaces between two dissimilar materials. For example, a p-n junction between p-type CuO and n-type ZnO results in a gas sensor because the resistance of the interface is altered when gases adsorb. It is frequently desirable to increase the total area of the p-n junction to improve performance, such as the sensitivity of the sensor or the output of the light-emitting diode. However, it is necessary to maintain the two different phases at separate electrical potentials throughout. The above described materials and structures allow this to be achieved.

As is discussed above, such interpenetrating microstructures impart real advantages to the bipolar device. An interpenetrating electrode battery reduces the ion transport distance between cathode and anode and can correspondingly increase the power density possible from any given combination of storage materials. Furthermore, by reducing the amount of inert components occupying valuable mass and volume, such as metal collector foils, polymer separator, binders, conductive additives and excess electrolyte, the realizable energy density of any system of active materials can be increased. In one particular embodiment, the present invention can use solid polymer electrolytes, resulting in a solid-polymer battery usable at room temperature and below.

In one or more embodiments, materials 1 and 3 can be formed as the cathode and anode storage compounds. One or both can be a lithiated compound in order to provide a lithium ion source for the operation of the battery. These components should also be selected to provide a useful cell voltage and a high energy density (product of lithium storage capacity and cell voltage). In the case where the cathode is initially lithiated and the anode is not (e.g., $LiCoO_2$ cathode and graphite anode, yielding average cell voltage of 3.6V), the battery is typically self-organized in the discharged state. If the cathode is initially delithiated and the anode is lithiated (e.g., $V_2O_5$ cathode and LiAl anode, yielding cell voltage of 2.5-3V), the battery is typically assembled in the charged state.

Material 2 typically represents the electrolyte, which should be lithium-ion conducting but electronically insulating. This may be a polymer binder system, which typically acts as the microscale separator and into which an organic liquid electrolyte is subsequently infiltrated to provide lithium conductivity, or it may be a solid-polymer electrolyte (SPE). During processing and self-organization, the material 2 may be dissolved in a suitable solvent that is subsequently evaporated, or it may be a thermoplastic polymer for which processing and self-organization can be accomplished in the melt state. In cases where the material 2 alone does not provide repulsion between materials 1 and 3, e.g. the refractive index of material 2 is too low, a suitable high refractive index solvent for material 2 may be chosen to provide the required repulsion. The refractive index of the solvent must be sufficiently high that the solvent-material 2 solution produces repulsive forces between materials 1 and 3. As the solvent is removed from the system, the average refractive index of the remaining solvent-material 2 solution will decrease, eventually approaching that of the pure material 2. Thus the solvent and drying conditions (e.g. rate, temperature, etc.) must be chosen such that the particles are effectively immobilized in the network at the point at which the average refractive index of the solvent-material 2 solution drops sufficiently to change the van der Waals interaction from repulsive to attractive. Moreover, the drying should be uniform through the device. Inhomogeneous drying leads to porosity, net mass transfer of 2 and other heterogeneities that can result in poor performance. It has been found that use of open mesh current collectors as the deposition surface promotes uniform drying, improves the structural characteristics of the organized particles and provides a spatially more uniform layer. The open mesh current collect is a lower stress interface for the organizing particles, which may lead to the observed improvements in spatial particle distribution.

Figure 12:
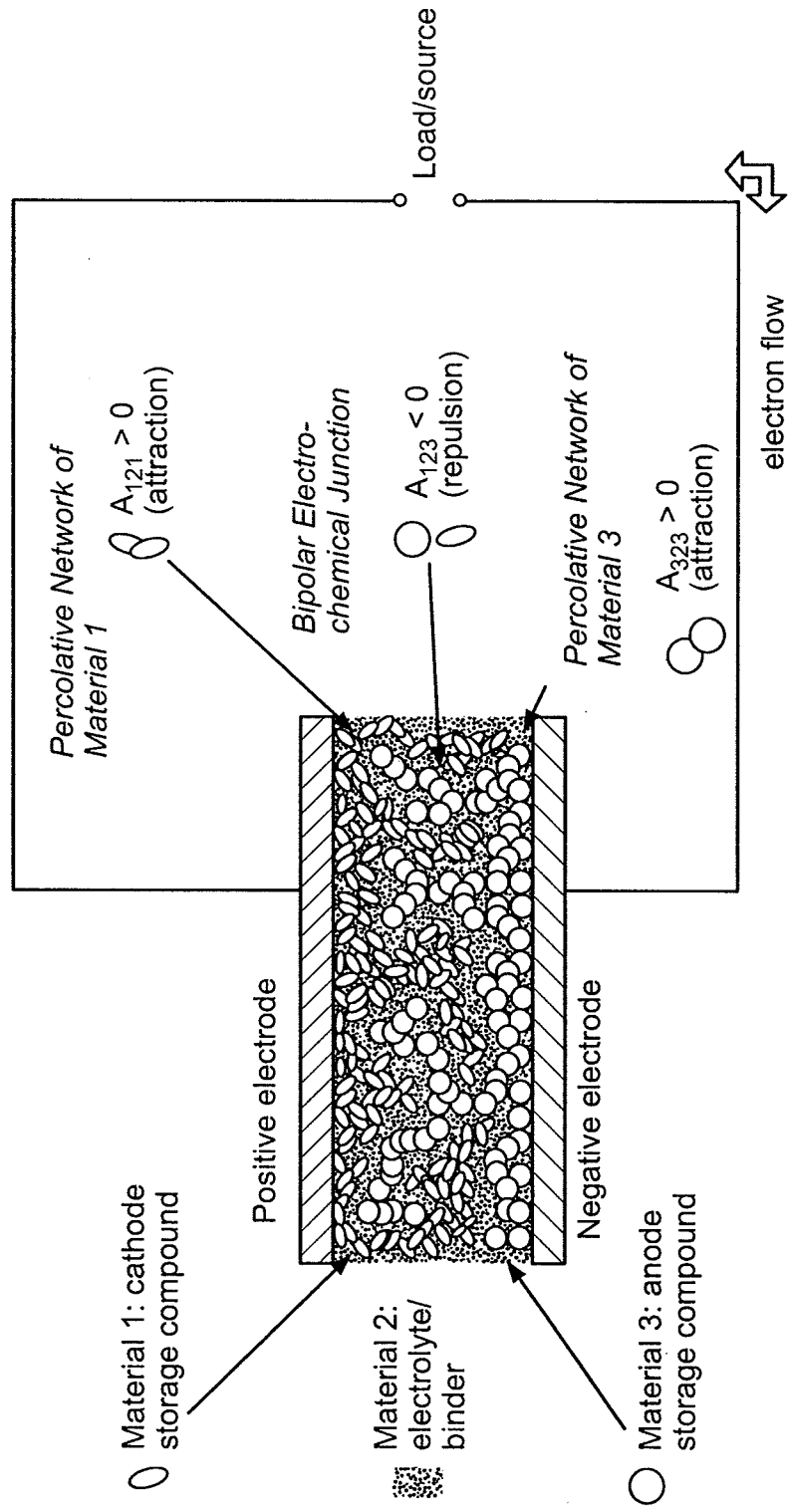
FIG. 12 is a schematic illustration showing a self-organizing bipolar device according to one or more embodiments of the present invention.
Figure 13:
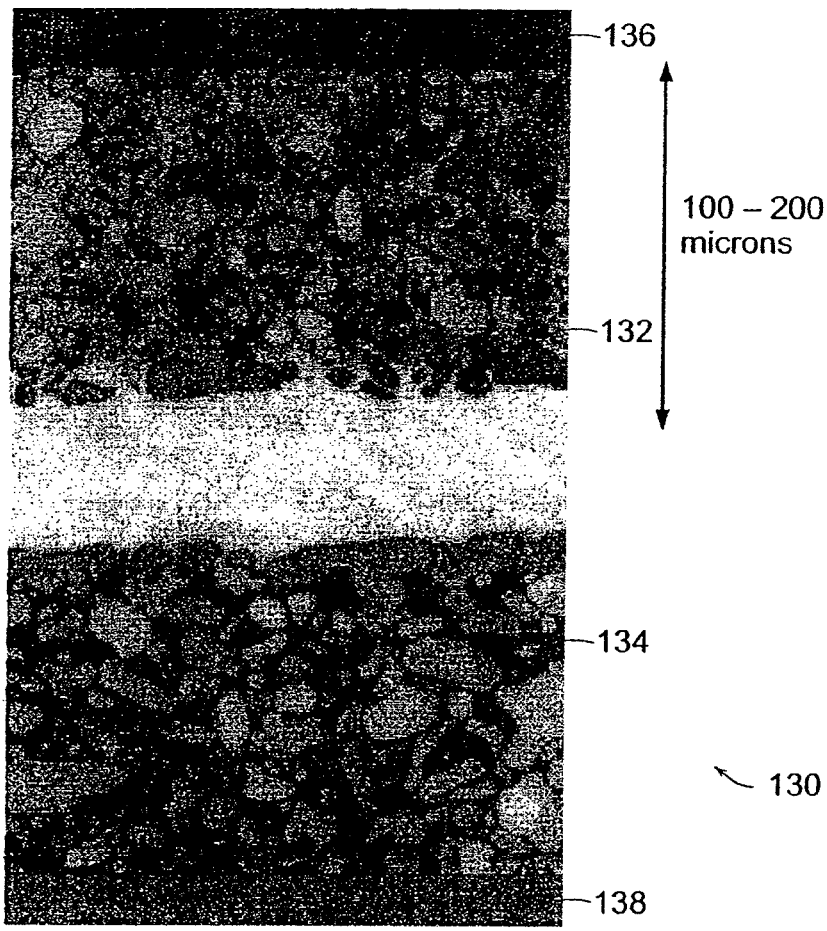
FIG. 13 is a schematic illustration, according to one embodiment of the present invention, showing the preparation of a bipolar device.

Materials 1 and 3 should also each make contact to their respective current collectors, shown as electrodes in FIG. 12. Since both interpenetrating networks can be electronically conductive, if either one makes contact to both current collectors, an internal short-circuit can result. The two interpenetrating networks should therefore each contact only one current collector. A number of possible methods can be utilized for achieving controlled segregation of the two networks, one of which is differential rates of gravitational settling. The interpenetrating network of the present invention can be seen in contrast to the structure shown in FIG. 13, which shows a photomicrograph of a cross-section of a typical laminated construction battery 130. The cathode and anode materials form a dense layers 132, 134 with very low surface area on current collectors 136, 138.

Materials 1, 2 and 3 should provide the necessary dispersion forces, i.e., $A_{123}$ should be negative, while $A_{121}$ and $A_{323}$ will be positive. The conductive compounds used as lithium storage materials (primarily transition metal oxides, carbon, or metal alloys) tend to have higher refractive indices and dielectric constants than organic compounds useful as the electrolyte or binder (material 2).

Figure 14:
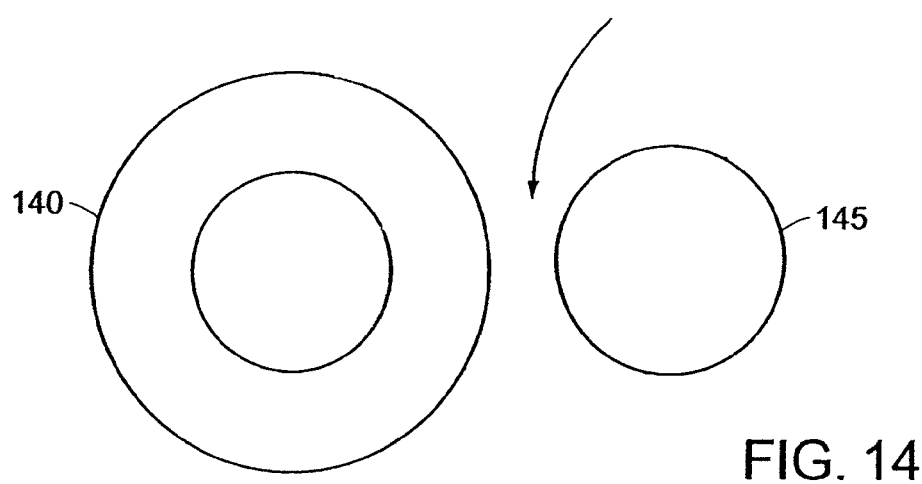
FIG. 14 is a schematic illustration showing another embodiment of the present invention related to coating a material to obtain desirable dispersion forces.
Figure 15A:
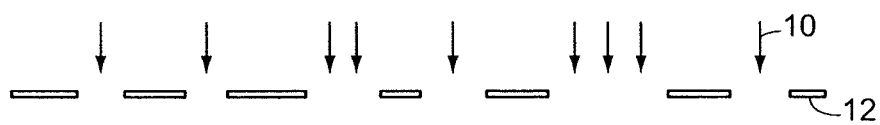
FIG. 15A-15D illustrate a sequential fabrication of a device of the present invention according to an embodiment of the invention.
Figure 15B:
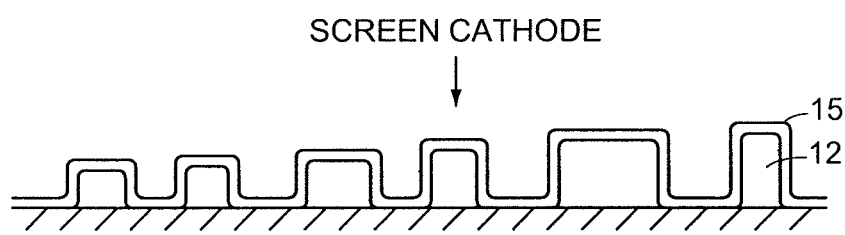
Figure 15C:
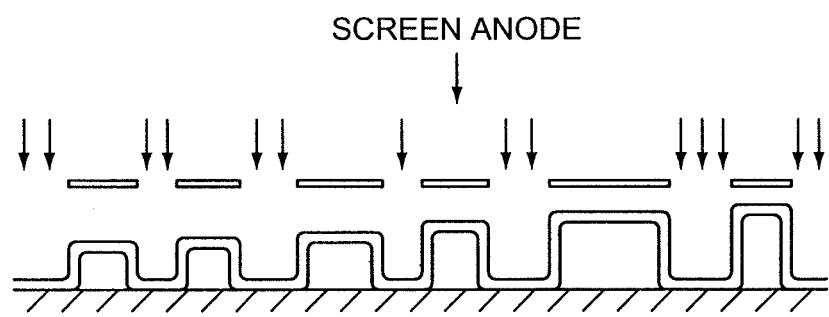
Figure 15D:
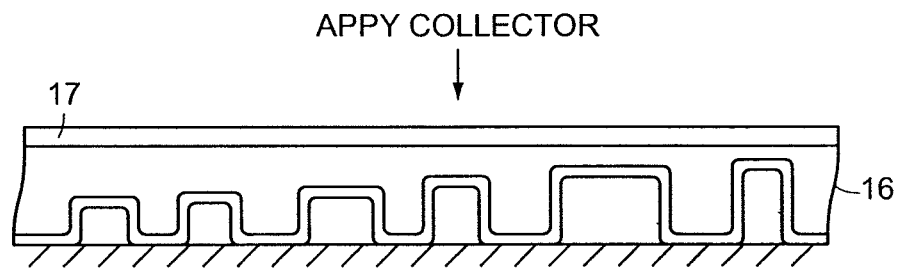
Figure 16A:
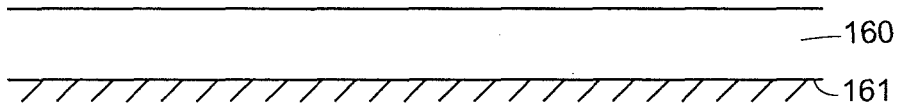
FIG. 16A-16D illustrate a sequential fabrication of a device of the present invention according to an embodiment of the invention.
Figure 16B:
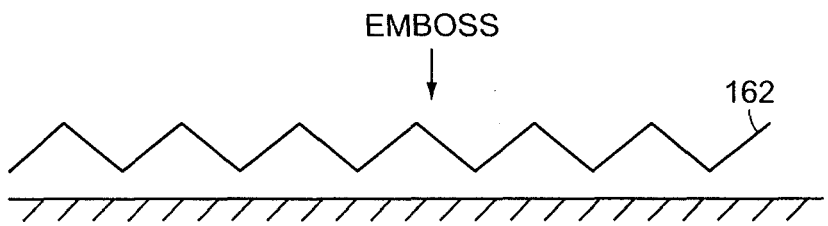
Figure 16C:
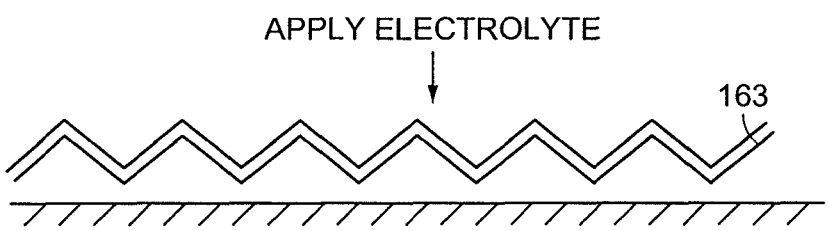
Figure 16D:
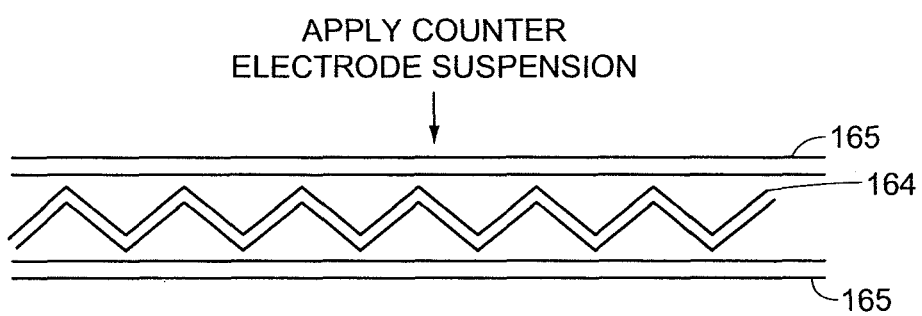

Thus, some otherwise desirable combinations of cathodes and anodes cannot achieve negative $A_{123}$ using the intrinsic materials properties. Accordingly, as schematically shown FIG. 14, a coating can be applied to any of material 1 and 3 so that the combination results in appropriate repelling forces. That is, a coating can be applied to any of materials 1 and 3 to provide a negative $A_{123}$. This is most typically achieved by altering the refractive index of the particle by selecting a coating having a suitable index value. In one or more embodiments, the coating is electronically percolating and ionically conductive.

The coating can be an organic polymer, an inorganic glassy or crystalline compound, or a blend or admixture or composite or solid-solution of the two. The coating can also provide electronic or ionic conductivity. By way of example, the coating can be a conductive polymer or polymer blend that has dielectric and optical properties providing a negative $A_{123}$. Polyaniline, polypyrrole, and their derivatives can be a constituent of such blends. As another example, the coating can be a glassy or crystalline oxide, or solid-solution or blend of oxides, that provide electronic and ionic conductivity while also providing a negative $A_{123}$. According to the invention, methods such as sol-gel synthesis, or encapsulation from solutions and suspensions of such materials, are used to provide coatings. Vanadium oxides $VO_x$ containing multivalent vanadium, and mixtures of vanadium oxide with low refractive index oxides such as boron oxide $B_2O_3$, silicon oxide, SiO or $SiO_2$, or phosphorus pentoxide $P_2O_5$, are included amongst such coating materials.

Coating the storage particle permits a much wider range of storage materials to be used without being restricted to only those that have the dielectric and refractive index properties to provide $A_{123}<0$. Current collectors also may be coated, in this case to provide an attractive surface force between the collector and its electrode so that the electrode organizes preferably against its surface.

Applying the selection criteria described above, numerous combinations of materials 1, 2 and 3 can be selected, such combinations can, with the use of the teachings provided by the invention can potentially be determined by those skilled in the art. Table 1 lists several exemplary materials and combinations but is not exhaustive.

TABLE 1

Dispersion-Force Organized Battery Systems

| System | Material 1 (Cathode) | Material 2 (Separator/Electrolyte) | Material 3 (Anode) |
|---|---|---|---|
| 1 | $LiCoO_2$<br>Mg-doped $LiCoO_2$<br>$LiMn_2O_4$<br>$LiMnO_2$<br>$LiNiO_2$ | Poly(ethylene oxide) (PEO or PEG)<br>poly(styrene) (PS)<br>poly(acrylonitrile) (PAN) (each doped with a lithium salt for $Li^+$ conductivity)<br>Polypropylene oxide<br>Methoxyethoxyethoxy phosphazine (MEEP)<br>Poly(imides)<br>Poly(amines)<br>PEO or PVDF dissolved in a high refractive index solvent such as diiodomethane, 1,3-diiodopropane, N,N-dimethylformamide (DMF), bromobenzene, cyclohexane, or dimethylpropylene urea (DMPU), the solvent being subsequently evaporated and an organic liquid electrolyte being infused. | Mesocarbon microbeads (MCMB) or, an unlithiated metal anode, such as Sn, Zn, Al, or Si, in each case coated with:<br>POMA/PVDF or<br>POTh/PVDF |
| 2 | Cathodes as in System 1, coated with:<br>POMA/PVDF<br>POTh/PVDF<br>PEDT/PTFE<br>PEDT/PP<br>PEDT/HDPE | Same as in System 1 | Mesocarbon microbeads (MCMB)<br>an unlithiated metal anode, such as Sn, Zn, Al, or Si |
| 3 | $LiFePO_4$<br>$Li_2Fe_2(SO_4)_3$,<br>$V_6O_{11}$<br>$V_2O_5$ | Same as in System 1 | Mesocarbon microbeads (MCMB)<br>a lithiated metal anode such as Li, LiAl, $Li_3Al$, LiZn, LiAg, $Li_{10}Ag_3$, $Li_5B_4$, $Li_7B_6$, $Li_{12}Si_7$, $Li_{21}Si_8$, $Li_{13}Si_4$, $Li_{21}Si_5$, $Li_5Sn_2$, $Li_{13}Sn_5$, $Li_7Sn_2$, $Li_{22}Sn_5$, $Li_2Sb$, $Li_3Sb$, LiBi, or $Li_3Bi$, |
| 4 | $LiFePO_4$<br>$Li_2Fe_2(SO_4)_3$,<br>$V_6O_{11}$<br>$V_2O_5$ | $Li_2O·B_2O_3$—$Bi_2O_3$ glass<br>$Li_2O$—$B_2O_3$—PbO glass | Mesocarbon microbeads (MCMB)<br>a lithiated metal anode such as Li, LiAl, $Li_3Al$, LiZn, LiAg, $Li_{10}Ag_3$, $Li_5B_4$, $Li_7B_6$, $Li_{12}Si_7$, $Li_{21}Si_8$, $Li_{13}Si_4$, $Li_{21}Si_5$, $Li_5Sn_2$, $Li_{13}Sn_5$, $Li_7Sn_2$, $Li_{22}Sn_5$, $Li_2Sb$, $Li_3Sb$, LiBi, or $Li_3Bi$, |
| 5 | Cathodes as in System 1, coated with:<br>vanadium oxide<br>hydrated vanadium oxide<br>vanadium oxide - PEO blend<br>vanadium-boron-oxide<br>vanadium-silicon-oxide<br>vanadium-phosphorus-oxide | Same as in System 1 | Mesocarbon microbeads (MCMB)<br>an unlithiated metal anode, such as Sn, Zn, Al, or Si |

That is, in some embodiments, cathode or anode can include, but are not limited to, one or more of $LiCoO_2$, $Li(Mg_xCo_{1-x})O_2$, $LiNiO_2$, $LiMn_2O_4$, $LiMnO_2$, $Li(Al_xMn_{1-x})O_2$, $LiFePO_4$, $Li_2Fe_2(SO_4)_3$, $V_2O_5$, $V_6O_{11}$, C, amorphous carbon, graphite, mesocarbon microbeads (MCMB), Li, LiAl, $Li_9Al_4$, $Li_3Al$, Zn, LiZn, Ag, LiAg, $Li_{10}Ag_3$, B, $Li_5B_4$, $Li_7B_6$, Ge, Si, $Li_{12}Si_7$, $Li_{21}Si_8$, $Li_{13}Si_4$, $Li_{21}Si_5$, Sn, $Li_5Sn_2$, $Li_{13}Sn_5$, $Li_7Sn_2$, $Li_{22}Sn_5$, Sb, $Li_2Sb$, $Li_3Sb$, Bi, LiBi, $Li_3Bi$, $SnO_2$, SnO, MnO, $Mn_2O_3$, $MnO_2$, $Mn_3O_4$, CoO, NiO, FeO, $LiFe_2O_4$, $TiO_2$, $LiTi_2O_4$, or Sn—B—P—O compounds or glass.

In some embodiments, material 2 can include, but is not limited to, one or more of the following, selected to provide a repelling interaction or to wet between materials 1 and 3, organic materials such as poly(ethylene oxide) (PEO), poly (styrene) (PS), poly(acrylonitrile) (PAN), poly(vinylidene fluoride) (PVDF), diiodomethane, 1,3-diiodopropane, N,N-dimethylformamide (DMF), dimethylpropylene urea (DMPU), ethylene carbonate (EC), diethylene carbonate (DEC), dimethyl carbonate (DMC), propylene carbonate (PC), block copolymer lithium electrolytes, the preceding to be doped with a lithium salt such as $LiClO_4$, $LiPF_6$, $LiAsF_6$, $LiHgI_3$, $LiCF_3SO_3$ and $LiBF_4$ to provide lithium ionic conductivity or inorganic materials such as LiI, LiF, LiCl, $Li_2O$—$B_2O_3$—$Bi_2O_3$ compounds including glass, $Li_2O$—$B_2O_3$—$P_2O_5$ compounds including glass, $Li_2O$—$B_2O_3$—PbO compounds including glass, a sol or gel of the oxides or hydroxides of Ti, Zr, Pb, or Bi.

According to another embodiment, the separator/electrolyte can be an inorganic glassy material selected to have sufficiently high refractive index to provide a repelling dispersion force between the cathode and anode compounds, as well as sufficiently high lithium ionic conductivity and low electronic conductivity to act as an electrolyte.

In those embodiments where a coating is used for materials 1 or 3, the coatings include, but are not limited to blends of the electronically conductive polymers poly(o-methoxyaniline) (POMA) or poly(3-octylthiophene) (POTh) with PVDF or PEO, or polypyrrole, polyanilne and derivatives thereof, or glassy or crystalline oxides such as vanadium oxides $VO_x$ containing multivalent vanadium, and mixtures of vanadium oxide with low refractive index oxides such as boron oxide $B_2O_3$, silicon oxide, SiO or $SiO_2$, or phosphorus pentoxide $P_2O_5$. Methods for forming such coatings are well-known to those skilled in the art of polymer chemistry, sol-gel chemistry, and colloid chemistry.

A coating can be used on the cathode storage compound or the anode storage compound in order to obtain a repelling dispersion force between the two, using the separator/electrolytes given. The separator/electrolyte material can be selected to give a repelling dispersion force between the coated or uncoated cathode and anode storage compounds.

In those embodiments where the current collector is coated to provide an attractive surface for one of the materials 1 or 3 (but not the other), suitable coatings include an electronically conductive material having the appropriate refractive index.

The high interface surface area and porous electrode devices of the present invention can be made by a variety of methods.

1. Reticulating and Interdigitated Structures.

Reticulating and interdigitated structures can be prepared using any suitable technique, including but not limited to, sequential deposition of electrolyte particles, printing of the cathode or anode followed by coating with a suitable electrolyte and/or counter electrode material, embossing of a electrode layer, followed by coating with a suitable electrolyte and/or counter electrode, and subtractive patterning followed by filling.

In sequential deposition and referring to FIGS. 15A-15D, a suspension 150 of fine particles of a cathode material in solution with a binder and optionally other additives, such as for example a conductive additive such as carbon, is deposited on a substrate 151 in a structured layer 152 using stenciling, screen printing, inkjet printing, thermal transfer printing, patterned gravure coating, or lithographic methods, illustrated at 154. The microstructural features of the cathode and the size and spacing of the features deposited by these methods is referred to as the lateral resolution of the printed layer. A metal foil or fine mesh current collector can be used as the substrate 151 or the structured layer may be first applied to an intermediate transfer substrate. The binder and solvent system can provide a conductive layer 155 on the deposited cathode, in which cases the binder is a solid polymer electrolyte. Alternatively, an electrolyte layer can be deposited in a separate step. An anode suspension 158 can be deposited in a manner similar to that used for the cathode to form anode 159. See, FIG. 15C. A subsequent layer of anode suspension optionally is applied to form a continuous upper layer to which a current collector 157 is applied. The resultant device 156 contains mated or conformal electrodes with a thin electrolyte separator therebetween. Multiple alternating deposition steps provide a laminate cell.

In printing and coating, a first electrode having a reticulated or interdigitated structure is deposited as described above and as shown in FIGS. 15A and 15B by depositing a fine particulate structure using stenciling, screen printing, inkjet printing, thermal transfer printing, patterned gravure coating, or lithographic methods 154. A continuous film 155 of binder or polymer electrolyte is deposited on the structure to form a physical separation between the deposited electrode and the second electrode. The film can be formed by self-segregation (wetting) of the binder solution to the free surface of the printed electrode. Optionally, the surface film can be formed by coating with a liquid binder or electrolyte solution followed by drying, or by vapor deposition techniques known to those skilled in the art of thin film materials preparation.

A conformal coating of a liquid suspension can be applied to the formed structure to create the counter electrode. The indentations of the latter fill in complementary fashion to the structure of the first electrode, leaving a smooth and flat outer surface to which a current collector 157 is subsequently applied. Multiple coatings may be used to achieve conformal filling. The system can then be dried and optionally heated for consolidation. A current collector can be applied to one or both surfaces to complete the system.

In embossing and coating and referring to FIGS. 16A-16D, a first electrode layer 160 is obtained containing electrode material, binder and optional additives to form a thin film on a substrate 161. This layer is formulated by methods known to those skilled in the art to have rheological characteristics appropriate for thick film processing, for example, by screen printing, tape casting, web coating, and similar processes. The surface of the first layer is then embossed with a die to leave a reticulated or other surface 162 with dimensions as desired. Depending upon the formulation of the first layer, the embossing may be done on a fully dried layer or while the layer is still in a 'gelled' state and then dried. A conformal coating of a liquid suspension can be applied to the formed structure to create the counter electrode 164. The indentations of the latter fill in complementary fashion to the structure of the first electrode, leaving a smooth and flat outer surface to which a current collector is subsequently applied. The assembly is dried and optionally heated for consolidation and a current collector 165 is applied. A film 163 of binder or electrolyte is applied before or after the embossing step, and before coating with the counter electrode formulation.

In subtractive patterning, a first layer of electrode is treated to remove material from the layer and to thereby obtain a reticulated or otherwise structured surface. The first layer can be deposited as described above for particulate materials. In other embodiments, the first electrode layer can be a solid thin film and can be deposited by known techniques such as sputtering, evaporation, or chemical vapor deposition. The layer of first electrode is subtractively patterned, that is, material is removed, to form the reticulated or interdigitated electrode topology of the invention, by lithographic masking followed by chemical or reactive-ion etching, laser removal, or other such methods known in thick and thin film materials processing. Upon the patterned first electrode is optionally deposited a film of binder or electrolyte, followed by coating with the counter electrode so as to conformally fill the pattern in the first electrode.

A further method for fabricating the structured surface makes use of 'templates', which define the desired structure in terms of the complementary pattern. The templates are often made by embossing the complementary structure into a softened plastic such as Cellulose Acetate Butyrate (CAB). A template is used by coating the desired material, in this case the electrode slurry, onto a continuous web containing the template. After drying the electrode coating, the structure would typically be laminated to a current collector onto which was coated a conductive adhesive. After lamination and peeling, the structured electrode is removed from the template and then used in subsequent steps outlined above. The template is then re-used, often as a moving belt on a manufacturing line.

A still further method for fabricating the structured surface makes use of a relatively new process called micro stereolithography. In this process use is made of photopolymerizable monomers into which an electrode particle can be dispersed. A dispersion of this material can be applied by well known coating methods onto a moving web and then the monomers can be polymerized by patterned exposure with radiation of a wavelength consistent with absorption and reaction of an included initiator in the dispersion. Unpolymerized dispersion can be removed and recycled. Monomers can be selected such that upon polymerization they can function as a binder that is permeable to the electrolyte.

2. Graded Porosity Structures.

Graded porosity electrodes can be prepared using any suitable technique including, but not limited to, differential sedimentation and sedimentation using a fugitive filler.

It is well-known to those skilled in the art of powder processing that the Stokes' settling rate of particles in a fluid is a function of the size and shape of the particles, the difference in density between the particle and the fluid within which it is settling, and the fluid viscosity. For the same particle material, smaller particles tend to settle slower than larger particles, and anisometric particles such as rods of large length to diameter ratio, or plates of large width to thickness ratio, settle at a slower average rate than spheres or equiaxed particles of identical volume. It is furthermore known that highly aspected particles tend to settle to a lower packing density than equiaxed particles of the same material. Therefore a method for introducing a porosity gradient into a layer of storage electrode fabricated from a powder mixture or suspension is use a mixture of particle sizes and shapes.

A suspension of electroactive particles is formulated containing equiaxed particles and platelet-shaped particles, with the particles sizes selected such that the equiaxed particles have a higher Stokes' settling velocity to allow differential sedimentation of the electroactive particles. The powder is formulated with a binder (such as PVDF), a fine conductive additive (such as high surface area carbon) and a solvent to produce a castable suspension. The film is cast, printed, or coated on a metal foil current collector or an insulating film, whereupon differential sedimentation occurs under the force of gravity resulting in a higher packing density of equiaxed particles in the portion of the electrode adjacent to the metal current collector, and a lower packing density of anisometric particles away from the metal current collector. This introduces a desired porosity gradient in the electrode. After drying, the electrode is laminated with a separator and a counter electrode and infused with organic liquid electrolyte to produce a battery cell. A graded porosity carbon anode is produced in like manner.

In one or more embodiments, the electrode storage material is mixed in the suspension with one or more additional solid materials, which upon heating are removed, thereby leaving behind porosity. Therefore the solid material that is removed is a "fugitive" pore former. The density, particle size and size distribution, and particle shape of the electrode storage material and the fugitive pore former are selected to provide a differential Stokes' settling rate giving in the final product a more densely packed storage material adjacent to the current collector, and less densely packed storage material adjacent to the separator.

In one or more embodiments, the fugitive pore former consists of particles of an organic or inorganic compound with a melting point between about 0° C. and 800° C. The preparation of the suspension and the casting process are carried out below the melting point of the compound. Subsequently, the cast, printed, or coated film is heated above the melting point of the organic compound allowing it to be drained or evaporated from the porous electrode, leaving a desired porosity gradient.

In one or more embodiments, the fugitive pore former consists of particles of an organic or inorganic compound that reacts with oxygen or nitrogen gas to form volatile gaseous species. The preparation of the suspension and the casting process are carried out at a temperature or in an atmosphere in which the reaction does not occur. Subsequently, the cast, printed, or coated film is heated in a reactive atmosphere to volatilize the pore former, leaving a desired porosity gradient.

In another embodiment, thin layers with increasing levels of porosity are stacked on top of each other in the direction of the separator.

Figure 17:
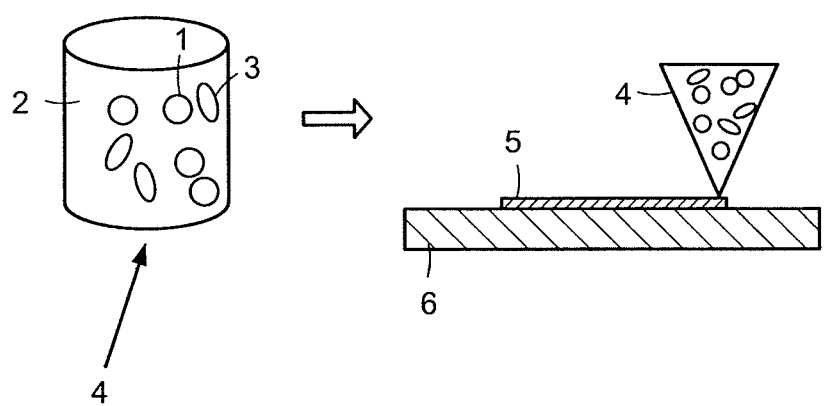
FIG. 17 illustrates a self-organizing fabrication of a device of the present invention according to an embodiment of the invention.

3. Interpenetrating Structures.

a. Self-organization. The three components (anode, cathode, and electrolyte) possess intrinsic characteristics such that in the appropriate thermophysical regime the anode and cathode particles spontaneously wire themselves and the electrolyte occupies all positions between the anode and cathode particles. Interpenetrating structures can be fabricated using the principles of self-organization described herein In one or more embodiments, the invention provides a construction whereby the electrode materials, 1 and 3, can be suspended in a liquid 2 that comprises a binder or Li electrolyte, or a solution of a binder or Li electrolyte in a suitable solvent (material 2). The suspension 4 is cast as a film 5 on a substrate 6 as schematically shown in FIG. 17. The liquid, 2, provides a repelling force between the two electrode materials, 1 and 3, but provides an attractive force between particles of 1 alone and between particles of 3 alone. A continuous percolating network of particles 1 and of particles 3 is obtained, but the two networks while being interpenetrating do not make electronic contact to one another due to the presence of the intervening material 2. This process of freezing the segregated structure is known as "curing." After drying, or solidification by cooling, of the intervening material 2, the electrode materials 1 and 3 remain prevented from making electronic contact with one another and when material 2 is a suitable Li electrolyte, or when the porous composite structure is infused with a liquid electrolyte, a battery is obtained.

In another embodiment, two separate suspensions of material 1 and material 3 are prepared. The suspensions can be deposited as two layers the particles are allowed to interdiffuse. The system is quenched or dried after a defined period of particle interdiffusion, which results in co-continuous, interpenetrating networks of material 1 and material 3.

In one embodiment of the invention, methods of segregating at least a portion of the particles or materials comprising the interpenetrating networks for forming the different electrodes or poles of a bipolar device is provided.

Figure 18:
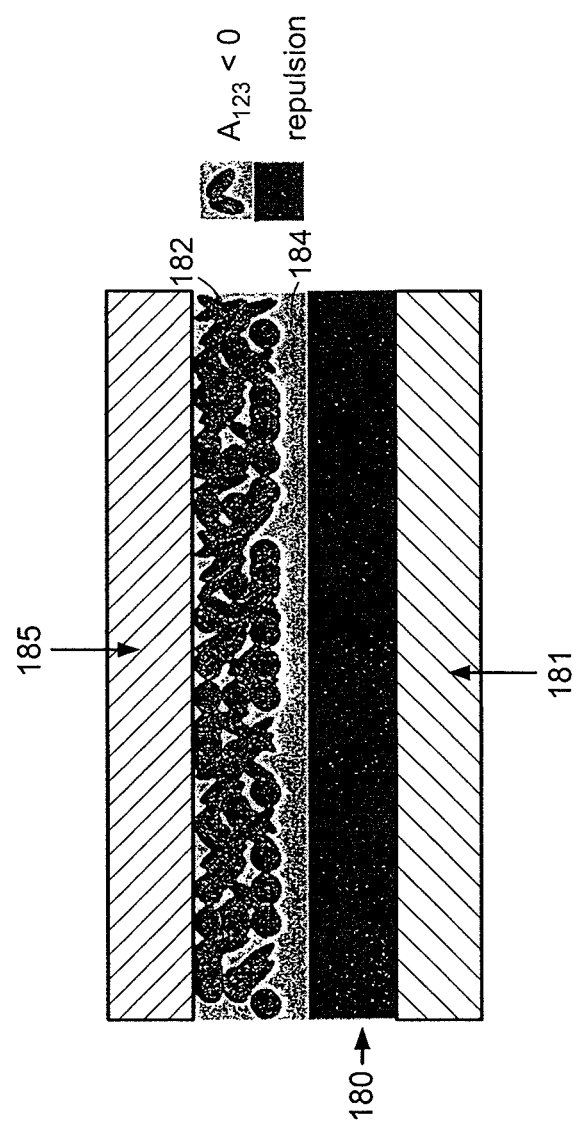
FIG. 18 is a schematic illustration showing another bipolar device according to one embodiment of the present invention.

In another embodiment, the present invention is directed to a layered construction whereby one electrode, material 1, is in the form of a continuous layer or film, onto which is deposited a suspension 182 of the other electrode, material 3, in a liquid 184 containing material 2, thereby providing a repelling force between the two electrode materials as in FIG. 18. Here percolation of the particulate electrode is required, while negative $A_{123}$ between the particulate electrode and the solid film electrode provides electronic isolation. After drying, or solidification by cooling, of the intervening material 2, the electrode materials 1 and 3 can be prevented from making electronic contact with one another. A current collector 185 is applied, and when material 2 is a suitable Li electrolyte, or when the porous composite structure is infused with a liquid electrolyte, a battery is obtained. Alternatively, both materials 1 and 3 may be continuous films and material 2 is deposited onto either material 1 or 3 before the other electrode material is joined to the layered structure, wherein the repulsive force acts to separate the two films.

In other embodiments, in order to have current collectors make contact to each of the two co-continuous, interpenetrating networks of electrode material separately, one of the following fabrication methods can be used.

In one embodiment, the densities of materials 1, 2 and 3 are selected such that both materials 1 and 3 float in material 2, or both sink in material 2. However, the rate of floating or sinking of materials 1 and 3 are different, due to differences in density or particle size or particle shape between materials 1 and 3. That is, the Stokes settling or floating rates of materials 1 and 3 differ. This can result in segregation whereby one of the two materials can be enriched on top with respect to the other and the other enriched on bottom. After drying, or solidification by cooling, of the material 2, the excess of material 2 if present can be removed from the top of the composite structure (if materials 1 and 3 have sunk) or from the bottom of the composite structure (if materials 1 and 3 have floated). Current collectors can be attached to or deposited on the top and bottom surfaces of the segregated layers, each contacting essentially only one of the two electrode material networks.

In another embodiment, current collectors can be applied to the top and bottom surfaces of the suspension of materials 1 and 3 in liquid material 2. The material used for the top current collector can be selected so that it has an attractive force to only one of material 1 or material 3. The material used for the bottom current collector can be selected to have an attractive force to the other. The current collector optionally may be coated with an electronically conducting material that is attractive to the appropriate conductor material. As co-continuous, interpenetrating networks of materials 1 and 3 are formed, one network makes contact to the top current collector and the other to the bottom. Segregation under gravitational force as described above may be simultaneously present. In one embodiment, the two current collectors can be continuous pieces or suspensions of materials 1 and 3 respectively, in which case the current collector made of material 1 contacts the continuous network of material 1 and the current collector made of material 3 contacts the continuous network of material 3. In another embodiment, the invention provides a construction whereby the current collectors can be attached to the edges of a sheet of self-organized battery material. The suspension described above can be formed into a sheet on a supporting material, which can be preferably electronically insulating. Within this sheet, co-continuous interpenetrating networks of material 1 and material 3 subsequently form. The current collectors described above can be applied to the edges of the sheet. At one edge a current collector thereby makes contact to one of the percolative networks, either material 1 or 3, but not the other. At the other edge, a current collector makes contact to the other percolative network.

Various methods are used to preferentially "wire" or electrically connect an electrode network to a particular current collector. The anode and cathode networks should be wired to only their respective current collectors after the self-organizing mixture is cured. One way of achieving proper wiring uses surface forces on the anode and cathode particles for proper positioning. The principles that allow the respective networks to form and yet repel each other can be used to wire the networks to their respective current collectors. Each current collector has a surface that will attract either the cathode or the anode and repel the other. For example, if London dispersion forces are used, then one current collector can be coated with a thin layer of a conductive low refractive index material, such as a conductive polymer blend, which would attract a low refractive index active material (e.g., an appropriately encapsulated $LiCoO_2$ particle) and repel a high refractive index active material (e.g., MCMB). The opposing current collector would have a high refractive index (such as, e.g., pure Cu), which would have the opposite effect. Because such surface forces are strong over relatively short length scales (less than about a few microns for London dispersion forces in most systems), the self-organizing mixture is preferably very well mixed such that the anode and cathode particles are randomly and homogeneously distributed on a micron level length scale.

Alternatively, fields such as gravity or magnetism may be used to wire the cathode and anode networks to respective their current collectors with appropriate selection of materials. In the case of gravity, materials can be selected such that a density contrast would result. For example, the density of an anode such as MCMB would be less than that of a solvent+ electrolyte such as DIM+PEO+Li salt, which would be less than that of a cathode such as $LiCoO_2$. In such a system the anode current collector would be above the cathode current collector.

Alternatively, a layered approach can be used in conjunction with surface forces. In this approach a thin (~10× the active particle diameter) coating of only the type of active material appropriate for connection to a current collector is coated in its immediate proximity sequentially. For example, a bottom current collector is deposited, then a layer of the appropriate active material is deposited, followed by a layer of self-organizing mixture of the nominal thickness of the cell layer, followed by a layer of the other active material, followed by the other current collector, etc. Due to the high loading of the active materials (>~50%), shorting will not result.

By casting such suspensions onto a current collector and depositing or laminating a second current collector on the top surface, a completed battery results. This basic approach can be extended to various fabrication methods and battery types, including, but not limited to printable microbatteries (e.g., using direct-writing methods), spin-on thick film batteries, screen-printed patterned batteries, tape-cast thick film batteries and continuously coated laminates for bulk batteries.

b. Sequential assembly. In this approach, a first highly 'open' porous electrode, for example, sintered LMCO, is fabricated with pore diameters much greater than the primary particle size of the opposite electrode material. The interior pore space is then coated with a precursor to an electrolyte, for example, a PEO and electrolyte salt solution. This coated perform is then infiltrated with a mixture including the opposite electrode material, for example, MCMB, and optionally a precursor to an electrolyte, for example, a PEO and electrolyte salt solution.

This first porous electrode structure is formed partially or completely of a storage electrode material by processes including but not limited to the pressing, aggregation, or sedimentation of particles or coated particles. The particles are optionally heat treated or sintered to improve the strength and electrical conductivity of the porous structure. A removable pore-forming material, or phase-separation or precipitation of the constituents of the structure from a liquid or solid followed by removal of a pore forming material, can be used to form the structure. Lamination of porous layers, layer-by-layer additive or subtractive deposition methods such as lithographic patterning and selective etching or three-dimensional printing of the material of the structure, or a combination of methods can be used to form the structure.

Upon the surfaces of this first porous structure is formed an electronically insulating layer that is conductive to the ionic species that are transported during the operation of the electrochemical device. The electronically insulating layer is an organic or inorganic solid electrolyte or is a separator that is subsequently infiltrated with a liquid or solid electrolyte to provide ionic conductivity to the layer. The electronically insulating layer coats the internal and external surfaces of the first structure, and is formed by methods including, but not limited to, infiltration of the first structure with the insulator in a molten form, infiltration with a liquid containing the constituents of the insulator, deposition of the insulator constituents from a vapor phase such as by chemical or physical vapor deposition or plasma-enhanced deposition, reaction of the material of the first structure with a vapor phase or a deposited material to form the surface insulating layer, electrolytic or electrochemical deposition, or a combination of such methods. The insulating layer is formed in one or in multiple process steps. The structure has substantially open porosity after the insulating layer is formed on internal surfaces of the first structure.

The open porosity in the insulator-coated first structure is then infiltrated with the second electrode material, or a composite mixture containing the second storage material, resulting in a second interpenetrating electrode that substantially occupies the pore space in the first structure. The second interpenetrating electrode forms an electronically conductive network, and is electronically isolated from the first electrode by an intervening electrolyte layer. The second electrode material is infiltrated by several methods including as a melt, as a vapor phase species, by electrolytic or electroless plating, as a liquid solution that subsequently dries or is reacted to form the second electrode material, or as a suspension of the second electrode material in a liquid. In the instance of a suspension, the liquid in which the second electrode material is dispersed is optionally a liquid or solid electrolyte, or contains a binder or the constituents of an electrolyte in a solvent or contains a material that improves the electronic conductivity of the second interpenetrating electrode, such as fine carbon or metal particles, or the constituents of an electronically conductive polymer. After infiltration by the second electrode material and the attachment of a second current collector to this material, a device comprising interpenetrating electrodes is obtained.

Optionally, the first structure is infiltrated with a fluid comprising the second electrode material, and a reaction of the first structure with the second electrode material or other constituents of the fluid is used to form the electrolyte layer.

Optionally, the first structure is infiltrated with a suspension containing the second electrode material and a repulsive force results between the two electrode materials causing their electronic isolation from each other. A hybrid approach to fabricating interpenetrating networks includes the use of an open porous electrode, which serves as the first material in a self-organizing system. A suspension of the second electrode in an electrolyte is infiltrated into the porous network (or the two step fabrication is used). The second electrode particles (material 3) and electrolyte (material 3) are selected to exhibit the desired attractive and repulsive forces of a self-organizing system. Thus, the electrolyte will preferentially coat the walls of the porous electrode and the second electrode will preferentially accumulate in the interior pore space. The repulsive properties of porous electrode and second electrode particles will prevent the deposition of electrode particles on the walls of the porous form and thereby avoid shorting of the system.

c. Layer by layer growth. In this approach, the battery is built one layer at a time using a writing approach. In such an approach, individual particles of anode, cathode, and electrolyte with a predetermined length, width and height are deposited onto an appropriate substrate. Layers are built up sequentially until the overall thickness of the battery is achieved. The functional requirements are: (i) The cathode particles must be interconnected to the cathode current collector, (ii) The anode particles must be interconnected to the anode current collector, and (iii) electrolyte must separate the anode network from the cathode network. Processes that may be used include ink jet printing, laser induced forward transfer, and matrix assisted pulsed laser evaporation as well as photolithographic techniques.

The function and advantage of these and other embodiments of the present invention will be more fully understood from the examples below. The following examples are intended to illustrate the benefits of the present invention, but do not exemplify the full scope of the invention.

Example 1

Lithium Battery Prepared by Sequential Deposition

A suspension is prepared of a fine powder lithium storage cathode such as $LiCoO_2$, $LiNiO_2$, $LiMnO_2$, $LiMn_2O_4$, $LiFePO_4$, $V_2O_5$, $Li_3Bi$, $Li_3Sb$, or other such cathodes well-known to those skilled in the art in a solvent with a binder, optionally a conductive additive such as carbon, and other additives well-known to impart characteristics to the suspension allowing it to be deposited in thin layers using stenciling, screen printing, inkjet printing, or lithographic methods selected to allow a lateral resolution to the printed layer that is within the desired dimensional ranges. A separate suspension is similarly prepared of a fine powder lithium storage anode such as carbon, Sn, Sb, Al, Zn, Ag, LiAl or other anode materials known to those skilled in the art. The cathode suspension and anode suspension are deposited layer by layer, providing a periodic or aperiodic reticulated or interdigitated structure as described above and as shown in FIG. 2A-2D. Electronic contact or shorting between the cathode and the anode is avoided by selecting the solvent and binder system such that a continuous (wetting) surface layer of the binder forms upon drying, and/or by depositing the layers such that, within the same layer, cathode patterns and anode patterns are adequately separated. Optionally, a third suspension containing binder and no cathode or anode or conductive additive can be deposited in a pattern at the interface of the cathode and anode patterns to ensure electronic isolation of the two.

A metal foil or fine mesh current collector made of, for example, aluminum or copper, is used as the substrate upon which layers are deposited. Aluminum is used in one embodiment when the cathode compound forms a first continuous layer and copper is used in another embodiment when the anode forms a first continuous layer. After sequential deposition is complete, and the assembly is dried and, optionally, heated for consolidation, a second current collector can be applied to the surface of the layered battery. Optionally, the top current collector is formed by printing as a conductive ink using techniques such as those used for forming patterned interconnects as those used by those skilled in the art of electronic device fabrication. Optionally, the battery is deposited on an insulating film such as, but not limited to, polyethylene or polyester such as MYLAR® film, available from the E.I. Dupont de Nemours and Company (Wilmington, Del.), from which the battery can be subsequently removed and current collectors can be applied to form contacts with the anode and cathode.

The binder is, for example, a solid polymer electrolyte. This obviates the need for liquid electrolyte in the battery, and, in some instance, serves to bind the particles securely together in the assembled device while allowing liquid electrolyte to be infused (flooded) throughout the battery. An example of suitable solid polymer electrolyte includes, is not limited to, (poly)ethylene oxide in which a lithium salt such as lithium perchlorate or lithium triflate has been added. An example of a binder and liquid electrolyte that remains dimensionally stable, i.e., the electrolyte does not dissolve the binder, is (poly)ethylene difluoride (PVDF) and ethylene carbonate-dimethyl carbonate (EC:DMC) in a 1:1 molar ratio to which a lithium salt has been added.

Example 2

Battery Produced by Printing and Coating

A first electrode with a reticulated or interdigitated structure, either cathode or anode, is prepared using the materials and methods of Example 1. At the free surface of the printed structure, a continuous film of a binder or polymer electrolyte is formed. The film can form a physical separator between anode and cathode. The film is formed by self-segregation (wetting) of the binder solution to the free surface of the printed electrode. Optionally, the surface film is formed by coating with a liquid binder or electrolyte solution followed by drying, or by vapor deposition techniques known to those skilled in the art of thin film materials preparation.

A conformal coating of a liquid suspension is applied to the formed structure to create the counter electrode. The indentations of the latter fill in complementary fashion to the structure of the first electrode, leaving a smooth and flat outer surface to which a current collector is subsequently applied. Multiple coatings are optionally used to achieve conformal filling. The system is then dried and optionally heated for consolidation. A current collector is applied to one or both surfaces to complete the system.

Example 3

Battery Produced by Embossing and Coating

A layer of a first electrode, either cathode or anode, formulated of the materials and by the methods of Example 1, is cast or coated in a layer upon a metal foil current collector or an insulating film. This layer is formulated by methods known to those skilled in the art to have rheological characteristics appropriate for thick film processing, for example, by screen printing, tape casting, web coating, and similar processes. The surface of the first layer is then embossed with a die to leave a reticulated surface with dimensions as desired. To this shaped surface is applied a counter electrode by the conformal coating material and process described in Example 2. The assembly is dried and optionally heated for consolidation and a current collector is applied. A film of binder or electrolyte is applied before or after the embossing step, and before coating with the counter electrode formulation.

Example 4

Subtractive Patterning Followed by Filling

A layer of a first electrode, either cathode or anode, formulated of the materials and by the methods of Example 1 is cast or coated in a layer upon a metal foil current collector or an insulating film. Optionally the electrode is cast or coated as a suspension upon a metal foil current collector and fired to obtain a continuous solid film of the storage material, or deposited as a solid film by a vapor deposition process known to those skilled in the art, such as sputtering, evaporation, chemical vapor deposition. The layer of first electrode is subtractively patterned, that is, material is removed, to form the reticulated or interdigitated electrode topology of the invention, by lithographic masking followed by chemical or reactive-ion etching, laser removal, or other such methods known in thick and thin film materials processing. Upon the patterned first electrode is optionally deposited a film of binder or electrolyte, followed by coating with the counter electrode so as to conformally fill the pattern in the first electrode, by the method of Examples 2 and 3.

Example 5

Graded Porosity Electrode Produced by Differential Sedimentation

It is well-known to those skilled in the art of powder processing that the Stokes' settling rate of particles in a fluid is a function of the size and shape of the particles, the difference in density between the particle and the fluid within which it is settling, and the fluid viscosity. For the same particle material, smaller particles tend to settle slower than larger particles, and anisometric particles such as rods of large length to diameter ratio, or plates of large width to thickness ratio, settle at a slower average rate than spheres or equiaxed particles of identical volume. It is furthermore known that highly aspected particles tend to settle to a lower packing density than equiaxed particles of the same material. Therefore a method for introducing a porosity gradient into a layer of storage electrode fabricated from a powder mixture or suspension is use a mixture of particle sizes and shapes.

A suspension is made of a cathode oxide powder in which the powder contains a distribution of particle sizes and shapes. Equiaxed particles are mixed with platelet-shaped particles, with the particles sizes selected such that the equiaxed particles have a higher Stokes' settling velocity. The powder is formulated with a binder (such as PVDF), a fine conductive additive (such as high surface area carbon) and a solvent to produce a castable suspension. The suspension is formulated to allow differential sedimentation of the cathode oxide particles within a few minutes to a few hours after casting a film from the suspension. The film is cast, printed, or coated on a metal foil current collector or an insulating film, whereupon differential sedimentation occurs under the force of gravity resulting in a higher packing density of equiaxed particles in the portion of the electrode adjacent to the metal current collector, and a lower packing density of anisometric particles away from the metal current collector. This introduces a desired porosity gradient in the electrode. After drying, the electrode is laminated with a separator and a counter electrode and infused with organic liquid electrolyte to produce a battery cell. Optionally, a cathode oxide with high electronic conductivity, such as $LiMg_{0.05}Co_{0.95}O_2$, is used and no carbon additive is used.

A graded porosity carbon anode is produced in like manner, using carbon powder selected to have a mixture of equiaxed particle shapes and anisometric particles shapes, as well as differences in density that allow the Stokes' settling rates to be adjusted. In one instance MCMB are used as the equiaxed carbon particle which settles more rapidly and forms a more densely packed region adjacent to the current collector, and flake graphite with platelet particle shape is used as the anisometric carbon particle which settles more slowly and forms the lower packing density region adjacent to the separator. The porosity gradient is adjusted by selecting the relative amounts of the particle forms and the size of the MCMB and flake graphite particles.

Example 6

Graded Porosity Electrode Produced by Differential Sedimentation of a Fugitive Filler In this example, a suspension is used to form a cast, printed, or coated layer of electrode as in Example 5. However, the electrode storage material is mixed in the suspension with one or more additional solid materials, which upon heating are removed to thereby leaving behind porosity. Therefore the solid material that is removed is a "fugitive" pore former. The density, particle size and size distribution, and particle shape of the electrode storage material and the fugitive pore former are selected to provide a differential Stokes' settling rate giving in the final product a more densely packed storage material adjacent to the current collector, and less densely packed storage material adjacent to the separator.

In one instance the storage material is an oxide cathode such as $LiCoO_2$, $LiMg_{0.05}Co_{0.95}O_2$, $LiMnO_2$, or $LiFePO_4$. The fugitive pore former is MCMB, selected to have a particle size giving a slower Stokes' settling rate than the cathode oxide. A suspension is prepared containing these two solids as well as a solvent and optionally a binder, the specific formulation being selected to allow differential sedimentation of the cathode oxide and MCMB. The suspension is cast, printed, or coated on a metal current collector and fired in an oxidizing ambient that pyrolyses the MCMB and sinters the cathode oxide to form a connected layer. The sintered porous cathode layer contains a desired porosity gradient once the MCMB has been removed.

In another instance, the fugitive pore former consists of particles of an organic or inorganic compound with a melting point between about 0° C. and 800° C. The preparation of the suspension and the casting process are carried out below the melting point of the compound. Subsequently, the cast, printed, or coated film is heated above the melting point of the organic compound allowing it to be drained or evaporated from the porous electrode, leaving a desired porosity gradient.

In still another embodiment, the fugitive pore former is a solid with a high vapor pressure, such as naphthalene or ice, and which is removed by sublimation rather than melting, leaving a desired porosity gradient.

Example 7

Selection of Materials for Self-Organizing Bipolar Structure

For the cathode, Mg-doped $LiCoO_2$ (5 mole % doping) can be chosen as a lithiated compound due to its high electronic conductivity compared to undoped $LiCoO_2$. This can assist in achieving high electronic conductivity in the percolating network of cathode particles. The anode can be MCMB (mesocarbon microbeads), a graphitic carbon developed by Osaka Gas Company that is already in widespread use in commercial lithium ion batteries. This material has spherical morphology and a size in the range of 2-25 μm allowing sufficiently rapid Li ion diffusion for high discharge power density. Note that the Mg—$LiCoO_2$/MCMB system can be completely voltage-compatible with existing lithium ion batteries and can be a direct replacement for current technology.

Table 1 lists solid polymer electrolytes that can be used as material 2. Each is known to be a good lithium ionic conductor when appropriately doped with a lithium salt. For example, 80 wt. % PEO/20 weight % $LiClO_4$ or 80 wt. % PAN doped with 20 wt. % $LiClO_4$ can be a suitable electrolyte. These polymers have refractive indices in the range n=1.46-1.54 (PEO), 1.52 (PAN) and 1.59 (PS). They can be processed as melts or dissolved in a suitable high refractive index solvent, such as diiodomethane (n=1.749), DMF (n=1.427), or DMPU (n=1.489). For either the neat polymer or the solvent-polymer solution, refractive indices in the range n=1.45-1.59 can be achievable for this medium.

The Mg-doped $LiCoO_2$ as well as the MCMB can be conductive solids with high refractive indices. In order to obtain negative $A_{123}$, one or the other can be coated with a polymer of lower refractive index than the electrolyte, resulting in $n_1 > n_2 > n_3$. This coating also has sufficient electronic conductivity to maintain percolation of the particle network. Blends of the electronically conductive polymers poly(o-methoxyaniline) (POMA) or poly(3-octylthiophene) (POTh) with PVDF (n=1.42) are likely yield sufficient conductivity (~$10^{-4}$ S/cm) at low volume fractions of the conductive component (~10%). At these volume fractions, a lower refractive index (n~1.42) than the SPE (n=1.46-1.59) can be expected, leading to negative $A_{123}$.

In another example of an embodiment of the present invention, doped $LiCoO_2$ can be used as the cathode, and it can be coated with the POMA/PVDF or POTh/PVDF blends to provide negative $A_{123}$ when used with the proposed electrolytes, which are the same as in Example 1. The anode can be a pure unlithiated metal, which having high refractive index, yields a large negative $A_{123}$ and a strongly repelling dispersion force. This combination can be especially suitable for the simplified printed battery configuration shown in FIG. 18, since the metal anode can be deposited as a continuous film.

In another example of an embodiment of the present invention, unlithiated $V_2O_5$ can be used as the cathode in conjunction with a lithiated anode. Amongst transition metal oxides used in battery systems, $V_2O_5$ can be unusual in having a low refractive index, as low as n=1.4. Used in conjunction with a lithiated anode such as LiAl or Li metal of high refractive index and the SPEs listed in Table 1 with n=1.45-1.59, negative $A_{123}$ can be obtained. This combination does not typically require coating of the particles. It can also be suitable for the simplified printed battery configuration in FIG. 18, since Li and LiAl can be readily deposited as thin films by evaporation. This battery system has a lower cell voltage (~2.5-3V) than those produced according to Examples 1 and 2 (3.6V).

In another example of an embodiment of the present invention, uncoated $Li_2Fe_2(SO_4)_3$ can be used for the cathode due to its low refractive index (n~1.55). 1,3-diiodopropane, with a refractive index of 1.6391, can be used as material 2 and as a solvent for PEO, which serves as the binder. Unlithiated Al foil can be used as the anode. The materials can be combined in the following volumetric amounts and cast onto Al foil: $Li_2Fe_2(SO_4)_3$ 9.78%, PEO (200,000 M.W.) 10.67% and 1,3-diiodopropane 79.54%. The layered structure can be then flooded with liquid electrolyte. The Al foil serves as the anode current collector as well as the anode. Al foil can also be attached to the top surface of the cast layer to make contact with the cathode, serving as the cathode current collector.

In another example of an embodiment of the present invention, uncoated $Li_2Fe_2(SO_4)_3$ can be used for the cathode due to its low refractive index (n~1.55). 1,3-diiodomethane, with a refractive index of 1.749, can be used as material 2 and as a solvent for PEO, which serves as the binder. Fine Sn powder can be used as the anode. The materials can be combined and cast onto Cu foil. After allowing the Sn to sink partially and the $Li_2Fe_2(SO_4)_3$ to partially float, effecting a partial segregation leaving interpenetrating networks of the two, the diiodomethane can be evaporated. The layered structure can be then flooded with liquid electrolyte. The Cu foil serves as the anode current collector. Al foil can also be attached to the top surface of the cast layer to make contact with the cathode, serving as the cathode current collector.

Example 8

Electrical and Electrochemical Junctions Formed Between Conductive Solids Using Repulsive Forces Between Surfaces In this example, an electronically conductive polymer blend is material 1, a solvent-polymer mixture is material 2, and graphitic carbon is material 3. The materials are selected so that the Hamaker constant $A_{123}$ is negative, resulting in a repulsive force between the electronically conductive solids 1 and 3. Material 1 is a blend containing 10 wt % of the conductive polymer poly(o-methoxyaniline) (POMA) and 90 wt % of the insulating polymer poly(vinylidene fluoride) (PVDF). This blend is prepared to be electronically conductive while having a low refractive index. Material two is a solution of diiodomethane (DIM) and polyethylene oxide (PEO) that together has an intermediate refractive index. Material 3 is MCMB graphite, which has a high refractive index. A printed battery configuration such as that shown in FIG. 18 is prepared.

Poly(o-methoxyaniline) (POMA) is rendered electronically conductive upon addition of an acid such as hydrochloric acid (HCl), trifluoroacetic acid (TFA), or toluene sulfonic acid (TSA). 90 wt % poly(vinylidene fluoride) (PVDF) is mixed with 10 wt % POMA. The low POMA fraction allows for suitable electronic conductivity while benefiting from the good mechanical properties of PVDF. Stock solutions of PVDF and TFA doped POMA in DMF are first prepared. PVDF of 534,000 molecular weight is dissolved in DMF to a concentration of 0.0989 g/ml by stirring at 70° C. for approximately 20 minutes. A stock solution containing 0.0171 g/ml of POMA in DMF, and 9 vol % TFA, is prepared by first dissolving POMA emeraldine base in DMF at 70° C., then adding the TFA. Using these stock solutions, a mixture yielding 10 wt % POMA/90 wt % PVDF in the final dried film is prepared. Films cast on glass from this solution and dried under vacuum for 12 h at room temperature are removed to form free-standing conductive films. The conductivity of the films is measured to be about $10^{-4}$ S/cm. PVDF has a tabulated optical refractive index of 1.42. Ellipsometry measurement of the conductive film at a wavelength of 633 nm shows that it has a refractive index of $n_1$=1.46.

Suspensions of MCMB (25 micrometer average particle size) dispersed in a solution of DIM and PEO (200,000 molecular weight) are prepared. The PEO constitutes 10 vol % of the total volume of polymer and solvent. The suspensions are cast onto glass using a 254 μm thick stencil Immediately afterwards, while the suspensions are still wet, sheets of the dry conductive polymer blend are placed across the top surface of the suspension. The samples are then dried under vacuum at room temperature for 12 hrs. The thickness of the POMA/PVDF blend is 15-30 μm thick and the thickness of the MCMB/PEO layer is approximately 100 μm thick when dry.

Because the density of MCMB is less than that of DIM, the MCMB particles tend to float towards the conductive polymer. There, they are expected to make a good electrical connection with the polymer. However, the refractive index of diiodomethane is $n_2$=1.7411 and that of MCMB is $n_3$=2.5. Thus, $n_1 < n_2 < n_3$, and a negative Hamaker constant $A_{123}$<0 is expected, leading to a repulsive interaction between Materials 1 and 3. Upon removal of the DIM by drying, insulating PEO remains behind, electronically isolating the conductive polymer and the MCMB from one another.

Electrical measurements show that this occurs. Across the dried MCMB/PEO films alone, two-point resistances of 60 kΩ are measured for probe spacings of 3-4 mm, and 360 kΩ for probe spacing of 2 cm. Across the POMA/PVDF film alone, two-point resistances of 0.5 MΩ are measured for probes 3-4 mm apart, and 1 MΩ resistance for probes ~1.5 cm apart. However, two point measurements between the conductive polymer film and the MCMB/PEO film show much higher resistances. For the samples using 60 Vol % MCMB and 40 Vol % PEO in the suspension, a minimum resistance between the two layers of 1.2 MΩ is measured. When 40 Vol % MCMB and 60 Vol % PEO are used, the resistance between the two layers is about 2 MΩ. Thus, there is an additional interface resistance of 0.7 MΩ to 1.5 MΩ between the two conductive layers that would not be present if the two layers were electronically shorted. Five samples of each of the MCMB/PEO ratios are prepared, and similar results observed in each instance.

This example shows that electronic isolation between two electronically conductive solids occurs in a system designed to have repulsive dispersion force between the two solids. In this example, not only are the POMA/PVDF and MCMB each electronically conductive, each is also known to be capable of electrochemical charge storage when an electrolyte containing a lithium salt is present. POMA and the related compound polyaniline are known to be usable as positive storage electrodes, while MCMB graphite is a well-known negative electrode material for lithium batteries. Thus, the junction that is here demonstrated is not only an electrical junction, but is also an electrochemical junction.

Example 9

Preparation of a Self-Organized an Interpenetrating Electrochemical Device

The device includes the following components.
Cathode Current Collector: Al
Cathode CC Coating: 10% PEDT (30 nm) with 90% PTFE powder
Cathode: LMCO (3% MgO) (density of ~5 g/cc)
Encapsulant: 10% PEDT (30 nm) with 90% PTFE powder
Anode: 6 micron MCMB (density of 2.1 g/cc)
Anode Current Collector: Cu
Electrolyte: PEO+LiClO4
Solvent: DIM+AN
Coated Cathode Current Collector.

An aluminum (Al) disk is coated with a conductive polymer blend of poly(3,4-ethylenedioxythiophene)poly(styrenesulfonate) (PEDT-PSS) and polytetrafluoroethylene (PTFE) to function as the cathode current collector. The coating has a refractive index that renders the coating attractive to the cathode material, lithium magnesium cobaltate, and repulsive to the carbon anode (MCMB).

A coating solution consisting of 10 wt % PEDT-PSS available under the trade name Baytron P from Bayer Corp (one part (poly(ethylene dioxythiophene) and 2 parts poly(styrene sulphonic acid)), 86.6 wt % Teflon from DuPont (Grade MP1100; narrow particle size distribution—1.5 to 4 microns) and 3.3 wt % of a non ionic, fluorinated surfactant, DuPont Zonyl FSN, a perfluoroalkyl ethoxylated surfactant, the balance water, is prepared. 1.45 grams of a 1.3 wt % PEDT-PSS dispersion is placed in a glass vial with a magnetic stirrer bar. With agitation, 0.611 grams of water is added. After this dilution, 126 microliters of 5 wt % Zonyl FSN is added followed by 145 microliters of N-methyl-2-pyrrolidinone. Finally, 0.163 grams of Teflon MP1100 powder was added and this mixture is either agitated for at least 1 hour, or, preferably, sonified for 5 minutes. The resulting dispersion is calculated to be 7.54 wt % solids.

Aluminum disks are prepared by taking extra heavy duty Reynolds aluminum and punching out disks of 9/16 inch diameter. Each disk is flattened smooth and then rinsed in acetone for 2 minutes followed by ethanol for 2 minutes and then dried. Each disk is then mounted on a glass plate using low tack adhesive and the dull side of the disk is coated with the coating dispersion by applying 50 microliters of the fluid just described. The disks are dried at 75 C for 40 minutes and then 150 C for 1 hour. The dried coating thickness was 20 microns. The through conductivity is measured to be 5 ohms (for a contact diameter of 0.25 inches). This corresponds to a volumetric conductivity of $1.26 \times 10^{-3}$ S/cm.

Coated Cathode Material.

The cathode material is lithium magnesium cobaltate (LCMO), which can be synthesized according to "Electronic Conductivity of LiCoO$_2$ and its Enhancement by Magnesium Doping" Journal Electrochem Soc, 144, 9, 3164, 1997. LCMO has a density of about 5 g/cc and a mean grains size of about 4 microns. As discussed herein, properties such as density are factors meaningful to the gravitational settling of the particles during self-organization. Grain size is a factor for device stability since the volume change in the particle should not be greater than the device dimension or else short-circuiting may occur.

LMCO is encapsulated with a mixture of 90% by weight PTFE and 10% by weight poly(3,4 ethylene dioxythiophene)-polystyrene (PEDT-PSS) by the spray-drying process. LCMO is coated to provide a conductive coating of about 5 S/cm at a thickness of about 35 nm. This represents a volumetric particle loading of about 5%.

An amount of 1.3 wt % aqueous dispersion of PEDT-PSS, (PS ~30 nm, Baytron-PH, H C Starck) is mixed with an aqueous dispersion of PTFE (PS 0.05-0.35 micron, Zonyl PTFE K-20, DuPont), which has been freed from surfactant by exhaustive dialysis against pure water. A minimum amount of non-ionic, perfluoronated surfactant is then added to aid final dispersion stability. PEDT-PSS/PTFE mixture is prepared such that the ratio of solids PEDT-PSS:PTFE was 1:9. The volume of LMCO powder to be added to this mixture is calculated such that the volume ratio of LMCO:(PEDT-PSS+PTFE) is 95:5. A volume of water equal to the calculated volume of LMCO is added to the PEDT-PSS/PTFE mixture to dilute it, then LMCO is added under high shear mixing to produce a well dispersed mixture. This mixture then has a solids loading of about 50% by volume, and mass ratios of LMCO:PTFE:PEDT-PSS of 95:4.5:0.5.

An example of a recipe according to the above process is given below:

|  |  | density | wt % | mass | mass active | mass water | volume active |
|---|---|---|---|---|---|---|---|
| ingredient | PEDT-PSS | 1.1 | 0.013 | 1 | 0.013 | 0.987 | 0.011818182 |
|  | Teflon latex | 2.2 | 0.6 | 0.195 | 0.117 | 0.078 | 0.053181818 |
|  | LMCO | 5.2 | 0.5 | 32.116 | 32.116 | 0 | 6.175 |
|  | water | 1 | 1 | 6 | 6 | 6 | 6 |

This mixture is then spray dried to form LMCO particles encapsulated with PEDT-PSS/PTFE.

Alternatively, LMCO may be encapsulated with a mixture of 90% by weight PTFE and 10% by weight poly(3,4 ethylene dioxythiophene)-polystyrenesulfonate ("PEDOT-PSS") by a mechanofusion process. LMCO, water, PEDOT-PSS, and PTFE latex were mixed as above, and the mixture was subjected to the mechanofusion process. The materials are subject to a centrifugal force in the apparatus and are pressed against the inside wall of the unit. The particles are then trapped between the wall and a rotating "inner head" and the shearing force they experience in this gap causes them to fuse together. The partially fused (coated) particles are constantly recycled to obtain uniform surface coverage. This process encourages the formation of encapsulated LMCO particles having a more uniform aspect ratio as the shearing force also smoothes the finished particles.

Self Organization Slurry Preparation.

The electrolyte is a solid polymer electrolyte including polyethylene oxide (PEO) and lithium perchlorate (LiClO$_4$). In order to promote self organization, the electrolyte is dissolved in solution to which the solid electrode components were added.

Poly(ethylene oxide) (PEO, 1 g), such as Polyox® WSR N80, Dow Chemical Co., having a molecular weight 200,000, is dissolved in 10 ml of acetonitrile by stirring and heating in a closed container for 1 hour at 50° C. Next, 0.15 g of anhydrous lithium perchlorate is added to the solution (Li:O ratio 1:16) and stirred until the salt is completely dissolved; then 10 ml of diiodomethane was added. The PEO-Li salt complex solution is used to prepare the casting slurry by adding a predetermined amount of positive and negative active materials.

Mesocarbon microbeads (MCMB) with a mean grain size of ~5 microns and the encapsulated LMCO are mixed into the dissolved electrolyte in an anode to cathode capacity ratio of 1.05. The solids loading of the dried mixture is ~70%. MCMB is combined with the electrolyte solution and magnetically stirred at ~70° C. As soon as the MCMB is completely wet, the encapsulated cathode is added. The mixture is magnetically stirred until well mixed at ~70° C.

Self Organization of Electrochemical Device.

The mixture is used to prepare a high surface area interface battery. The heated self-organizing slurry is fed into a hopper of a stencil printer. Individual battery sections are printed into stencils with the following dimensions: the final battery stack width and length (e.g., 32 mm by 48 mm) and a thickness of 0.1 mm. The slurry is cast on the coated cathode current collector, such as the PEDT-PSS/PEFT-coated collector described above. An open mesh anode current collector is placed on top of the stencil. After vacuum curing, the energy density of the resulting symmetric cell is expected to be about 600 Wh/l. 23 sections are stacked with a thin MYLAR® layer placed between each one such that the total battery thickness is 2.4 mm. The energy density of the resulting symmetric cell is expected to be about 575 Wh/l.

Alternatively, 14 individual sections are stacked such that alternating sections are flipped such that (i) the cathode and anode current collectors of adjacent sections are in contact with each other and (ii) the total battery thickness is 3.5 mm. The energy density of the resulting symmetric cell is expected to be about 600 Wh/l.

Example 10

Layered Electrochemical Cell Formed Between Conductive Solids Using Repulsive Dispersion Forces Between Surfaces In this Example, it is shown that two conductive solids that are respectively the positive and negative electrode materials of an electrochemical cell, and which would normally exhibit an attractive dispersion force interaction with one another, are electronically isolated from each other by coating one end member solid with a low refractive index, conductive film so as to introduce a repulsive dispersion force. The resulting structure is shown to be an electrochemical cell.

Silver metal, which is known to be capable of alloying with lithium to the composition AgLi, is used as the negative electrode material. The lithium storage cathode material $LiMg_{0.05}Co_{0.95}O_2$ (LMCO) is used as the other conductive end member solid. Diiodomethane is used as the intervening fluid, into which PEO is dissolved. Due to the fact that both the silver and the LMCO have greater refractive index than the intervening fluid, an attractive dispersion force ($A_{123}>0$) is expected. The silver is therefore coated with a low refractive index, conductive polymer blend, in order to introduce a repulsive dispersion force. This results in the electronic isolation of the silver and the LMCO.

A blend of the electronically conductive and electrochemically active POMA and insulating polyacrylonitrile (PAN) was prepared. PAN is a reasonably good solid polymer electrolyte when doped with $LiClO_4$, having a conductivity value of about $5 \times 10^{-6}$ S/cm at room temperature. Thus, this blend meets the requirements of a low refractive index, electronic and ionic conductor when used as a coating. It is also be a positive electrode material, as it contains electrochemically active POMA. A POMA stock solution is prepared as described in Example 8. A PAN stock solution having a concentration 0.0989 g/ml in DMF is also prepared. $LiClO_4$ is added to the PAN stock solution at a concentration equal to 20 wt % of the PAN. The POMA and PAN/$LiClO_4$ stock solutions are mixed in a ratio giving a dried film composition of 10 wt % POMA and 90 wt % PAN. This solution is used to coat silver metal foil substrates. The coated substrates are dried under vacuum at room temperature for 12 hrs and transferred to an argon filled glovebox. A suspension of $LiMg_{0.05}Co_{0.95}O_2$ (LMCO) powder in a PEO/DIM solution, in which the PEO constitutes 10 vol % of the volume of polymer and solvent, is prepared by heating at 50° C. while stirring. This LMCO/PEO/DIM slurry is cast onto the silver substrates coated with the POMA/PAN film. The LMCO, being denser than the DIM, settles under the force of gravity towards the POMA/PAN film. The layered assembly is dried under vacuum at room temperature for 12 hrs.

Separate samples of the LMCO/PEO/DIM slurry are cast onto glass and dried at room temperature for 12 hrs. under vacuum in order to perform conductivity measurements. For two probes placed 3-4 mm apart across a dried LMCO/PEO film of 100 μm thickness, 1-2 MΩ of resistance is observed. For the POMA/PAN coated silver foil, the two-point resistance measured across the thickness of the POMA/PAN layer to the Ag foil is approximately 1 MΩ. However, after the LMCO/PEO layer is cast onto the Ag foil coated with the POMA/PAN conductive blend and dried, the two-point resistance measured through all three layers is greater than 5 MΩ. This demonstrates that electrical isolation of the two conductive films, POMA/PAN and LMCO, was accomplished in the presence of an intervening fluid, DIM containing PEO, which has an intermediate refractive index between that of the POMA/PAN and the LMCO. An additional interfacial resistance of approximately 4 MΩ is introduced between the two conductive materials.

The sample is then placed in a stainless steel electrochemical cell and flooded with a liquid electrolyte consisting of a 1:1 volume ratio of ethylene carbonate (EC) to diethylene carbonate (DEC) and doped with a 1M concentration of $LiPF_6$. An open circuit voltage of 0.72 V is observed between the negative and positive terminals of the cell, showing that an electrochemical cell has been produced by the methods of this invention.

Example 11

Layered Electrochemical Cell Formed Using Repulsive Dispersion Forces Between a Cathode Storage Material and a Coated Anode Storage Material In this Example, the conductive POMA/PVDF coating of Example 8 was used to coat a silver negative electrode as in Example 11. A suspension of LMCO in DIM containing polystyrene (PS) as a binder was then cast upon the coated silver electrode. The resulting electrochemical cell is shown to have the electrochemical characteristics of a lithium ion battery.

The POMA/PVDF blend is prepared as in Example 8 and cast on Ag foil discs of ⅜ inch (0.95 cm) diameter and 100 μm thickness. After drying, a suspension of LMCO powder and PS in DIM is prepared, in which the ratio of LMCO to PS is 50 vol % LMCO and 50 vol % PS. The PS is dissolved into the DIM by heating to 70° C. and stirring. The PS has a molecular weight of 50,000, and is 10 vol % of the total volume of PS and DIM. After the LMCO suspension is cast onto the coated silver substrates, the layered assembly is dried under vacuum at room temperature for 12 hrs. The samples are then placed then placed in a stainless steel electrochemical cell and flooded with a liquid electrolyte consisting of a 1:1 volume ratio of ethylene carbonate (EC) to diethylene carbonate (DEC) and doped with a 1M concentration of $LiPF_6$.

Figure 19:
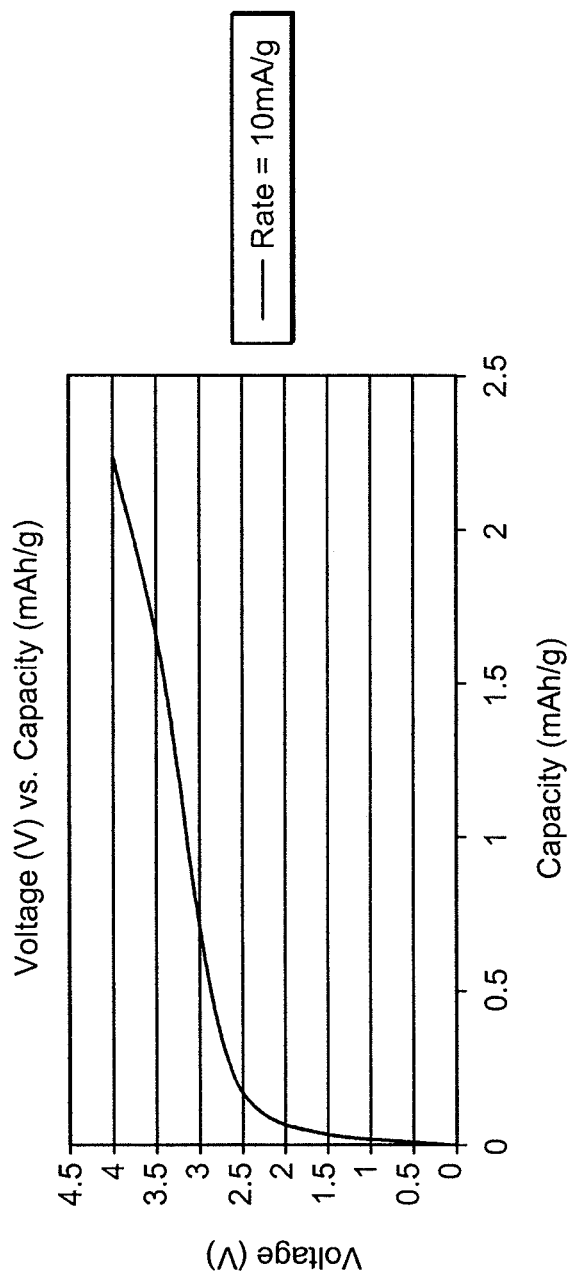
FIG. 19 is a voltage vs. capacity curve for a layered electrochemical cell with a silver negative electrode and LMCO positive electrode in which the current rate is calculated relative to the active mass of LMCO.

Three such cells show an open circuit voltage of about 100 mV upon assembly, showing that an electrochemical cell has been fabricated. FIG. 19 shows the voltage vs. capacity curve measured on one cell, at a charging rate of 10 mA/g. The capacity and the charging rate are calculated from the constant current supplied to the cell relative to the mass of LMCO present in the cell. The charging curve shows a slightly sloping voltage plateau from 2.7V to 3.6V. The thermodynamic voltage for removal of $Li^+$ from LMCO and insertion in silver is 3.3 volts. Thus the observed voltage of this cell is consistent with the expected voltage. Note that while polyaniline and POMA are known to be electrochemically active as the positive electrode in a lithium cell, in this instance, the POMA/PVDF coating is applied to the negative electrode, silver, and is therefore ruled out as the electrochemically active species.

Thus, this example shows that an electrochemical cell can be produced that exhibits the charging characteristics of a lithium storage battery.

Example 12

Self-Organized Electrochemical Cell Formed Using Repulsive Dispersion Forces Between Lithium Iron Phosphate and MCMB In this example, it is shown that a lithium iron phosphate cathode and an MCMB graphite anode form an electrochemical cell in the presence of a repulsive dispersion force introduced through the use of a diiodomethane-polystyrene (DIM-PS) mixture as an intervening material. The resulting cell exhibits charge characteristics similar to that for a conventional lithium cell using the same electrode materials.

This systems relies on the high index of diiodomethane (n=1.7411) to supply repulsion between the lithium iron phosphate cathode storage material (powders synthesized at 700° C.) and the MCMB graphite anode storage material. After self assembly, the diiodomethane is removed by drying, leaving the polystyrene behind as an in-situ separator.

Aluminum foil is employed as the cathode current collector in this example. The POMA-PVDF coating of Example 8 is applied to this current collector in order to give both attraction of the lithium iron phosphate to the current collector and repulsion of the MCMB graphite from the current collector in the diiodomethane-polystyrene mixture. The anode current collector consists of a Cu mesh material fashioned in the shape of a low stiffness cantilever.

Figure 20:
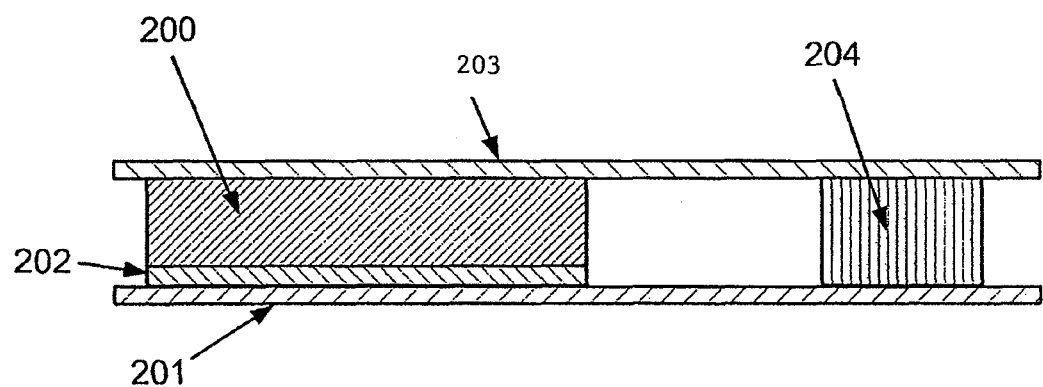
FIG. 20 is a schematic illustration of an interpenetrating electrochemical cell according to one embodiment of the present invention.

An active slurry 200 is produced containing conductive 2% Nb-doped lithium iron phosphate and MCMB graphite in the diiodomethane-polystyrene mixture. Specifically, 0.122 g of polystyrene (MW 50000) are dissolved in 0.66 ml of diiodomethane at ~70° C. To this, 0.10 g of MCMB graphite are added, followed by 0.254 g of 2% Nb-doped lithium iron phosphate. This mixture 200 is then mixed for 30 min at ~70° C., after which it is pipetted onto the Al current collector 201 coated with the POMA-PVDF coating 202. The Cu mesh cantilever 203, supported by an insulator 204, was then brought down into contact with the still fluid active slurry after which the slurry self-organized into the desired structure, with lithium iron phosphate shorting to the coated Al current collector and the MCMB shorting to the Cu mesh current collector. A mesh current collector (not shown) is employed to expedite solvent removal during drying and minimize lateral migration/segregation of the polystyrene during drying, as would occur with a solid current collector in which all solvent would have to exit the system from the edges of the current collectors. A schematic of the final structure of the cell is shown in FIG. 20. After drying under vacuum, the liquid electrolyte (1 M $LiPF_6$ in 1:1 EC:DMC) was introduced and the entire cell was sealed within a small hermetic well via an O-ring to prevent electrolyte loss. The use of the cantilever design minimizes the stress on the active region of the cell, in turn minimizing the stress on the polystyrene in-situ separator, which softens somewhat in the liquid electrolyte via swelling A cell produced in this manner charges up to ~30% of the practical capacity expected based on the total mass of lithium iron phosphate in the cell, and holds voltage indicating no internal short circuits between the anode and cathode networks.

Example 13

Layered Electrochemical Cell Formed Using Repulsive Dispersion Forces Between Lithium Iron Phosphate as a Cathode Storage Material and Graphite as a Anode Storage Material In this Example, it is shown that a lithium iron phosphate cathode and an MCMB graphite anode form an electrochemical cell in the presence of a repulsive dispersion force introduced through the use of diiodoethane as an intervening material. The resulting cell exhibits charge-discharge characteristics similar to that for a conventional lithium cell using the same electrode materials.

$LiFePO_4$ (LFP), which exists naturally as the mineral triphyllite with a composition $Li(Fe,Mn)PO_4$, has a low refractive index of about 1.69. However, $LiFePO_4$ is electronically insulating. $LiFePO_4$ is rendered highly electronically conductive when doped with minor concentrations of certain metals. A composition 1% Nb-doped $LiFePO_4$ prepared as a densely fired pellet heat treated at 850° C. is measured to have a refractive index of n=1.78 at a wavelength of 633 nm Conductive compositions doped with other elements have similar refractive index. 1,2-diiodoethane (DIE) are used as the electrolyte solvent, which has a refractive index of 1.871, intermediate between that of LFP and MCMB, resulting in a negative Hamaker constant, $A_{123}<0$. DIE has a melting point of 83° C. and is solid at room temperature. PS is soluble in DIE at 100° C.

Aluminum foil is used as the cathode current collector. Aluminum foil is coated with a suspension of a conductive Al-doped LFP powder and PVDF binder in DMF solvent. The proportion of solids is 80 vol % LFP and 20 vol % PVDF. The suspension is coated onto the aluminum foil and dried in air at 50° C., giving films of about 50 μm thickness. Sintered pellets of this LFP material exhibit a resistivity of $\rho=1\times10^3$ Ω·cm. When a 1 $cm^2$ Au electrode is sputtered on top of the LFP/PVDF coating on aluminum, the resistance measured through the layer is 3-5 Ω.

A mixture containing 60 Vol % MCMB and 40 Vol % PS (of 50,000 MW) is mixed with DIE. The PS constituted 10 vol % of the total volume of polymer and DIE solvent. The three component mixture is heated at 100° C. in a closed glass container until the PS was fully dissolved. This mixture was then rapidly cooled to room temperature, and used for preparing coatings. The MCMB/PS/DIE mixture is placed onto the LFP-coated aluminum foil, and heated to 100° C., at which temperature the DIE melted and evaporated, leaving a solid film of MCMB and PS on top of the LFP layer. A copper current collector is attached to the top side of the MCMB/PS coating.

The two-point resistance across the MCMB/PS layer for a probe spacing of 1 cm is 1-5 k$\Omega$. However, a two point resistance measurement through the layered assembly shows a resistance of over 30 M$\Omega$, showing that the conductive LFP layer and the conductive MCMB layer are electronically isolated from one another.

These layered cells are then placed in a stainless steel electrochemical cell and flooded with a liquid electrolyte consisting of a 1:1 volume ratio of ethylene carbonate (EC) to diethylene carbonate (DEC) and doped with a 1M concentration of LiPF$_6$. The cells are then galvanostatically tested at room temperature and 50° C.

Figure 21:
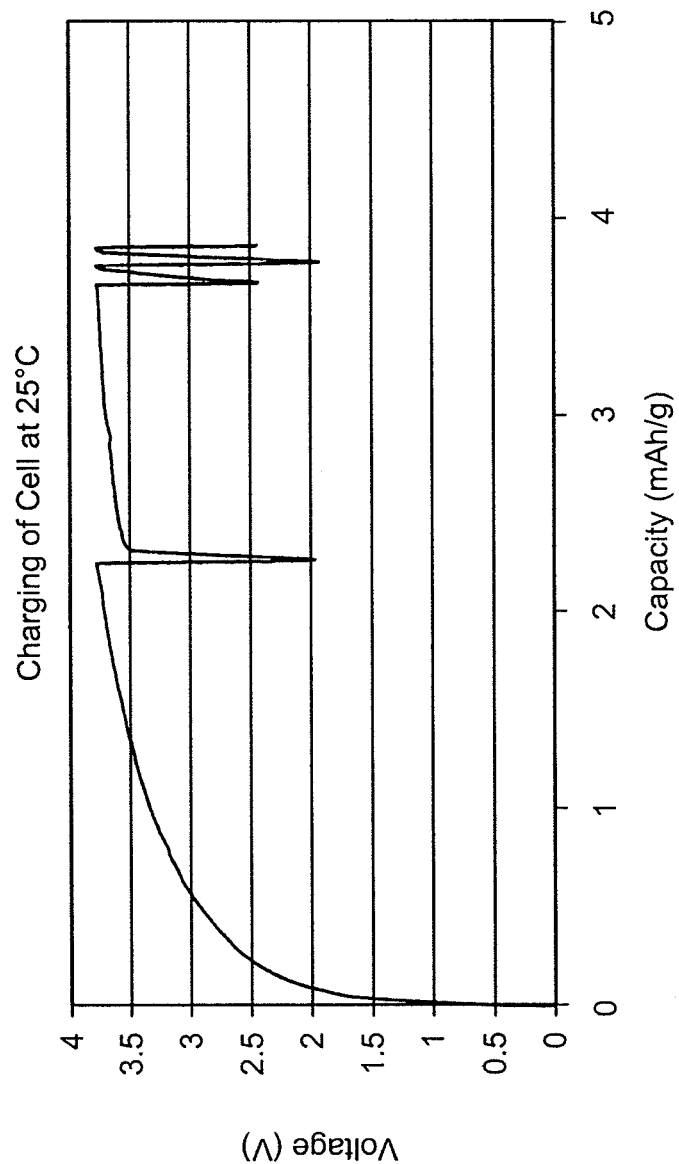
FIG. 21 shows a charging curve for LFP-MCMB electrochemical cell at room temperature, where the current rate of 5 mA/g and the capacity are calculated relative to the LFP mass of the cell.
Figure 22:
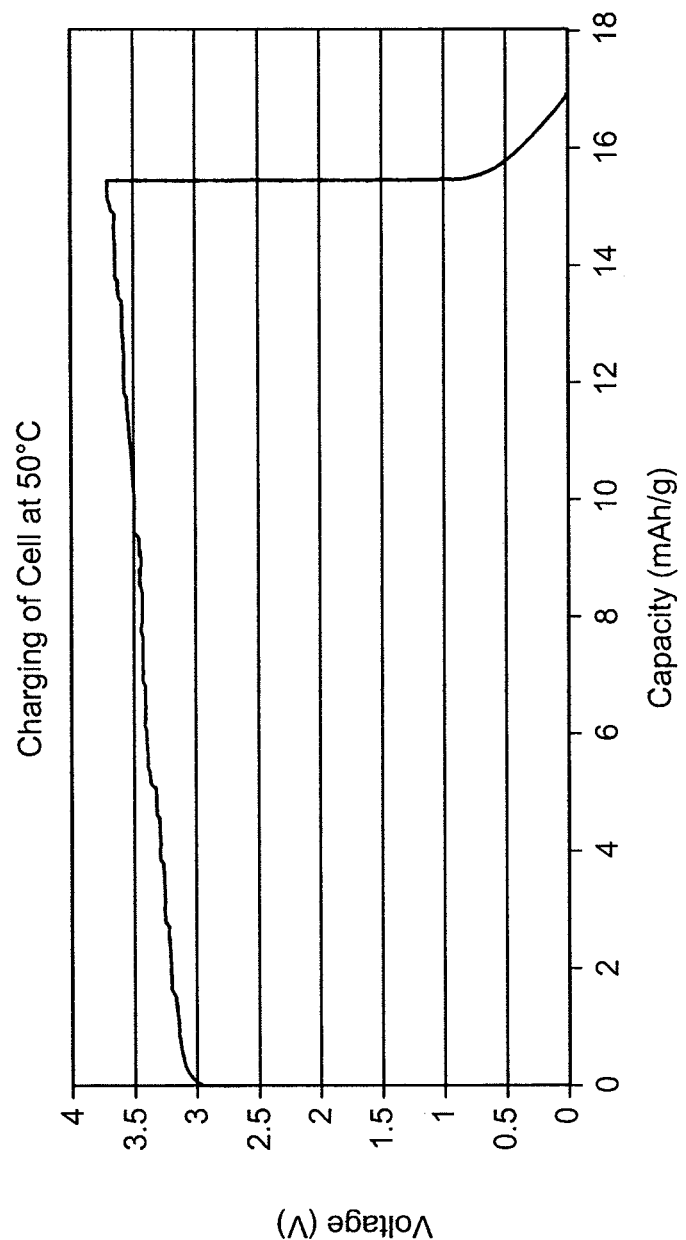
FIG. 22 is a charge curve of cell in FIG. 21 tested at 50° C.

FIG. 21 shows a portion of a charging curve for a cell cycled at room temperature. The thermodynamic voltage between LFP and MCMB at room temperature is 3.25 V. The results in FIG. 21 show a plateau voltage slightly higher than this value, although there are occasional voltage drops. The same cell is then heated to 50° C., and charged at the same current rate. The charge/discharge curve in FIG. 22 is observed. Here, the voltage plateau has a midpoint value of about 3.5 volts, as expected for this electrochemical couple. Upon discharge, a greater polarization is observed, with a discharge capacity being seen below 1 V.

Figure 23:
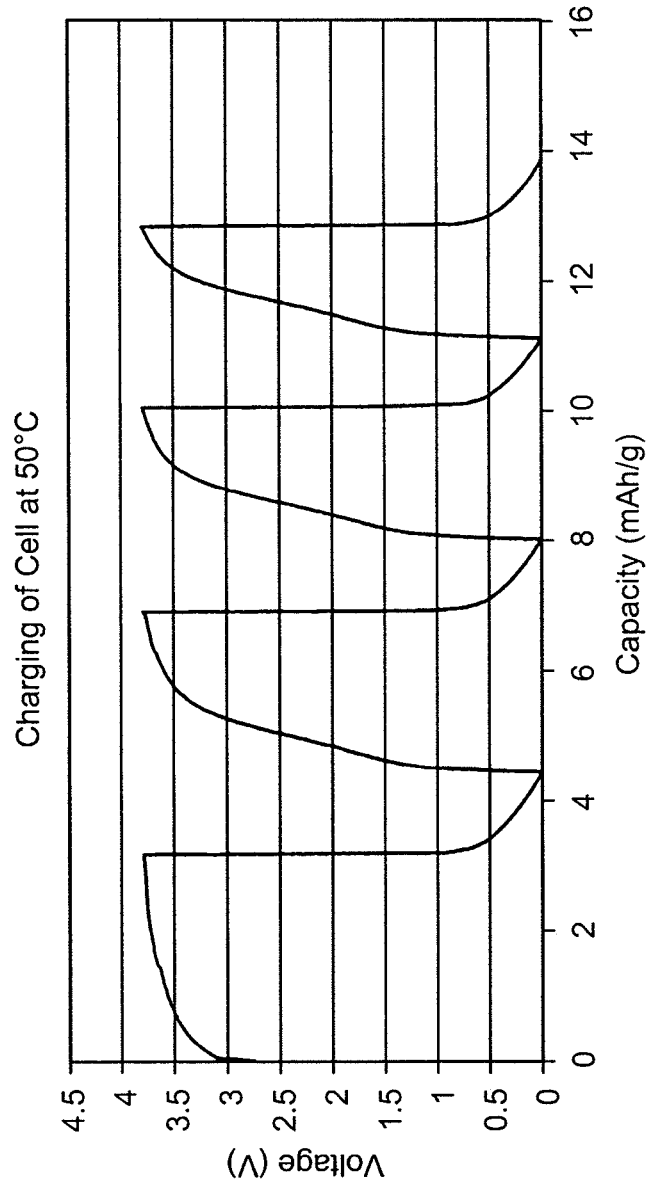
FIG. 23 is charge curve illustrating subsequent charging and discharge of cell in FIG. 21.

FIG. 23 shows the same cell upon subsequent cycling at 50° C. A charging plateau voltage near 3.7 V is seen in subsequent cycles, and discharge capacity is seen below 1V. The cycling behavior of this layered is closely similar to that exhibited by conductive LFP powders formulated into electrodes without the addition of carbon additive, and tested against lithium metal counter electrodes in conventional cells with a polymer separator and organic liquid electrolyte. Thus these results show that a lithium rechargeable cell can be produced according to the invention.

Example 14

Overlapping-Layer Self-Organized Battery

In this example, separate cathode and anode suspensions are prepared, and are printed as overlapping layers such that the overlapped regions are free to interdiffuse and form interpenetrating electrodes, while the non-overlapping regions act as current collectors or are easily attached to current collectors. The configuration is as shown in FIG. 24. A powder suspension is prepared using diiodomethane as the solvent as described in Examples 8 or 12, except that the suspension contains a cathode powder or encapsulated cathode powder alone as the lithium storage electrode material. A similar suspension is prepared containing MCMB anode powder alone. The anode suspension is first printed or cast or spray-deposited as a layer, and then while it is substantially wet, the cathode suspension is printed or cast or spray-deposited on top so that the two printed layers substantially overlap, as shown in FIG. 24. Due to the MCMB having a lower density than the DIM solvent, it has a tendency to float. The cathode powder, on the other hand, tends to sink in the suspension. Under the force of gravity, the anode particles float while the cathode particles sink, forming interpenetrating electrodes that remain electronically connected only to particles of their own type. Subsequently, the assembly is dried. A copper metal current collectors is applied to the MCMB-enriched edge, and an aluminum current collector is applied to the cathode-enriched edge, resulting in a lithium battery cell.

Optionally, the non-overlapping edges of the cathode suspension or anode suspension are cast upon a previously deposited current collector to which the cathode or anode particles respectively are attracted, as described in the preceding Examples. Thus electronic connection is made independently to the cathode network and anode network.

Optionally, the layers are printed or cast or sprayed layers in discrete patches on an insulating supporting surface to form an isolated cell, or a pattern or array of individual cells that are joined in series or in parallel. Optionally, the layers are printed as continuous strips to form a lengthy cell that is subsequently rolled or cut and laminated.

Optionally, the battery assembly is subsequently coated or sealed with a polymer or inorganic material providing hermeticity.

Example 15

Self-Organized Battery with Edge Current Collectors

Figure 25A:
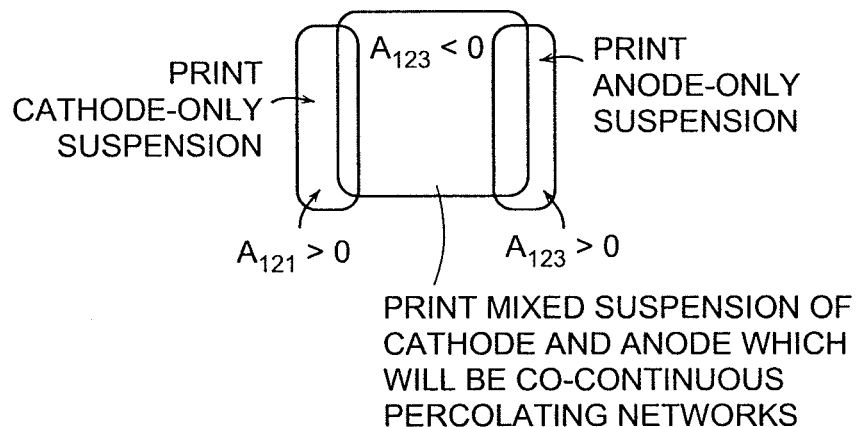
FIG. 25 is a schematic illustration of a self-organized battery with an edge current collector according to one or more embodiments of the invention.
Figure 25B:
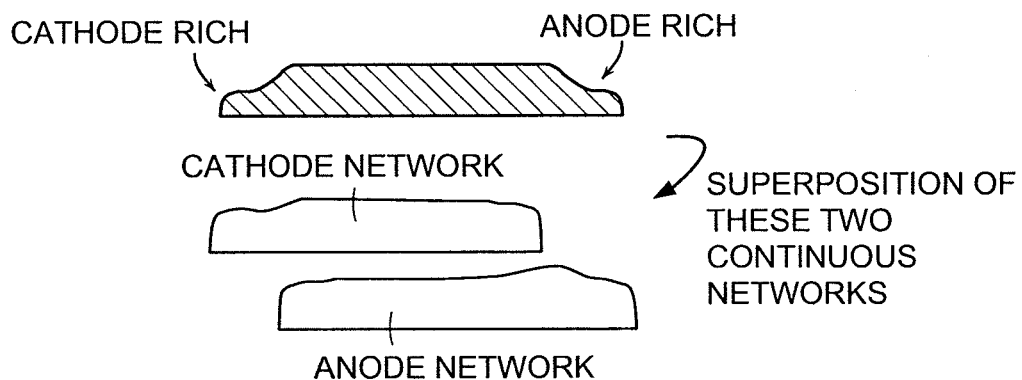

In this example, a self-organizing battery suspension, containing both cathode and anode particles and being prepared as in Example 8 or 12, is printed or cast or spray-deposited as a single layer. While the suspension is substantially wet, suspensions containing cathode and anode alone, as described in Example 14, are applied to the surfaces or edges of the self-organized battery layer. A resulting construction is shown in FIG. 25. The cathode-only suspension contains cathode particles that are self-attractive to the cathode particles within the two-particle suspension. The anode-only suspension contains anode particles that are self-attractive to the anode particles within the two-particle suspension. In this manner, separate terminations are made to the interpenetrating cathode and interpenetrating anode structures. Current collectors are connected to the cathode or anode suspensions as described in Example 14.

Example 16

Figure 26:
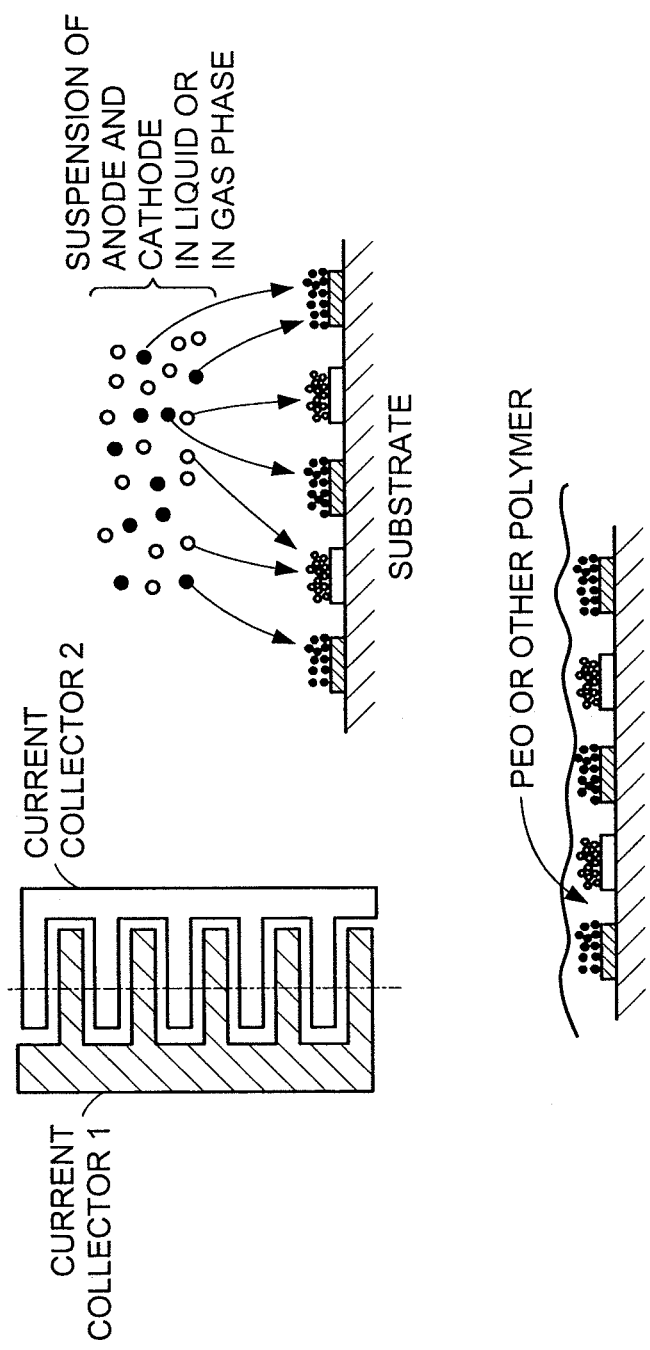
FIG. 26 is a schematic illustration of a self-organized battery by selective adsorption of colloidal particles to current collectors according to one or more embodiments of the invention.

Self-Organized Battery by Selective Adsorption of Colloidal Particles to Current Collectors FIG. 26 illustrates the concept of this example. A device that can be planar and used in a thin layer configuration, including as a flexible layer that can be laminated with other materials such as fabrics, is produced by using the attraction between colloidal particles of one type to a current collector and to particles of the same type to selectively adsorb cathode particles at one current collector and anode particles at the other. A cathode current collector and an anode current collector are deposited closely adjacent to one another on a mutual supporting surface that is electrically insulating. The lateral width of each current collector, as well as the spacing between the two, is selected to allow sufficient diffusion of the ionic species between the two during operation of the battery so that the storage capacity of the battery can be substantially utilized. A finer spacing allows for more rapid transport of the ionic species between the anode and cathode during operation, resulting in a higher power density. The two current collectors can be produced in many patterns ranging from simple adjacent strips to simple or complex interpenetrating patterns or meshes.

The dimensions of the current collectors and particles can as small as a nanometer, or as large as many micrometers. For example, at the nanoscale, a single carbon nanotube can be used as an anode current collector, to which ultrafine graphite particles or fullerenes are attracted as the anode storage compound, and a single cathode particle and cathode current collector of similar size can be used, resulting in a nanobattery. Or, a lithographically patterned or microcontact printed pattern of electrodes with lateral dimensions of 0.1 to 200 micrometers can be used with similarly sized cathode and anode storage material particles to fabricate a printable self-organizing microbattery. For a lithium ion battery, the width of the current collectors is between 0.1 and 200 micrometers and the space between current collectors is between 0.1 and 200 micrometers, with smaller dimensions being preferred when electrolytes of low lithium diffusivity such as solid polymer electrolytes are used, and larger dimensions being allowable when liquid electrolytes are used.

The cathode particles and anode particles are made selectively attractive to their respective current collectors, by one of several methods. In one method, electrostatic charge is used to selectively deposit atomized particles in a manner analogous to electrostatic painting. A potential is applied to one current collector that is opposite in sign to the charge on an atomized liquid suspension containing cathode particles. A potential of like sign to the particles may optionally be applied to the opposing current collector to prevent particle adsorption. This results in the "painting" of cathode particles selectively at the cathode current collector. The process is then carried out to selectively deposit anode particles at the anode current collector. The resulting structure is as shown in FIG. 26. The structure is then wetted with a liquid electrolyte, or a solid polymer electrolyte film is applied to the structure, resulting in a battery cell.

Electrostatic deposition from a liquid solution may also be used. In this instance, cathode particles may have a surface charge of one sign that permits electrophoretic deposition selectively to one current collector to which a potential of the opposite sign is applied. Anode particles may subsequently be electrophoretically deposited at the other current collector in like manner. The charge on cathode and anode particles is produced by methods well-known to those skilled in the art of colloid chemistry. In certain circumstances, for example by control of the pH of an aqueous solution within which the cathode and anode particles are simultaneously dispersed, the cathode and anode may have opposite charges. This instance is well-known to those skilled in the art of colloid chemistry to allow heterocoagulation. Simultaneous deposition of both particles to their respective current collectors may be conducted by applying opposite potentials to the cathode and anode current collectors while immersed in the suspension.

Dispersion forces may be used to selectively deposit cathode and anode particles at their respective current collectors. By way of example, an aluminum current collector coated with a low refractive index, electronically conducting polymer blend serves as the cathode current collector, and copper metal as the anode current collector. A suspension containing cathode particles such as lithium iron phosphate, or encapsulated LMCO particles, and also containing MCMB anode particles, both types of particles being dispersed in DIM as the solvent, is placed in contact with the electrode pattern. The dispersion forces utilized in this instance are as described in Examples 7-13 and 23-25. A positive Hamaker constant $A_{123}$, between the cathode particles and the cathode current collector, and between the anode particles and the anode current collector, while simultaneously having present a negative $A_{123}$ between cathode particles and the anode current collector, and anode particles and the cathode current collector, results in the desired selective deposition of colloidal particles.

In a related method, the low refractive index coating that is applied to one current collector, for example the cathode current collector, is a sacrificial coating that is subsequently removed by pyrolysis or chemical dissolution after the cathode particles are selectively deposited. A suitable coating is a photoresist such as those commonly used in semiconductor device fabrication. This method allows the use of low refractive index organic or polymer coatings that are not necessarily electronically conductive. Upon removal of the sacrificial coating, the cathode particles are in electronic communication with the current collector.

In each instance of selective deposition of cathode and anode particles at their respective current collectors, where a liquid suspension is used, the suspension may contain in solution or in dispersion a solid polymer electrolyte and lithium salt, that forms a solid polymer electrolyte layer upon drying enabling the function of the device as a battery. Or, a binder may be dissolved in the solvent, and upon evaporation of the solvent, the selectively deposited particles are bound to their respective current collectors. Or, no binder is used and the particles are bound to their respective current collectors by surface forces alone. When a binder or no binder is used, a liquid electrolyte is subsequently used to wet or infiltrate the structure, or a solid polymer electrolyte is subsequently applied to the structure, resulting in a battery cell. The solid polymer electrolyte may be applied by the deposition and drying of a solvent solution as described in other examples herein, or as a thermoplastic layer of solid polymer electrolyte that is heated above its melting point to surround the cathode and anode particles.

Example 17

Solid-State Interpenetrating Electrode Battery Fabricated By Infiltration

This example exemplifies a solid-state interpenetrating electrode battery formed in sequential steps of first forming a porous structure of a positive electrode material, coating said porous structure with a thin layer of a solid polymer electrolyte, and then infiltrating said structure with a paste or suspension of a negative electrode material.

A positive electrode with open porosity is formed from $Li(Mg_{0.05}Co_{0.95})O_2$ powder. The $Li(Mg_{0.05}Co_{0.95})O_2$ powder is made by mixing the following quantities of starting materials obtained as powders:

|  | F.W. | Amount |
|---|---|---|
| $Mg(OH)_2$ | 58.32 g/mol | 1.52 g |
| $Li_2CO_3$ | 73.89 | 19.21 g |
| $Co(NO_3)_2 \cdot 6H_2O$ | 291.04 | 143.79 g |

The starting materials are mixed, wet-milled for 24 h. in acetone using polypropylene bottles, then dried at 200° C. for 2 h. in air. The powder mixture is then crushed and heat treated in air in an open alumina crucible at 900° C. for 20 h.

This $Li(Mg_{0.05}Co_{0.95})O_2$ cathode powder is then mixed with a removable or fugitive pore former, in this instance mesocarbon microbeads (MCMB, Osaka Gas Company) of 25 micrometer average particle size. The cathode powder and the MCMB is mixed in proportions giving a volume ratio of cathode:MCMB of 30:70, 50:50, or 70:30. The powder mixtures are mixed by wet ball milling in a polypropylene jar using Teflon milling balls and cyclohexanone or acetone as the solvent, optionally including a few weight percent of an organic binder, then dried at 100° C. The cathode:MCMB powder mixtures are then die-pressed to form compacted cylindrical pellets (for a button-cell battery) or a rectangular parallelepiped (for a prismatic or flat battery). The minimum dimension of the powder compact is at least 0.1 mm. The powder compact is then fired in air at 700° C. for 20 h, whereupon the MCMB is pyrolysed, and then fired at 900° C. for 20 h, 1000° C. for 12 h, or 1150° C. for 2 h, forming a sintered structure with open porosity. The density of the porous structure can range from 25% to 70% of the theoretical density of the cathode material (5.1 g/cm3 in the case of $Li(Mg_{0.05}Co_{0.95})O_2$). The sintered porous compact is at least 0.1 mm in thickness across its thinnest external dimension.

Optionally, many other materials may be used as the fugitive pore forming material. Ice may be used as the fugitive pore former, the composite powder containing the cathode (or an anode, in that instance where the first porous structure is the anode) and the ice being then formed into the desired shape while at a temperature below the melting point of ice, and being subsequently heated to melt and remove the ice, leaving a porous electrode material. Optionally, sugar or salt or other water-soluble compounds are used as the fugitive pore forming material, being removed by dissolution in water after the composite powder is subsequently formed into the desired shape. In each instance, the porous cathode is fired as described above to impart strength to the porous structure.

The porous sintered $LiMg_{0.05}Co_{0.95}O_2$ structure is next bonded to a metal current collector such as aluminum using a conductive adhesive, by heating the metal current collector and the porous cathode to an elevated temperature while in contact, or by applying a metal paste to an external surface or surfaces of the porous cathode structure. The interior surfaces of the porous cathode structure are then coated with a solution of polyethylene oxide (PEO) solid polymer electrolyte in acetonitrile or DMF solvent. The molecular weight of the PEO is between 50,000 and 8,000,000, and it is added to the solvent in proportions giving a solution having between 1% and 10% by volume of PEO. $LiClO_4$ is also added to the solution in proportions giving about 20 wt % $LiClO_4$ relative to the mass of PEO. This PEO solution is used to infiltrate or coat the porous $Li(Mg_{0.005}Co_{0.95})O_2$ structure. The structure is infiltrated one or more times, and dried after each infiltration at room temperature or in an oven or under vacuum to 40-60° C. The infiltration and drying steps are optionally repeated until the interior surfaces of the porous cathode structure are everywhere coated with a layer of the PEO electrolyte. The PEO electrolyte coating has a minimum thickness at its thinnest point of at least 10 nm, and an average thickness of at most about 50 micrometers. Preferably, the average thickness of the PEO layer is 0.5 to 5 micrometers. After coating with PEO, the cathode structure continues to have open porosity.

The porous and coated cathode structure is then infiltrated with a suspension of MCMB or graphitic carbon in the above-described PEO solutions. The MCMB or graphite is selected to have a particle size of between 0.1 and 10 micrometers, large particles being not preferred since they do not readily infiltrate into the porous cathode structure, and smaller particles being not preferred because the resulting suspensions have higher viscosity at the same volume fraction loading of particles. A suitable suspension has 4-10 vol % of MCMB of 6 micrometer average particle size, or graphite of 0.5-2 micrometer average particle size. After infiltration, the solvent is removed by evaporation at room temperature or by heating in an oven or under vacuum to 40-60° C. Infiltration and drying is optionally repeated until the pore space in the cathode structure is substantially filled. A slight excess of the MCMB mixture is allowed to remain at an external surface or surfaces of the filled compact, to which a copper current collector is attached. The interpenetrating electrode battery of the invention is thus obtained.

It is understood that many other cathode storage materials, solid electrolytes, and anode storage materials can be used with the methods of this example to fabricate an interpenetrating electrode battery. For example, in place of $Li(Mg_{0.05}Co_{0.95})O_2$, other lithium storage cathodes such as $LiCoO_2$, $LiFePO_4$ that is doped to be electronically conductive, $LiMn_2O_4$, $Li(Ni,Mn)O_2$, $Li(Co,Ni)O_2$, or $Li(Co,Ni,Mn)O_2$ may be used. In place of the MCMB anode, other graphitic or non-graphitic carbons, and metal-based anodes such as Sn, Si, Sb, Zn, Ag, or their alloys and intermetallic compounds, may be used. In addition, this interpenetrating electrode battery can be fabricated by firstly preparing a porous anode rather than cathode, in which case the cathode is lastly infiltrated into the anode structure to form an interpenetrating electrode.

Example 18

Solid-State Interpenetrating Electrode Battery with Graded Electrodes Fabricated by Infiltration A battery is produced according to the method of Example 17, with the additional feature of having in the porous cathode structure an increasing cross-section of cathode in a direction towards the cathode current collector. The particle sizes of $Li(Mg_{0.05}Co_{0.95})O_2$ and MCMB in the starting mixture are selected by methods well-known to those skilled in the art to provide a more rapid sedimentation rate of one material. The powder is dispersed in acetone, cyclohexanone, glycerol or a similar liquid having a viscosity allowing differential sedimentation of the two types of powder. In the instance where the cathode powder settles faster, the suspension is cast onto a metal current collector and allowed to sediment. Upon drying and firing in air at a temperature of at least about 700° C., the MCMB is removed by oxidation, leaving a porous cathode structure with the desired gradient. In the instance where the MCMB settles faster, upon drying and firing, a gradient is obtained whereby the density of cathode is greater at the upper surface. A cathode current collector is attached to this surface to obtain the desired gradient in cathode cross-section. The thickness of the graded porous cathode structure is at least 50 micrometers.

The porous cathode structure is then coated with PEO electrolyte and infiltrated with MCMB anode according to the method of Example 17. Due to the gradient in the density of the interpenetrating cathode, a complementary gradient in the density of the interpenetrating anode is obtained in the completed battery, whereby the cross-section of the anode also increases in a direction towards the anode current collector. The presence of thusly graded electrodes provides improved battery performance by providing increasing electronic conductance in the interpenetrating electrode in a direction towards its current collector.

It is understood that the battery of this example can be fabricated using many other cathode materials as well, and that a graded interpenetrating anode structure can be firstly fabricated, followed by infiltration by the cathode.

Example 19

Solid-State Interpenetrating Electrode Battery with Electrodes of Graded Electrical Conductivity Fabricated by Infiltration In this example, the electrical conductivity of an interpenetrating electrode increases in a direction towards its current collector due to a gradient in the specific properties of the electrode. It is known that the electronic conductivity of $Li(Mg_{0.05}Co_{0.95})O_2$ is greater when it is heat treated under oxidizing than reducing conditions. A porous cathode is fabricated according to the methods of Example 17 or 18. After the porous $Li(Mg_{0.05}Co_{0.95})O_2$ structure is sintered at 900-1150° C. in air or oxygen, it is cooled in an inert atmosphere such as nitrogen or argon, during which process the exposed outer surface of the cathode away from the current collector is more reduced than the interior section adjacent to the current collector. The resulting cathode structure has a higher electronic conductivity in a direction towards its current collector. The porous cathode is subsequently fabricated into a battery according to the methods of Example 17.

It is understood that other methods to introduce a spatially-varying specific conductivity to the interpenetrating cathode or anode may be used.

Example 20

Interpenetrating Electrode, High Power Density, Alkaline Primary Battery

In this example, a porous manganese oxide cathode structure is formed according to the methods of Examples 17 or 18. The porous cathode structure is coated on its internal and external surfaces with an electronically insulating separator permeable to aqueous electrolytes. A suspension of zinc powder is subsequently infiltrated into the pore space of the cathode network. Infiltration of the battery with an aqueous electrolyte results in an interpenetrating electrode alkaline battery of high power density, due to the decreased ion diffusion distance between the anode and cathode compared to a battery of conventional design.

Example 21

Interpenetrating Electrode, High Power Density, Alkaline Primary Battery Formed Using a Metal Foam Electrode In this example, a porous zinc electrode or open-cell foam is used. The porous metal structure is coated on its internal and external surfaces with an electronically insulating separator that is permeable to aqueous electrolytes, including a microporous coating. A suspension of $MnO_2$ cathode powder, optionally containing conductive additives such as carbon powder, is subsequently infiltrated into the pore space of the porous zinc network. Infiltration of the battery with an aqueous electrolyte results in an interpenetrating electrode alkaline battery of high power density, due to the decreased ion diffusion distance between the anode and cathode compared to a battery of conventional design.

It is understood that the structures and methods of example 17-21 are readily applied to primary or secondary batteries utilizing other chemistries, including but not limited to nickel-metal hydride, nickel-cadmium, silver-zinc, and lithium-sulfur batteries.

Example 22

Interpenetrating Network of Connected Cathode Particles Electronically Isolated (but Ionically Connected) to Network of Anode Particles The interpenetrating network is formed as a result of the immiscibility of two chemically different polymers. Generally, when mixed in the solid state (either by melt processing or solvent-based processing), chemically dissimilar polymers tend not to mix with one another, preferring to form separate domains of each material. One polymer may appear as isolated, discrete regions within the matrix of the other polymer, or a bicontinuous (interpenetrating) network of both polymers may form. This latter case may especially be observed when a block copolymer is added to the mixture of the two polymers. The block copolymer should have one block that is chemically similar to the first polymer of the mixture and a second block that is chemically similar to the second polymer of the mixture. The block copolymer concentrates at phase boundaries between the two polymers, and encourages the increase in the presence of these boundaries, and in the extreme, stabilize the bi-continuous structure referred to above. An self-organized battery can be produced therefore by first dispersing the cathode active particles in a first polymers, and the anode active is dispersed in a second, immiscible polymer. These two particle/polymer dispersions are then mixed above the melt point of both polymers, in the presence of a block copolymer that is chemically similar to the two polymers as described above. The mixing process forms an interpenetrating network of the two polymers which each contain their respective electrode active. Since no particles of the first active in the first polymer come into contact with any particles of the second active in the second polymer, the cathode and anode networks are electronically isolated, and the cell will not short. Since each polymer of the mixture is highly loaded with active particles, these particles are in electrical contact with one another and provide electrical conductivity within each electrode phase. If either active has a low intrinsic electronic conductivity, the conductivity of that active may be increased by means known in the art, for example by encapsulating the particles of the active by a film of electrically conductive polymer before dispersing in the appropriate blend polymer. The particles of active may be more fully encouraged to disperse in the appropriate polymer of the blend by treating their surfaces with a compatibilizer (for example a polymer of similar chemistry to that which the particle is to be dispersed in) before dispersing in the appropriate polymer, as is known in the art of dispersing powders into polymers.

Each of the polymers that forms the interpenetrating network has a sufficiently high ionic conductivity that lithium ion transport is not power-limiting for the device. One pair of immiscible polymers might be poly(ethyleneoxide) and poly (propyleneoxide), and the block copolymer used to stabilize the interpenetrating blend would be polyethyleneoxide-b-polypropyleneoxide. In this case, one active might be functionalized with grafted polyethyleneoxide chains to aid dispersion in that phase, and the other active functionalized with polypropylene oxide.

Optionally, one or more of the immiscible fluid phases is a solvent that is removed by evaporation, or a solvent containing a binder, and the interpenetrating network is infused with a liquid electrolyte after solvent removal in order to produce a battery cell.

In order to build a device using this approach, a coating method is used whereby three separate layers are coated by co-extrusion from, for example, a multi slot coater. Having first formed the interpenetrating network of cathode-containing polymer and anode-containing polymer, this mixture is co-extruded between a layer of cathode in cathode-containing polymer (the same polymer as the cathode is dispersed into in the interpenetrating network) on one side, and anode in anode-containing polymer (the same polymer as the anode is dispersed into in the interpenetrating network) on the other side, so as to form a triple-deck sandwich structure. The top layer of this sandwich, for example, is anode active dispersed in the anode-containing polymer, the middle layer is the interpenetrating network, and the bottom layer is cathode active dispersed in cathode-containing polymer. The particles of anode in the top layer can make electrical connection with anode particles in the interpenetrating network as the polymer in the top layer is the same as the anode-containing polymer in the interpenetrating network. Shorting of the anode active in the top layer to the cathode active in the interpenetrating layer is prevented since each type of particle is dispersed in an immiscible polymer that preferentially wets the particles and maintains their separation. The same applies to the cathode-containing layer in the lower layer of the sandwich—only connection between cathode particles is possible.

Connection to the anode and cathode current collectors is also only made by the active of the correct polarity, since only those types of particles are present in the layers next to the current collectors.

Example 23

Self-Organized Electrochemical Cell of Interpenetrating Electrode Design Having Lithium Iron Phosphate as a Positive Electrode and Graphite as a Negative Electrode This Example as well as Examples 24 and 25 demonstrate embodiments of the invention of self-organized structures having simultaneously repulsive forces between dissimilar materials and attractive forces between like materials. They also exemplify the embodiments of bipolar devices with interpenetrating electrodes, electrochemical devices with interpenetrating electrodes, lithium rechargeable batteries with interpenetrating electrodes, and self-organized structures having repulsive forces between opposing electrodes of a bipolar device.

An electronically conductive lithium iron phosphate material having the composition $Li(Zr_{0.02}Fe_{0.98})PO_4$ and added as a fine powder is used as the cathode active material, and MCMB graphite of 25 micrometer average particle size is used as the anode active material. Diiodomethane (DIM) is used as the intervening medium, into which is dissolved polystyrene of 4000 molecular weight as a binder. The lower refractive index of lightly-doped lithium iron phosphate, $n_1=1.69$, compared to that of diiodomethane (DIM), $n_2=1.7411$, which is lower still than that of graphite, $n_3 \sim 2.5$, results in a repulsive dispersion force between particles of LFP and MCMB, while having attractive dispersion force between LFP particles alone and between MCMB particles alone. The resulting self-organized structure has interpenetrating electrodes as illustrated in FIG. 12, wherein a continuous and percolating particle network of LFP is intertwined with a continuous and percolating MCMB particle network. Each particle network has substantial electronic conductivity. Aluminum is used as the cathode current collector, and is coated with a POMA/PVDF conductive polymer film prepared as in Example 8. With DIM as an intervening medium, LFP is attracted to this current collector while MCMB is repelled. Copper metal is used as the anode current collector. With DIM as an intervening medium, MCMB is attracted to this current collector while LFP is repelled. Thus, the LFP particle network is in electronic communication with only the cathode current collector, and the MCMB particle network is in electronic communication with only the anode current collector.

Figure 28:
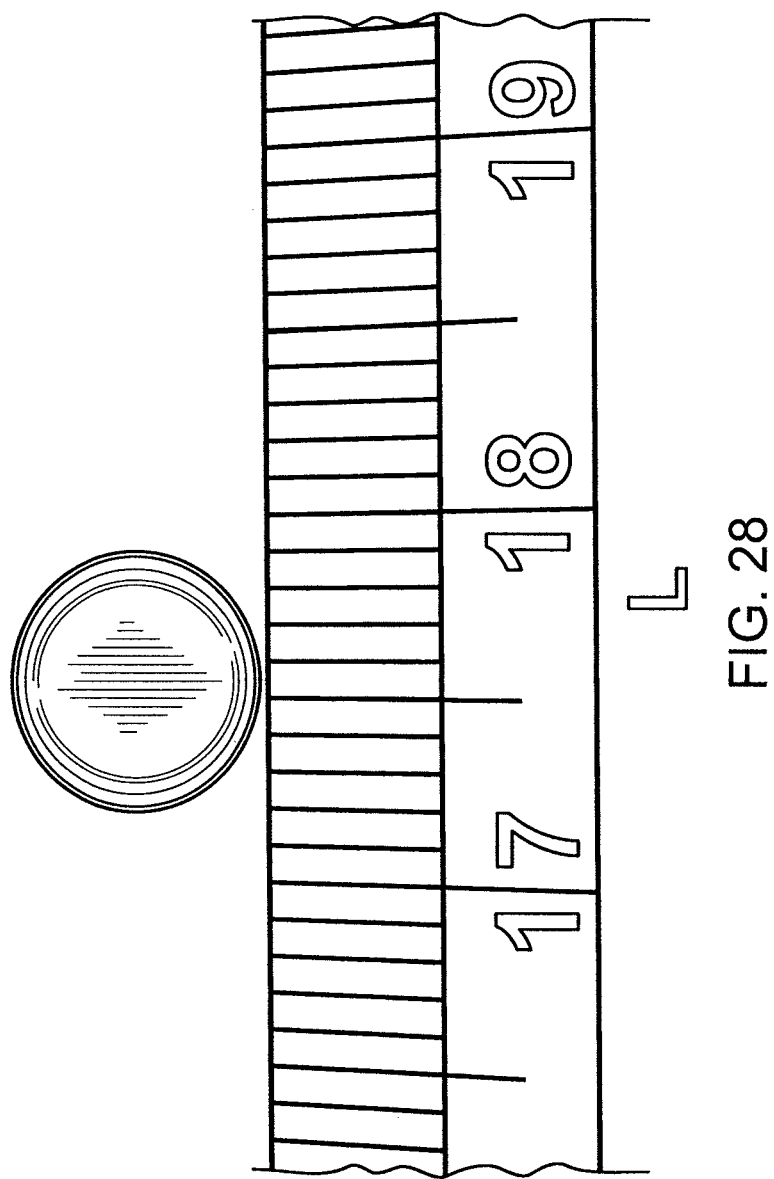
FIG. 28 is a self-organized electrochemical cell formed from a single suspension incorporating lithium iron phosphate as a cathode material, MCMB as an anode material, both as fine powders dispersed in diiodomethane for which polystyrene is used as a binder.

$LiZr_{0.02}Fe_{0.98}PO_4$ powder was prepared by a solid state reaction, with a final firing temperature of 600 C. Aluminum foil of 100 μm thickness (Puratronic Grade, Alfa-Aesar) was punched into ⅜th inch (0.95 CM) diameter disks and coated with a TFA-doped conductive polymer blend consisting of 10 wt % POMA and 90 wt % PVDF, as described in Example 8. The relative amounts of $Li(Zr_{0.02}Fe_{0.98})PO_4$ and MCMB in the cell were calculated so that the charge storage capacity in the two was equal, assuming a practical capacity of 140 mAh/g for $(Li(M_{0.02}Fe_{0.98})PO_4$ and of 372 mAh/g for MCMB. The amount of PS added was equal in volume to the total volume of active materials. The amount of DIM solvent used was 90 vol % of the total volume of PS and solvent. The $Li(Zr_{0.02}Fe_{0.98})PO_4$ and the MCMB powders were first independently dispersed in a solution of PS in DIM, and the two suspensions were then combined. The resulting suspension containing LFP, MCMB, and PS, all in DIM, was heated to 70° C. for 20 minutes. The suspension was applied as a coating to the POMA/PVDF coated aluminum substrates while at this temperature. A copper disk was applied to the top of the wet suspension to serve as the anode current collector. The assembly was then dried under vacuum at room temperature for 12 hours. FIG. 28 illustrates the self-organized cell after drying. The samples were then placed then placed in a stainless steel electrochemical cell and flooded with a liquid electrolyte consisting of a 1:1 volume ratio of ethylene carbonate (EC) to diethylene carbonate (DEC) and doped with a 1M concentration of $LiPF_6$.

Figure 27:
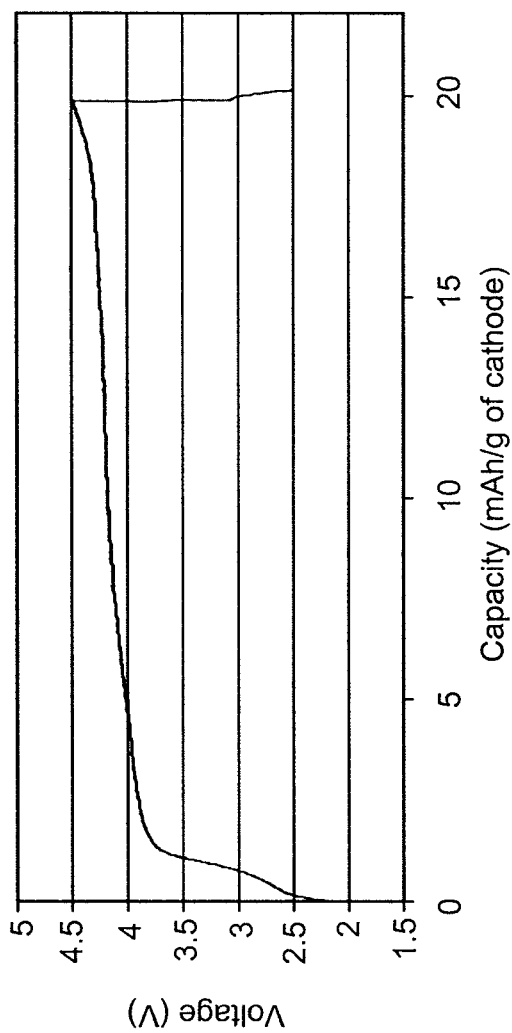
FIG. 27 is a first charge and discharge curve for the cell illustrated in FIG. 28.

FIG. 27 shows curves from an electrochemical test performed on such a cell. Upon assembly in the stainless steel cell and infusion with liquid electrolyte, the cell exhibited an open circuit voltage of 155 mV. The current rate of the cell is calculated with respect to the mass of LFP, and is 2 mA/g. It is seen that the cell exhibits a nearly flat voltage plateau with a midpoint at about 4.1 V. This voltage is about 0.8 V above the equilibrium thermodynamic voltage between LFP and MCMB of about 3.3V. The higher observed voltage is consistent with some polarization existing in the cell upon charging. Upon reaching an upper voltage limit of 4.5V, which occurred at a capacity of about 18 mAh/g, the cell was discharged, and exhibited a limited capacity between the voltage range of 3.1 to 2.5V. This voltage, being slightly below the equilibrium voltage, is consistent with some polarization existing in the cell upon discharge.

Figure 29:
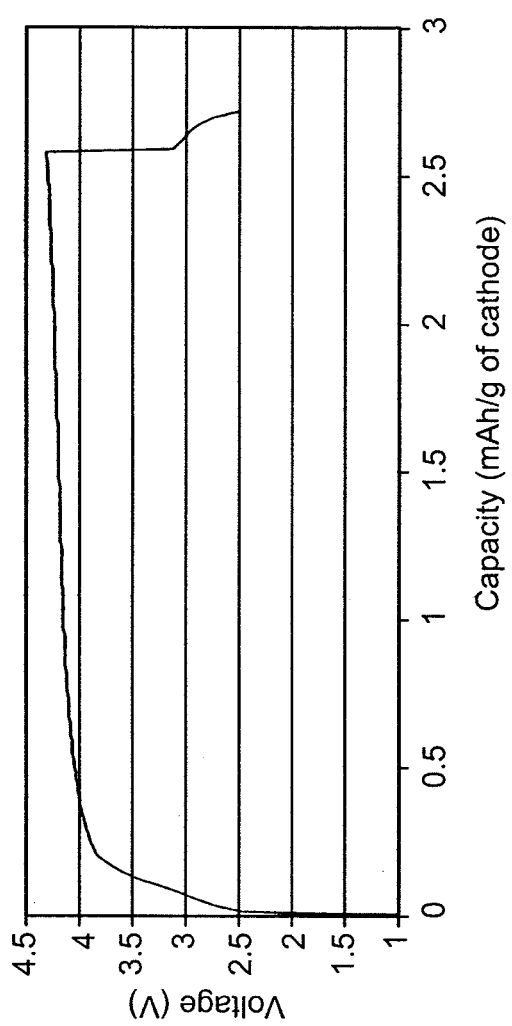
FIG. 29 is a subsequent charge-discharge curve for the cell illustrated in FIG. 28.

The cell was then charged to 4.5 V at a current rate of 2 mA/g, the current discontinued, and the open circuit voltage (OCV) measured over time. The cell remained at an OCV of greater than 3.4 V for 3 h. The cell was then charged again, to an upper voltage limit of 4.3 V. FIG. 29 shows that it again exhibits a charging voltage plateau near 4.1 V, and a discharge curve with a voltage plateau near 3V.

Example 24

Self-Organized Electrochemical Cell of Interpenetrating Electrode Design Having Lithium Iron Phosphate as a Positive Electrode and Graphite as a Negative Electrode.

Another self-organized cell was fabricated and tested in the same manner as in Example 23, with the exception that the self-organized cell was not subjected to the pressure imposed by the screw-top electrochemical cell assembly during testing. Instead, a copper lead was attached to the copper anode current collector without applying pressure to the cell. After infusion with the liquid electrolyte, this cell exhibited an open circuit voltage of 380 mV, and had a total cell resistance of 4.74 MΩ, showing that the anode and cathode current collectors are electronically isolated. This cell was charged at a current rate of 2 mA/g, and exhibited a voltage plateau at about 3.8V. After 18 hours of charging, the current was turned off and the OCV was monitored over time. The cell maintained an OCV of 3.6 V±0.05 V for 21 hours, showing that the self-organized cells of the invention can maintain a high cell voltage for a practical duration.

Example 25

Figure 30:
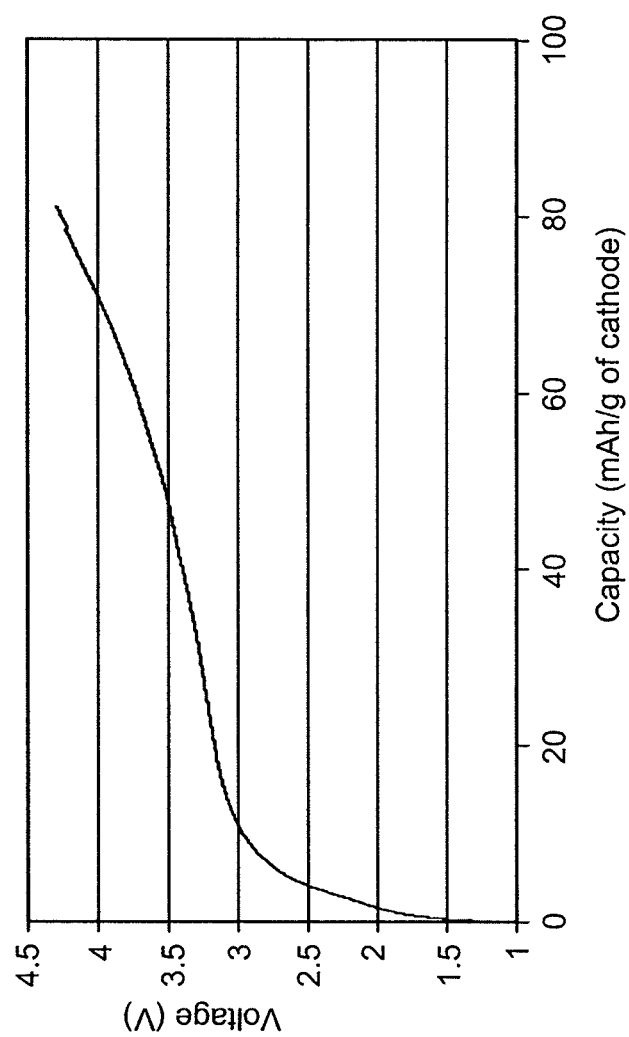
FIG. 30 is a first charge curve for self-organized electrochemical using $LiTi_{0.02}Fe_{0.98}PO_4$ as the cathode and MCMB as the anode.

Self-Organized Electrochemical Cell of Interpenetrating Electrode Design Having Lithium Iron Phosphate as a Positive Electrode and Graphite as a Negative Electrode Another self-organized cell was fabricated and tested in the same manner as in Example 23, with the exception that the cathode powder used was a Ti-doped conductive lithium iron phosphate of composition $Li(Ti_{0.02}Fe_{098})PO_4$, with a final firing temperature of 600 C. Upon assembly and infusion with the liquid electrolyte, the cell had an OCV of 90 mV. The first charge curve for this cell charged at a current rate of 5 mA/g, wherein the current rate and capacity are calculated with respect to the cathode mass, is shown in FIG. 30. A capacity of 80 mAh/g is seen in the first charge. The voltage plateau observed, while sloping, has a voltage of 3.5 V at its midpoint that is close to the equilibrium voltage expected for an electrochemical couple having LFP as the positive electrode and MCMB as the negative electrode. Thus, this cell shows, using a different composition of cathode material, that an electrochemical cell is fabricated using the design and methods of the invention.

Example 26

Self-Organized Electrochromic Device

In this Example, a self-organized electrochromic device is made using the methods of Examples 9-15 and 23-25, with the exception that electrochromically active materials are used for the positive and negative storage electrode materials. At least one of the storage electrode materials undergoes a color change upon reduction due to ion insertion or oxidation by ion removal. In one instance, $WO_3$ is used as the cathode, and vanadium oxide, hydrated vanadium oxide, vanadium oxopolymer produced by partial hydrolysis of vanadium alkoxides, or a vanadium oxide—polymer blend or nanocomposite is used as the anode. These materials are readily produced as coatings or particles by methods well-known to those skilled in the art. The vanadium oxide based anode is the low refractive index endmember material 1, and $WO_3$ is the high refractive index endmember material 3. Using an intermediate refractive index material 2 as described in preceding examples, a repelling force is present between the anode and cathode, allowing their electronic isolation from one another. Material 2 is, or comprises constituents of, a lithium conducting electrolyte or a binder. In the instance of a binder, a lithium-conducting organic liquid electrolyte or proton-conducting aqueous electrolyte is infused into the self-organizing structure after removal of a solvent component of material 2.

The electrochromic device is fabricated as a layered device using solid films of cathode and anode separated by material 2, as a layered device in which one electrode is prepared as a solid film and the other a particle suspension, as in Examples 10-13, or using a self-organizing suspension containing both cathode and anode particles, as in Examples 9 and 23-25. In such instances the metal current collectors are replaced by transparent electrodes such as indium-tin oxide, fluorine-doped indium tin oxide, or conductive polymer blends. The transparent conductors comprising the current collectors are deposited after self-organization and drying, or are used as surfaces to which cathode or anode particles are selectively attracted. In the instance of $WO_3$ and $V_2O_5$ as one materials combination, a low index conductive polymer is used as an anode current collector or as a coating is applied to a transparent oxide anode current collector to selectively attract the $V_2O_5$, while the $WO_3$ is selectively attracted to the high index transparent oxide current collector. The electrochromic device is also optionally fabricated with current collectors at the edges as in Examples 14 and 15, in which case transparent oxide electrodes are not necessary since the electrodes do not overlap the electrochromically active central region.

Example 27

Atomic Force Microscopy Experiments to Measure Repellant Force Characteristics of PEDOT/PSS/PTFE Encapsulant Material The interaction between a 10 wt. % PEDOT/PSS 90 wt. % PTFE film (Example 6) and a typical electrode material consisting of a mesocarbon microbead ("MCMB") (a graphitic carbon developed by Osaka Gas Company that is readily available and widely used in commercial lithium ion batteries) was measured in cyclohexane using an atomic force microscope ("AFM"). A nominally 6 micron MCMB particle was mounted on an AFM cantilever. The interaction force between this MCMB particle and the film was measured as a function of separation, i.e. force versus distance curves were generated. The particle and the composite film were found to repel one another in this medium.

Those skilled in the art would readily appreciate that all parameters and configurations described herein are meant to be exemplary and that actual parameters and configurations can depend upon the specific application for which the systems and methods of the present invention are used. Those skilled in the art can recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described. The present invention is directed to each individual feature, system, or method described herein. In addition, any combination of two or more such features, systems or methods, if such features, systems or methods are not mutually inconsistent, is included within the scope of the present invention.

What is claimed is:

1. A cell having a positive electrode and a negative electrode and an electrolyte in ionic communication with the positive and negative electrodes, wherein at least one of the positive and negative electrodes comprises an electrode in electrical communication with a current collector, the electrode comprising sintered particles of an electroactive material, wherein the electrode is substantially free of binder, has an open porosity and a pore volume fraction in the range of from about 10% to about 80%.

2. The cell of claim 1, wherein the sintered particles of the positive electrode comprise a lithium intercalating material.

3. The cell of claim 2, wherein the sintered particles of the negative electrode comprise a lithium intercalating material.

4. The cell of claim 1, wherein the electrolyte has an ionic conductivity of less than $10^{-4}$ S/cm.

5. The cell of claim 1, wherein the electrolyte is at least one of poly(ethylene oxide), poly(propylene oxide), poly(styrene), poly(imide), poly(amine), poly(acrylonitrile), poly(vinylidene fluoride), methoxyethyoxyethoxy phosphazine, diiodomethane, 1,3-diiodopropane, N,N-dimethylformamide, dimethylpropylene urea, ethylene carbonate, diethylene carbonate, dimethyl carbonate, propylene carbonate, a block copolymer lithium electrolyte doped with a lithium salt, glass with at least one of LiI, LiF, LiCl, $Li_2O$—$B_2O_3$—$Bi_2O_3$, $Li_2O$—$B_2O_3$—$P_2O_5$ and $Li_2O$—$B_2O_3$—PbO a sol or gel of the oxides or hydroxides of Si, B, P, Ti, Zr, Pb, or Bi.

6. The cell of claim 1, wherein sintered particles are one or more particles selected from the group consisting of $LiCoO_2$, $LiCoO_2$ doped with Mg, $LiNiO_2$, $LiMn_2O_4$, $LiMnO_2$, $LiMnO_2$ doped with Al, $Li(Fe,Mn)PO_4$, $LiFePO_4$, $LiFePO_4$ doped with one or more of Mg, Al, Ti, Nb, Ta, Zr, or W, $Li_2Fe_2(SO_4)_3$, $V_2O_5$, $V_6O_{11}$, C, amorphous carbon, graphite, mesocarbon microbeads, Li, LiAl, $Li_9Al_4$, $Li_3Al$, Zn, LiZn, Ag, LiAg, $Li_{10}Ag_3$, B, $Li_5B_4$, $Li_7B_6$, Ge, Si, $Li_{12}Si_7$, $Li_{21}Si_8$, $Li_{13}Si_4$, $Li_{21}Si_5$, Sn, $Li_5Sn_2$, $Li_{13}Sn_5$, $Li_7Sn_2$, $Li_{22}Sn_5$, Sb, $Li_2Sb$, $Li_3Sb$, Bi, LiBi, $Li_3Bi$, $SnO_2$, SnO, MnO, $Mn_2O_3$, $MnO_2$, $Mn_3O_4$, CoO, NiO, FeO, $LiFe_2O_4$, $TiO_2$, $LiTi_2O_4$, glass with a Sn—B—P—O compound and mesocarbon microbeads coated with at least one of poly(o-methoxyanaline), poly(3-octylthiophene), and poly(vinylidene fluoride).

7. The cell of claim 1, further comprising a conductive additive.

8. The cell of claim 7, wherein the conductive additive comprises carbon.

* * * * *